US011678226B2

(12) United States Patent
Sevindik et al.

(10) Patent No.: US 11,678,226 B2
(45) Date of Patent: *Jun. 13, 2023

(54) METHODS AND APPARATUS FOR PROVIDING WIRELESS SERVICES TO A CUSTOMER PREMISES

(71) Applicant: Charter Communications Operating, LLC, St. Louis, MO (US)

(72) Inventors: Volkan Sevindik, Parker, CO (US); Muhib T. Oduwaiye, Aurora, CO (US); Haider Syed, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 74 days.

This patent is subject to a terminal disclaimer.

(21) Appl. No.: 17/359,298

(22) Filed: Jun. 25, 2021

(65) Prior Publication Data

US 2021/0321296 A1 Oct. 14, 2021

Related U.S. Application Data

(63) Continuation of application No. 16/729,246, filed on Dec. 27, 2019, now Pat. No. 11,064,389.

(51) Int. Cl.
*H04W 28/08* (2023.01)
*H04W 24/08* (2009.01)
(Continued)

(52) U.S. Cl.
CPC .......... *H04W 28/08* (2013.01); *H04W 24/08* (2013.01); *H04W 28/0284* (2013.01); *H04W 40/12* (2013.01); *H04W 80/02* (2013.01)

(58) Field of Classification Search
CPC . H04W 28/08; H04W 28/0284; H04W 24/08; H04W 40/12; H04W 80/02;
(Continued)

(56) References Cited

U.S. PATENT DOCUMENTS

2016/0255010 A1* 9/2016 Shukla .............. H04W 28/0289
370/235
2016/0330123 A1* 11/2016 Mena de la Cruz ... H04L 47/11
(Continued)

OTHER PUBLICATIONS

Bhutani, Monica, Brejesh Lail, and Monika Agrawal. "Optical Wireless Communications: Research Challenges for MAC Layer." IEEE Access (2022). (Year: 2022).*

*Primary Examiner* — Sharad Rampuria
(74) *Attorney, Agent, or Firm* — Straub & Straub; Stephen T. Straub; Michael P. Straub

(57) ABSTRACT

Methods and apparatus for providing data services to devices at a customer premises. An exemplary method embodiment includes the steps of: switching from a first mode of operation to a second mode of operation with respect to providing data services to a user equipment device located at a customer premises upon detection of a first condition at the customer premises by a wireless base station; receiving, after switching into the second mode of operation, at the wireless base station a first data service request from the user equipment device; transmitting, in response to the first data service request, one or more data packets of a first data packet stream to the user equipment device via a first transmission path and transmitting one or more additional data packets of the first packet stream to the user equipment device via a second transmission path.

20 Claims, 24 Drawing Sheets

(51) Int. Cl.
*H04W 80/02* (2009.01)
*H04W 40/12* (2009.01)
*H04W 28/02* (2009.01)

(58) Field of Classification Search
CPC ......... H04L 47/10; H04L 47/12; H04L 47/20; H04L 47/24; H04L 47/32; H04L 47/38; H04L 47/70; H04L 47/72; H04L 47/74; H04L 47/78; H04L 47/80
See application file for complete search history.

(56) References Cited

U.S. PATENT DOCUMENTS

2019/0150150 A1* 5/2019 Calin ................ H04W 72/0453
370/329
2020/0267559 A1* 8/2020 Mahoney .............. H04W 24/02

* cited by examiner

C — 2066

2068

THE WIRELESS BASE STATION, E.G., CBSD, TRANSMITS DATA TO THE UE DEVICES FROM WHICH IT RECEIVES DATA SERVICE REQUESTS IN RESPONSE TO SAID RECEIVED DATA SERVICE REQUESTS, THE DATA FOR EACH UE DEVICE BEING TRANSMITTED IN THE FIRST WIRELESS PROTOCOL FORMAT OVER THE WIRELESS CONNECTION ESTABLISHED BY THE CPE DEVICE WITH THE WIRELESS BASE STATION, THE DATA BEING RECEIVED BY THE CPE DEVICE FROM THE WIRELESS BASE STATION, THE DATA BEING COMMUNICATED BY THE CPE DEVICE TO THE WI-FI ACCESS POINT SERVICING THE UE DEVICE TO WHICH THE DATA IS SENT OVER A LINK CONNECTING THE CPE DEVICE TO THE WI-FI ACCESS POINT, THE DATA BEING CONVERTED INTO A WI-FI FORMAT BY THE WI-FI ACCESS POINT, AND THE DATA BEING TRANSMITTED OVER THE WI-FI CHANNEL OR LINK ESTABLISHED BETWEEN THE WIFI ACCESS POINT AND THE UE DEVICE TO WHICH THE DATA HAS BEEN SENT, WHERE THE UE DEVICE RECEIVES THE DATA IN THE WI-FI FORMAT AT THE UE DEVICE AND PROCESSES THE DATA

THE WIRELESS BASE STATION, E.G., CBSD, TRANSMITS A FIRST SET OF DATA PACKETS TO THE FIRST UE DEVICE FROM WHICH IT RECEIVED THE FIRST DATA SERVICE REQUEST IN RESPONSE TO SAID RECEIVED FIRST DATA SERVICE REQUEST, SAID FIRST SET OF DATA BEING TRANSMITTED IN THE FIRST WIRELESS PROTOCOL FORMAT OVER THE WIRELESS CONNECTION ESTABLISHED BY THE CPE DEVICE WITH THE WIRELESS BASE STATION TO THE CPE DEVICE FOR DELIVERY TO THE FIRST USER DEVICE — 2070

THE WIRELESS BASE STATION, E.G., CBSD, TRANSMITS A SECOND SET OF DATA PACKETS TO THE SECOND UE DEVICE FROM WHICH IT RECEIVED THE SECOND DATA SERVICE REQUEST IN RESPONSE TO SAID RECEIVED SECOND DATA SERVICE REQUEST, SAID SECOND SET OF DATA BEING TRANSMITTED IN THE FIRST WIRELESS PROTOCOL FORMAT OVER THE WIRELESS CONNECTION ESTABLISHED BY THE CPE DEVICE WITH THE WIRELESS BASE STATION TO THE CPE DEVICE FOR DELIVERY TO THE SECOND USER DEVICE — 2072

THE WIRELESS BASE STATION, E.G., CBSD, TRANSMITS A THIRD SET OF DATA PACKETS TO THE THIRD UE DEVICE FROM WHICH IT RECEIVED THE THIRD DATA SERVICE REQUEST IN RESPONSE TO SAID RECEIVED THIRD DATA SERVICE REQUEST, SAID THIRD SET OF DATA BEING TRANSMITTED IN THE FIRST WIRELESS PROTOCOL FORMAT OVER THE WIRELESS CONNECTION ESTABLISHED BY THE CPE DEVICE WITH THE WIRELESS BASE STATION TO THE CPE DEVICE FOR DELIVERY TO THE THIRD USER DEVICE — 2074

| FIGURE 2A |
| FIGURE 2B |
| FIGURE 2C |
| FIGURE 2D |
| FIGURE 2E |
| FIGURE 2F |
| FIGURE 2G |
| FIGURE 2H |

FIGURE 2

METHODS AND APPARATUS FOR PROVIDING WIRELESS SERVICES TO A CUSTOMER PREMISES

RELATED APPLICATIONS

The present application is a continuation of U.S. patent application Ser. No. 16/729,246 which was filed on Dec. 27, 2019 and which is hereby expressly incorporated by reference in its entirety.

FIELD OF INVENTION

The present invention relates to methods and apparatus for providing wireless services to user equipment devices located at a customer premises. More particularly, the present invention relates to methods and apparatus for providing services, e.g., broadband services, to subscribers or users located within a customer's premises through the use of a plurality of different wireless communications paths, e.g., 5G wireless communications and WiFi wireless communications. The present invention further relates to method and apparatus for managing, reducing and/or eliminating congestion at a customer premises. The present invention further relates to methods and apparatus for providing services to customer premises equipment devices without the need for a landline connection to the customer premises in which the customer premises equipment devices are located.

BACKGROUND OF THE INVENTION

In instances where wireless networks are being used to provide broadband services to a customer premises, the capacity of the wireless connection or link to the customer premises may not be the limiting factor but instead congestion on links, connections or communications paths within the customer premises may become a bottleneck for providing services. For example, such problems occur in Citizens Broadband Radio Service networks.

In a Citizens Broadband Radio Service (CBRS) network, Citizens Broadband Radio Service Devices (CBSDs) serve as access points which can support wireless communications with user equipment devices (UEs).

A CBRS network includes a plurality of CBSD devices. The CBSD devices provide wireless services to subscribers' user equipment devices. Spectrum is granted to each of the CBSDs using a centralized system called the Spectrum Access System (SAS). The Spectrum Access System is a central processing and database system that receives and processes spectrum grant requests. In the CBRS network, interference is managed through power management of CBSD devices by the Spectrum Access System (SAS). The SAS stores information regarding which CBSD uses how much spectrum at which location in the CBRS network.

Many customer premises, e.g., homes do not have landline connections or landline connections which can support broadband services. For example, in various geographical areas, e.g., rural areas of the country with sparse populations, it is not economical or practical to connect landlines to all customer premises. In such areas, there is a need for providing services, e.g., broadband services, to the customer premises which do not have landline connections or do not have landline connections which can provide broadband services. Additionally, in urban areas where landline connections can provide broadband services customers may still desire to have services provided via wireless connections in place of or in addition to landline connections.

In CBRS systems wherein broadband services are provided to a plurality of devices at the customer premises, e.g., user equipment devices, using a customer premise equipment that provides WI-FI services at the customer premise equipment, customer premises communications links can become congested affecting the level and quality of service that may be provided to the plurality of devices at the customer premises. While the devices at the customer premises may have the capability to communicate using different wireless paths there is currently a technological problem of how to use multiple communications paths to send data to a user equipment device requesting the data.

From the above it should be understood that there is a need for new and/or improved methods and apparatus to provide wireless services, e.g., wireless broadband services, to subscribers or users located within a customer premises. There is a further need for new and/or improved methods and apparatus for providing services to devices located at customer premises without a landline connection or a landline connection capable of providing broadband services and/or where a landline is not practicable or economical. Additionally, there is a need for new and/or improved methods and apparatus for managing, reducing and/or eliminating bottleneck conditions which occur at a customer premises. There is also a need for new and/or improved methods and apparatus to solve the technological problem of how to overcome congestion problems when a customer premises does not have the link capacity to provide the requested services for a plurality of devices at the customer premises. Moreover, there is a need for new and/or improved methods of providing additional resources, e.g., bandwidth, to customer premises devices in addition to the landline and current wireless methods available.

SUMMARY OF THE INVENTION

The present invention provides a technological solution of how to provide wireless data services, e.g., broadband services to devices located at a customer premises while minimizing and overcoming congestion problems at the customer premises. The various embodiments described herein provide new and novel methods for efficiently and effectively identifying, managing, reducing and/or eliminating congestion, e.g., link congestion, at a customer premises so that data services can be provided to subscribers and/or user equipment devices located at the customer premises via wireless connections. Various embodiments of the present invention include novel methods and apparatus to solve one or more of the problems identified above.

By using one or more of the techniques described herein a wireless base station can provide services, e.g., broadband services, to devices located at a customer's premises that does not include a landline for providing broadband services such as internet access, media download, video on demand services, voice over internet protocol services, etc. as well as managing resources within the customer premises to reduce and/or eliminate bottlenecks and/or congestion on the links or connections within the customer's premises.

An exemplary method embodiment includes the steps of: (i) monitoring, by a wireless base station, for a first condition at a first customer premises; (ii) switching, in response to detecting by a wireless base station the first condition exists at the first customer premises, from a first mode of operation to a second mode of operation with respect to providing data services to a user equipment device located at the first customer premises; (iii) receiving, after switching into said second mode of operation, at the wireless base station a first data service request from a first user equipment device; and (iv) transmitting, in response to said first data service request, one or more data packets of a first data packet stream to the first user equipment device via a first transmission path and transmitting one or more additional data packets of the first packet stream to the first user equipment device via a second transmission path.

In some embodiments, the first condition exists when a communications link in the first transmission path at the first customer premises is determined to be congested. In some embodiments, the step of detecting by a wireless base station the first condition exists at the first customer premises includes receiving a first message from a customer premise equipment device at the first customer premises indicating that there is a Wi-Fi Access Point overload condition.

In some embodiments, the method includes the steps of: monitoring, by the customer premise equipment device, for a Wi-Fi Access Point overload condition, said monitoring for a Wi-Fi Access Point overload condition including monitoring one or more Wi-Fi Access Point downlink buffers for a buffer overflow condition or a condition in which the number of data packets in one or more Wi-Fi Access Point downlink buffers exceeds a first threshold for a predetermined amount of time; detecting, by the customer premises equipment device, that a Wi-Fi Access Point overload condition exists with respect to a Wi-Fi Access Point when said customer premise equipment device determines that the Wi-Fi Access Point downlink buffer corresponding to the Wi-Fi Access Point is experiencing a buffer overflow condition or is experiencing a condition in which the number of data packets in the Wi-Fi Access Point downlink buffer corresponding to the Wi-Fi Access Point exceeds the first threshold for the predetermined amount of time; and when said Wi-Fi Access Point overload condition is detected: (i) generating, by the customer premises equipment device, the first message indicating that there is a Wi-Fi Access Point overload condition; and (ii) communicating said Wi-Fi Access Point overload condition message to said wireless base station.

In some embodiments, the first transmission path includes: a first wireless communications link (e.g., 5G, CBRS or cellular wireless communication link) between the wireless base station and a customer premises equipment device located at the first customers premises; a first wired communications link between the customer premises equipment device and a first Wi-Fi Access Point device; and a first Wi-Fi wireless communications link between the first Wi-Fi Access Point device and the first user equipment device.

In some embodiments, the second transmission path is a second wireless communications link (e.g., 5G, CBRS, or cellular wireless communication link) between the wireless base station and the first user equipment device. In some embodiments, the first wireless communications link between said wireless base station and customer premises equipment device and second wireless communications link between the wireless base station and the first user equipment device utilize bandwidth in the 3.5 GHz frequency spectrum.

The wireless base station may be, and in some embodiments is, a CSBD being operated in a CBRS network. In some such embodiments, the bandwidth frequency spectrum utilized by the first wireless communications link and the second wireless communications link are assigned to the wireless base station by a Spectrum Access System. The first user equipment device is typically a multi-mode communications device that is enabled to receive and transmit messages using two or more separate wireless communications protocols simultaneously.

In most embodiments, the first user equipment device is a dual-mode communications device that is enabled to communicate with other devices using a first wireless communications protocol and a second wireless communications protocol simultaneously. The first wireless communications protocol may be, and in most embodiments is, a Wi-Fi communications protocol; and the second wireless communications protocol is one of the following protocols: 5G wireless communications protocol, a CBRS wireless communications protocol and a cellular wireless communications protocol.

In some embodiments the method further includes the step of: generating, by the wireless base station, the data packets of the first packet stream, said generating the data packets of the first packet stream including marking the packets of the first packet stream that will be communicated to the first user equipment device via the first transmission path to include an indication that the packets are part of a packet stream being communicated over two separate transmission paths. In some embodiments, the step of marking the packets of the first packet stream to include an indication that the packets are part of a packet stream being communicated over two separate transmission paths includes including information in the packets of the first packet stream which indicates that the packet is part of a packet being communicated over two separate transmission paths.

In some embodiments the method includes when a Wi-Fi Access Point receives a data packet including an indication that the packet is part of a packet stream being communicated over two separate transmission paths, said Wi-Fi Access Point will generate a Wi-Fi data packet based on the received data packet, said generated Wi-Fi data packet including Packet Data Convergence Protocol (PDCP) Packet with payload information (e.g., 5G PDCP) of the received data packet in the Medium Access Control (MAC) Packet Data Unit (PDU) part of the Wi-Fi packet frame.

In some embodiments when a Wi-Fi interface (e.g., Wi-Fi chipset) of a user equipment device receives a Wi-Fi data packet including an indication that the packet is part of a packet stream being communicated over two separate transmission paths, the Wi-Fi interface will extract the MAC PDU and communicate it to a second interface (e.g., 5G chipset) which will decode the MAC PDU information in accordance with the protocol format of the second path (e.g., 5G decoder).

In some embodiments when operating in said first mode of operation the wireless base station communicates all packets belonging to a packet stream over a single transmission path to a user equipment device (e.g., all packets of a packet stream communicated via CBSD to CPE to WI-FI Access Point to UE transmission path or all packets of packet stream communicated via CBSD to UE transmission path) and when operating in said second mode of operation said wireless base station communicates a command to one or more Wi-Fi Access Points at the customer premises to perform a MAC layer conversion on received packets marked for MAC layer conversion before communicating the packets over a Wi-Fi channel to the user equipment device. The MAC layer conversion in some embodiments includes encapsulating Packet Data Convergence Protocol (PDCP) Packet with payload information (e.g., 5G PDCP packet) of the received data packet in the Medium Access Control (MAC) Packet Data Unit (PDU) part of the Wi-Fi packet frame.

The present invention is also applicable to and includes apparatus and systems such as for example, apparatus and systems that implement the steps of the method embodiments. An exemplary communications system in accordance with the present invention includes a wireless base station including: memory; and a processor included in the wireless base station which controls the operation of the wireless base station to perform the following operations: monitor for a first condition at a first customer premises; switch, in response to detecting the first condition exists at the first customer premises, from a first mode of operation to a second mode of operation with respect to providing data services to a user equipment device located at the first customer premises; receive, after switching into said second mode of operation, at the wireless base station a first data service request from a first user equipment device; and transmit, in response to said first data service request, one or more data packets of a first data packet stream to the first user equipment device via a first transmission path and transmitting one or more additional data packets of the first packet stream to the first user equipment device via a second transmission path. In some such embodiments, when operating in said first mode of operation said wireless base station communicates all packets belonging to a packet stream over a single transmission path to a user equipment device (e.g., all packets of a packet stream communicated via CBSD to CPE to WI-FI Access Point to UE transmission path or all packets of packet stream communicated via CBSD to UE transmission path). In some system embodiments when operating in the second mode of operation the wireless base station communicates a command to one or more Wi-Fi Access Points at the customer premises to perform a MAC layer conversion on received packets marked for MAC layer conversion before communicating the packets over a Wi-Fi channel to the user equipment device. In some embodiments, the MAC layer conversion includes encapsulating Packet Data Convergence Protocol (PDCP) Packet with payload information (e.g., 5G PDCP packet) of the received data packet in the Medium Access Control (MAC) Packet Data Unit (PDU) part of the Wi-Fi packet frame.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 2 illustrates the combination of FIGS. 2A, 2B, 2C, 2D, 2E, 2F, 2G, and 2H.

FIG. 2D illustrates the steps of the fourth part of an exemplary method in accordance with one embodiment of the present invention.

DETAILED DESCRIPTION

Figure 1:
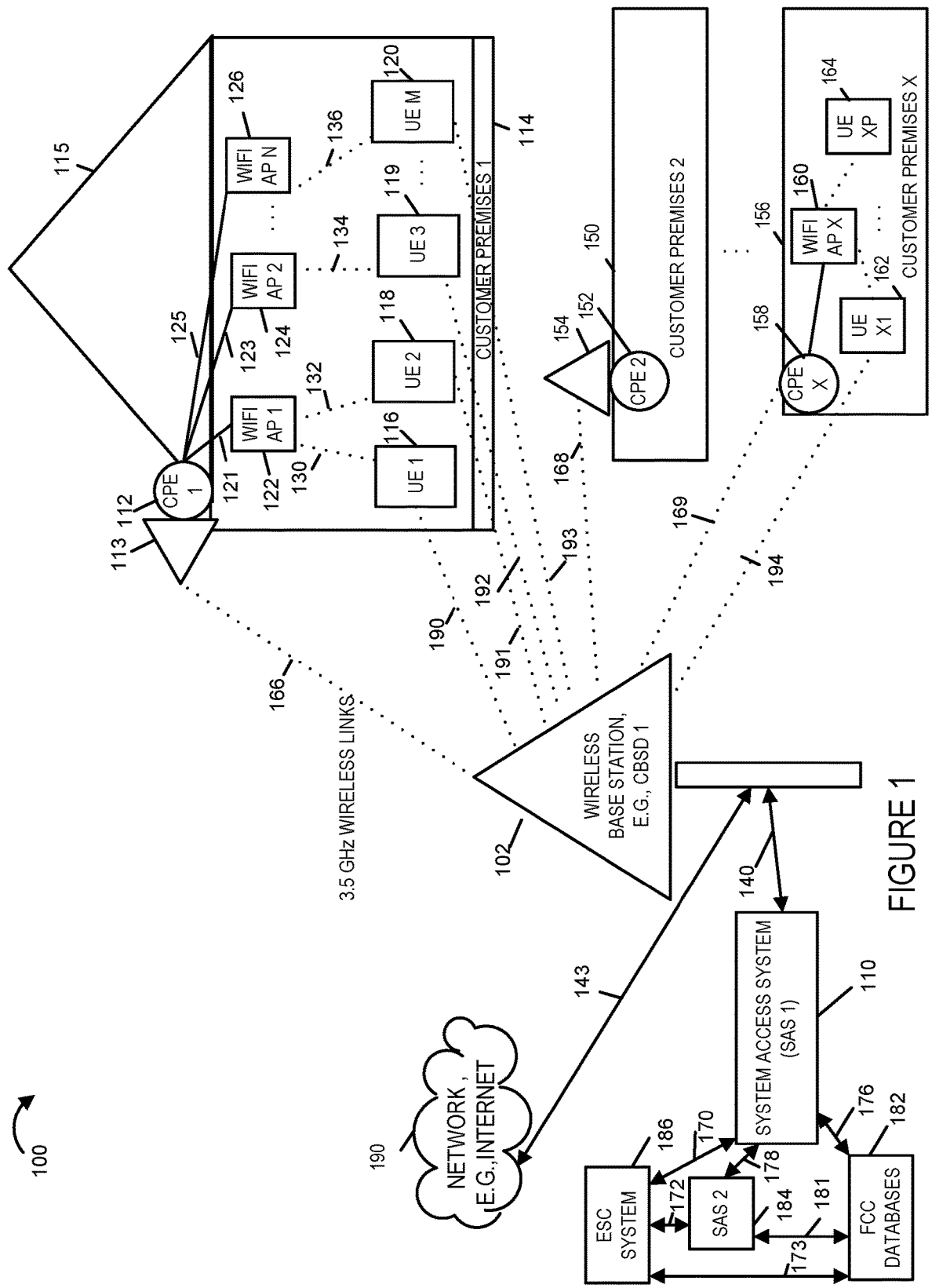
FIG. 1 illustrates an exemplary communications system shown as a Citizens Broadband Radio Service network system 100 that provides wireless communications services in accordance with one embodiment of the present invention.

The current invention is applicable to wireless networks, e.g., Citizens Broadband Radio Service (CBRS) networks, that provide wireless communications services, e.g., broadband services to user equipment devices at customer premises. The present invention solves the network congestion problems at customer premises that are receiving data services via wireless communication. Various embodiments of the present invention are directed to new apparatus and methods for providing wireless services, e.g., broadband data services, to devices located at a customer premises. While the invention is explained using an exemplary Citizens Broadband Radio Service network, it should be understood that the invention is not limited to Citizens Broadband Radio Service networks.

Citizens Broadband Radio Service networks are networks that include user equipment devices, e.g., mobile or wireless devices such as for example cell phones, smart phones, laptops, tablets, smart TVs, Citizens Broadband Radio Service Devices (CBSDs) which serve as access points/base stations, and Spectrum Access Systems which provides spectrum assignments and manage frequency interference through power management of the CBSDs transmission power. The Citizens Broadband Radio Service network utilizes the 150 megahetz in the 3550-3700 MHz band referred to as the 3.5 GHz Band. One important aspect of the CBRS network is the limitation of interference, e.g., radio transmission, from multiple transmission sources, e.g., multiple CBSD devices located near each other or in close proximity to one another. The CBRS network includes Spectrum Access Systems that obtain information about registered or licensed commercial users in the 3.5 GHz band from FCC databases and information about federal incumbent users of the band from ESC (Environmental Sensing Capability) system and interact directly or indirectly with CBSDs operating in the band to ensure that Citizens Broadband Radio Service users operate in a manner consistent with their authorizations and promote efficient use of the spectrum resource. Among the Spectrum Access System functions as defined in the Amendment of the Commission's Rules with Regard to Commercial Operations in the 3550-3650 MHz Band released Apr. 21, 2015 are that: it determines the available frequencies at a given geographic location and assign them to CBSDs; it determines the maximum permissible transmission power level for CBSDs at a given location and communicates that information to the CBSDs; it registers and authenticates the identification information and location of CBSDs; it enforces exclusion and protection zones, including any future changes to such Zones, to ensure compatibility between Citizens Broadband Radio Service users and incumbent federal operations; it protects Priority Access Licensees (PAL) from impermissible interference from other Citizens Broadband Radio Service users; ensures secure and reliable transmission of information between the SAS, ESC, and CBSDs; and it facilitates coordination and information exchange between SASs. Through the management of the CBSDs power transmission levels in a geographical area the SAS manages the radio interference in the geographical area.

Various embodiments of the present invention describe methods, apparatus, systems and techniques for providing wireless services, e.g., broadband services, to one or more devices at a customer premises. In the present invention, Citizen Broadband Radio Service spectrum, 3.5 GHz frequency spectrum band, is used to serve nomadic and stationary users. The invention is useful to provide broadband services to geographically isolated or remote areas, e.g., rural areas, where wired or optical connections are expensive and not economical given the number of customers to be serviced. The invention is also useful in urban areas where wireless services may be preferred as a replacement for wired connections or in addition to wired connections. In the present invention, a CBRS Customer Premise Equipment device (CPE) is located at a customer's premises inside of a house, business or any place where there are CBRS network users. The CBRS CPE device is coupled or connected to at least one CBRS fixed wireless access (FWA) tower base station (e.g., CBSD) over wireless communications links. The CBRS CPE is typically located in a building such as a home and is coupled to one or more antennas or an antenna array through which the CBRS CPE device transmits to and receives from the antenna(s) of the CBRS FWA tower base station (CBSD) wireless signals over the wireless communications link. These wireless communications links being in the 3.5 GHz frequency spectrum band. The CBRS CPE device in some embodiments includes external antennas. In some embodiments, the CBRS CPE device includes one or more internal antennas. In some embodiments, the CBRS CPE device includes one or more internal antennas and one or more antenna ports to which one or more external antennas are connected. The CBRS CPE device is coupled through a wired connection, e.g., a cable to one or more Wireless Fidelity (Wi-Fi) Access Points. The CBRS CPE device also referred to herein as CPE device or CPE serves the subscribers or users located in its coverage area, e.g., in the house, building, or on the customer's premises. The one or more Wi-Fi access points provide Wi-Fi services to the one or more end point devices or user equipment devices located at the customer premises. The one or more Wi-Fi access points are connected over a cable or wired communications to the CBRS CPE device through which backhaul is provided. One or more of the one or more endpoint devices or user equipment devices are dual mode devices that support both CBRS wireless protocols, e.g., 5G wireless protocols, and Wi-Fi protocols. The dual mode devices, e.g., phones, are both wireless 5G enabled and Wi-Fi enabled with two different radios one for each type of wireless protocol. These dual mode endpoint devices or user devices can connect to both wireless networks at the same time and communicate using the two different wireless protocols, e.g., 5G wireless protocols and Wi-Fi protocols, at the same time with respect to a single packet data stream wherein some packets of the packet stream are routed over a first path (e.g., direct 5G wireless protocol path to the end point device) and other packets of the same packet stream are routed via a second path (e.g., indirect Wi-Fi path) to the endpoint device. The end point device then combines/assemblies the data from the packets received from both paths to obtain the data of the packet stream. In connection with the discussion of 5G wireless protocol, MAC layer and the Packet Data Convergence Protocol, the 3GPP TS 38.323 V15.6.0 (2019-06) (3rd Generation Partnership Project; Technical Specification Group Radio Access Network; NR; Packet Data Convergence Protocol (PDCP) specification (Release 15) is a specification which describes the 5G PDCP and is hereby expressly incorporated by reference in its entirety. The IEEE Std 802.11-2016, IEEE Standard for Information technology-Telecommunications and Information Exchange Between Systems Local and Metropolitan Area Networks-Specific Requirements Part 11: Wireless LAN Medium Access Control (MAC) and Physical Layer (PHY) Specifications approved Dec. 7, 2016 describes the WI-FI MAC layer and is hereby expressly incorporated by reference in its entirety.

The wireless base station in the exemplary embodiment is a CBRS FWA tower base station which is a CBSD device and as such its transmission power levels and spectrum bandwidth are allocated or assigned to it via a Spectrum Access System of the CBRS network. The CBRS network includes multiple CBSD devices though only a single wireless base station, CBSD, is shown in the exemplary system 100 illustrated in FIG. 1.

Each wireless base station, e.g., CBRS FWA tower base station/CBSD, is coupled to and registered with a CBRS network Spectrum Access System (SAS) of the CBRS network. The CBRS network Spectrum Access System manages the allocation of CBRS network spectrum and transmission power levels. The SAS is responsible for assigning/allocating spectrum to the CBRS FWA tower base stations.

The CBRS CPE device antenna(s) are typically located at an elevated position such as for example on the top of a roof of a building or on a pole outside the building in which the CBRS CPE device is located. In some embodiments, the CBRS CPE device includes one or more internal antennas and/or one or more antenna ports for connecting the device via a wire to external antennas mounted outside of the building.

The transmission power levels allocated for the wireless base stations, e.g., CBRS FWA tower base stations/CBSDs, are high in comparison to the transmission power level of the CPE devices, e.g., CBRS CPE devices. For example, a CBRS FWA tower base station coverage area can include hundreds of customer premises while the CBRS CPE device has a much smaller coverage area. Each CBRS CPE located at a customer's premises provides services to subscriber's user equipment devices such as computers, laptops, tablets, smart devices (e.g., appliances, watches, smartTVs), streaming devices, WiFi devices, CBRS enabled devices (e.g., CBRS phones), via one or more Wi-Fi Access Points. The CPE device includes at least one wireless interface for communicating with wireless base, e.g., CBRS FWA tower base station. The CPE device also includes one or more wired and/or optical interfaces so that it can be coupled to and communicate with WiFi access points or base stations and/or other devices with wired and/or optical interfaces such as internet telephony systems, cable network devices, internet media streaming devices, e.g., over wired or optical networks (e.g., local area networks or wide area networks) at the customer's premises. The CPE device provides bridging and/or protocol converter and/or router functionality as the CPE device converts wireless signals received in a first protocol format, e.g., 5G wireless signal, CBRS wireless signal or a cellular wireless signal, to a format that is understood by the Wi-Fi access points.

FIG. 1 illustrates an exemplary communications system 100 illustrated as a CBRS network communications system, having an architecture implemented in accordance with an embodiment of the present invention and being coupled to a network 190 (e.g., the internet). The communications system 100 also referred to as the CBRS communications network system 100 includes at least one wireless base station 1 102 illustrated as a Citizens Broadcast Radio Service FWA tower base station (CBSD) (e.g., CBSD 1), a plurality of Spectrum Access System devices (SAS 1 110, SAS 2 184), a plurality of customer premises (customer premises 1 114, customer premises 2 150, . . . , customer premises X 156, X being an integer greater than 2), a plurality of CBRS Customer Premises Equipment devices (CBRS CPE device 1 112, CBRS CPE device 2 152, . . . , CBRS CPE device X 158, X being integer greater than 2), a plurality of Wi-Fi Access Points or base stations (Wi-Fi AP 1 122, Wi-Fi AP 2 124, . . . , Wi-Fi AP N 126, WiFi AP X 160) an ESC system 186, a FCC Database System 182, and a plurality of communications links 121, 123, . . . , 125, 130, 132, 134, . . . 136, 140, 143, 166, 168, 169, 170, 172, 173, 176, 178, 181, 190, 191, 192, 193, and 194. The CBRS system 100 is coupled to a network 190, e.g., the Internet, through which various services can be provided such as for example voice over internet call services, video on demand services, video conferencing services. In some embodiments, the network is a part of the CBRS network and the services are provided from CBRS network service providers. In the example system shown in FIG. 1 the wireless base station 102, e.g., CBRS tower base station 1 or CBSD 1 is illustrated as being coupled or connected to the network 190 via communications link 143 which may be a wired, wireless or optical link. Though not shown the CBRS network typically includes other wireless base stations, e.g., CBRS tower base stations or CBSDs, which are also typically coupled or connected to the network 190 via communications links. In some embodiments, the wireless base stations, e.g., CBRS tower base stations or CBSDs, are coupled to a packet gateway system which is part of and located in the network 190.

CPE device 1 (CPE 1) 112, e.g., CBRS CPE device, includes an antenna system 113, e.g., one or more antenna or an antenna array mounted on a roof of a building 115, e.g., home or office building, located in customer premises 1 114 for communicating with the wireless base station 102, e.g., CBRS tower base station 1 102. The antenna being coupled to a portion of the CPE device 1 which is located inside the house 115 and which also includes separate interfaces for communicating with Wi-Fi Access Points located at the customer premises or within its coverage range. Wi-Fi Access Points 122, 124, and 126 are coupled to or connected to the CPE device 1 112 via wires or cables 121, 123, and 125 respectively in the exemplary embodiment.

CPE device 2 (CPE 2) 152, e.g., CBRS CPE device 2, is located at the customer premises 2 150 and includes an antenna system 154 located at an elevated position (e.g., mounted on a pole or roof of a building located at the customer premises 2 150) for communicating with the wireless base stations e.g., wireless base station 102, e.g., CBRS tower base station 1 102. The elevation of the antenna system allows for less obstruction of wireless signals do to other structures and hence provides for a larger geographical area within which it can exchange wireless signals with wireless base stations, e.g., CBRS tower base stations.

CPE device X (CBRS CPE X) 158 is located at the customer premises X 156 and includes an internal antenna and/or antenna array within the device for communicating with wireless base station, e.g., CBRS Tower base station 1 102 also referred to as CBSD 1.

Customer premises 1 114 includes Wi-Fi Access Point 1 (Wi-Fi AP 1) 122, Wi-Fi AP 2 124, . . . , Wi-Fi AP N (N being an integer greater than 2) which provide Wi-Fi services to the user equipment devices at the customer premises 1 114 which include UE 1 116, UE 2 118, UE 3 119, . . . , UE M 120, where M is an integer greater than 3.

Customer premises 2 150 similarly includes one or more Wi-Fi access points and UE devices though they are not shown for the sake of simplicity.

Customer premises X 156 includes CPE device X 158, Wi-Fi Access Point X 160 and endpoint or user equipment devices UE X1 162, . . . , UE XP 164, where P is an integer greater than 1. The user equipment devices UE X1 162, . . . , UE XP 164 being coupled or connected to the Wi-Fi AP 160 via Wi-Fi communications links. The Wi-Fi AP 160 being coupled or connected to the CPE X via a communications link such as for example a wire or cable connection.

In the exemplary embodiment, the user equipment devices UE 1 116, UE 2 118, UE 3 119, . . . , UE M 120 and UE X1 162, . . . , UE XP 164 are enabled to simultaneously wirelessly communicate using a first wireless protocol, e.g., CBRS wireless signaling protocols (e.g., 5G wireless protocols) and Wi-Fi protocols with respect to the same packet stream. In some embodiments, some UE devices are not enabled for both CBRS wireless signaling protocol use and Wi-Fi signaling as they may only include a Wi-Fi radio. Such devices cannot operate in the dual mode also referred to as dual path mode in accordance with some aspects of the present invention.

SAS 1 110 is coupled to SAS 2 184 via communications link 178. SAS 1 110 is coupled to FCC Databases 182 via communications link 176. SAS 2 184 is coupled to FCC Databases 182 via communications link 181. ESC system 186 is coupled to SAS 1 110 and SAS 2 184 via communications links 170 and 172 respectively. The ESC System 186 is coupled to the FCC Databases 182 via communications link 173. The ESC system 186 is used to detect and/or sense Navy radar operations in CBRS operation within 3550-3650 MHz near the coasts and provide notifications over the communications links to SAS 1 110 and SAS 2 184. SAS 1 110 manages the CBRS tower base 1 102 spectrum allocation and transmission power to limit interference in the CBRS network. SAS 2 184 manages CBSDs including other CBRS tower base stations in the CBRS network which are not shown in FIG. 1. SAS 1 110 and SAS 2 184 communicate and share information regarding the CBRS network coverage of the CBSDs including CBRS tower base stations each respectively manage and coordinate management of the allocation of spectrum and power transmission levels of CBSDs including CBRS tower base stations throughout the CBRS network. While only two SAS devices are shown in FIG. 1 it should be understood that additional SAS devices are typically used in the CBRS network. In some embodiments, one or more of the CBRS tower base stations of the CBRS network are also coupled or connected to each other either through wired and/or wireless communications links so that they can communicate and exchange information.

The communications links 166, 168, 169, 190, 191, 192, 193 and 194 are wireless communications links in the 3.5 GHz frequency spectrum band. The communications link 166 couples or connects the wireless base station 102, e.g., CBRS tower 1 base station 102, to CPE device 1 112. The communications link 168 is also a wireless communications link in the 3.5 GHz frequency spectrum band that couples or connects wireless base station 102 to CPE device 2 152. The communications link 169 is a wireless communications link in the 3.5 GHz frequency spectrum band that couples or connects wireless base station 102 to CPE device X 158. Communications links 190, 191, 192, . . . , 193 are wireless communications links in the 3.5 GHz frequency spectrum band that couples or connects wireless base station 102 to user equipment devices UE 1 116, UE 2 118, UE 3 119, . . . , UE M 120 respectively. The communications link 194 is a wireless communications link in the 3.5 GHz frequency spectrum band that couples or connects wireless base station 102 to user equipment device X1 162. The user equipment device XP 164 is not connected to the wireless base station 1 102 because it is not receiving a signal or a stronger enough signal from the wireless base station 102 to connect to the wireless base station.

Communications links 140, 143, 170, 172, 173, 176, 178, 181 are typically wired communications links or fiber optical cables. Communications links 140 couples or connect SAS 1 110 to wireless base station, e.g., CBSD 1 102.

The communications links 130, 132, . . . , 134 are Wi-Fi wireless communications links which couple or connect user equipment device 1 (UE 1) 116, user equipment device 2 (UE 2) 118, user equipment device 3 (UE 3) 119, . . . , user equipment device M 120 to Wi-Fi Access Points as shown in FIG. 1.

In the example system 100, one or more of the customer premises do not have wired or optical communications links that provide broadband services to the user devices located at the customer premises instead broadband services are provided by the wireless network, e.g., CBRS network by the wireless communications links coupling the wireless base station 102, e.g., CBRS tower base station 1 102, to the user devices located at the customer premises via direct wireless connections to the user devices and via the indirect wireless connections via the CPE device and Wi-Fi Access Points located at the customer premises.

It is to be understood that the communication links shown in system 100 are only exemplary and other network configurations and communications links may be employed that couple together the devices, base stations, access points, nodes, entities, and databases of the system 100. Elements or steps with the same reference numbers used in different figures are the same or similar and those elements or steps will not be described in detail again.

While for the sake of simplicity in explaining the invention system 100 only illustrates a single wireless base station shown as CBRS tower base station device (CBSD), two SAS devices and a few customer premises with a single CPE device servicing a few UE devices through one or more Wi-Fi Access Points, it will be appreciated that system 100 typically includes a large plurality of wireless base stations, e.g., CBRS tower base stations or CBSDs, with a large number, e.g., hundreds, of customer premises within each of the wireless base station's, e.g., CBRS tower base station's, coverage range including a CPE device which is supporting a plurality of Wi-Fi Access Points and a plurality of UE devices at the customer premises with the wireless base stations being managed by a plurality of SAS devices which are in communication with one another.

Figure 3:
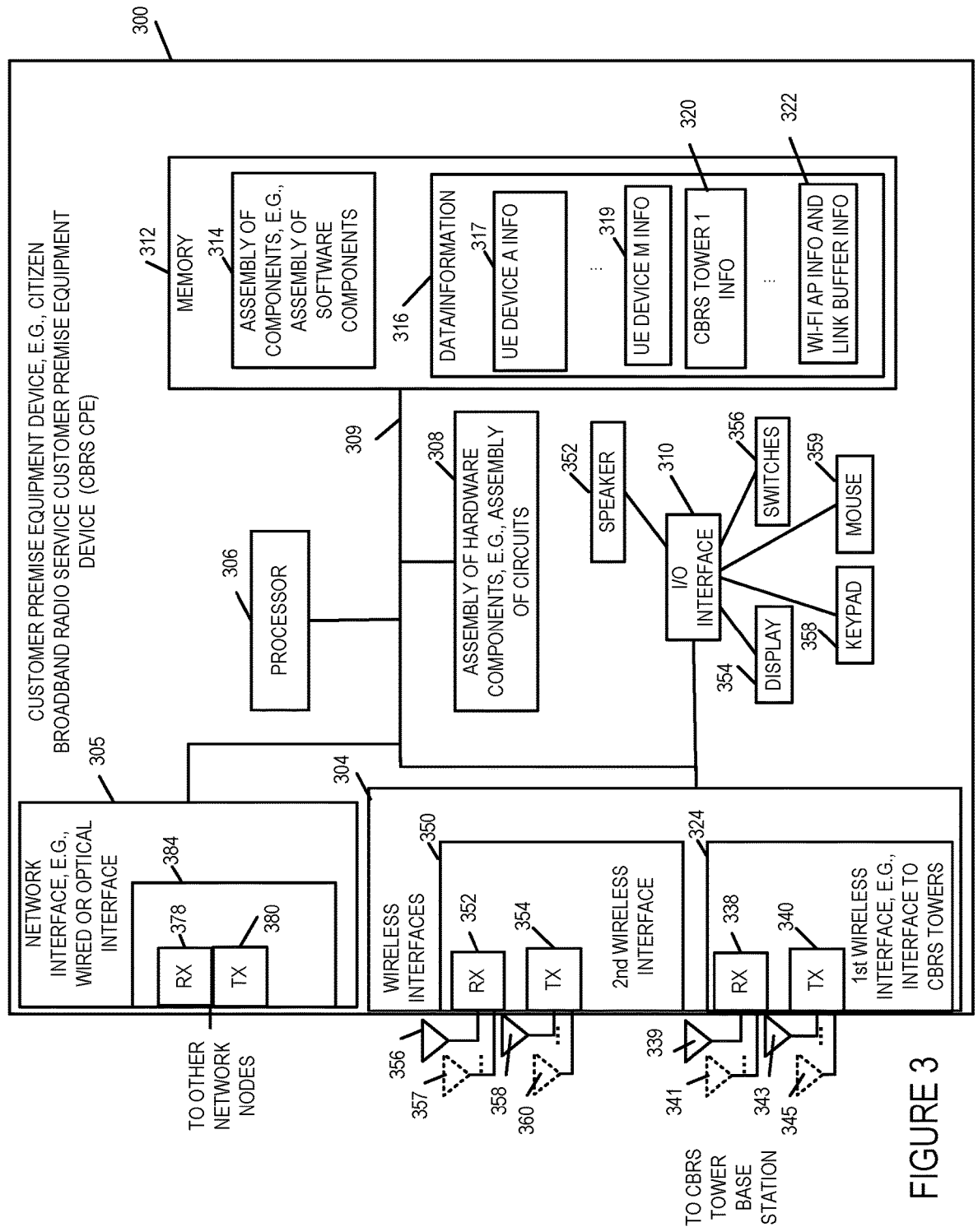
FIG. 3 illustrates details of an exemplary Customer Premises Equipment device, e.g., a Citizens Broadband Radio Service Customer Premise Equipment (CBRS CPE) device, in accordance with one embodiment of the present invention.

FIG. 3 is a drawing of an exemplary CPE device 300, e.g., a Citizens Broadband Radio Service Customer Premise Equipment device 300, in accordance with an exemplary embodiment. Exemplary CPE device 300 includes wireless interfaces 304, a network interface 305, e.g., a wired or optical interface, a processor 306, e.g., a CPU, an assembly of hardware components 308, e.g., an assembly of circuits, and I/O interface 310 and memory 312 coupled together via a bus 309 over which the various elements may interchange data and information. CPE device 300 further includes a speaker 352, a display 354, switches 356, keypad 358 and mouse 359 coupled to I/O interface 310, via which the various I/O devices (352, 354, 356, 358, 359) may communicate with other elements (304, 305, 306, 308, 312) of the CPE device 300. Network interface 305 includes a receiver 378 and a transmitter 380. In some embodiments, receiver 378 and transmitter 380 are part of a transceiver 384. Wireless interfaces 304 include a plurality of wireless interfaces including first wireless interface 324 and a second wireless interface 350. The first wireless interface 324 is used to communicate with the wireless base station, e.g., CBRS tower base station. The second wireless interface is optional and can be used to communicate with a different wireless base station than the first wireless interface for example to obtain additional backhaul capability. The first wireless interface 324 includes wireless receiver 338 and a wireless transmitter 340. In some embodiments, receiver 338 and transmitter 340 are part of a transceiver. In various embodiments, the first wireless interface 324 includes a plurality of wireless receivers and a plurality of wireless transmitters. Wireless receiver 338 is coupled to a plurality of receive antennas (receive antenna 1 339, ..., receive antenna M 341), via which CPE device 300 can receive wireless signals from other wireless communications devices including a second wireless communications device, e.g., a wireless base station, e.g., CBRS tower base station or CBSD. Wireless transmitter 340 is coupled to a plurality of wireless transmit antennas (transmit antenna 1 343, ..., transmit antenna N 345) via which the CPE device 300 can transmit signals to other wireless communications devices including a second wireless communications device, e.g., wireless base station such as a CBRS tower base station. The antennas 339, ..., 341 and 343, ..., 345 are typically mounted on the roof of the building in which the CPE device is located or on a poll at an elevated height with the other elements of the CPE device being connected to the antennas via a wired or fiber optic connection. In some embodiments the various antennas form an antenna array with the antennas pointing in different directions. In some embodiments, one or more of the antennas are included inside the housing of the CPE device and the CPE device includes one or more connections to which exterior antennas may be connected.

The second optional wireless interface 350 includes wireless receiver 352 and a wireless transmitter 354. In some embodiments, receiver 352 and transmitter 354 are part of a transceiver. In various embodiments, the second wireless interface 350 includes a plurality of wireless receivers and a plurality of wireless transmitters. Wireless receiver 352 is coupled to one or more receive antennas (receive antenna 1 356, ..., receive antenna M 357), via which CPE device 300 can receive wireless signals from other wireless communications devices including a second wireless communications device, e.g., a second wireless base station using the same or a different wireless protocol than the first wireless interface. Wireless transmitter 354 is coupled to one or more wireless transmit antennas (transmit antenna 1 358, ..., transmit antenna N 360) via which the CPE device 300 can transmit signals to other wireless communications devices including a second wireless communications device. The CPE device network interface 305 may be coupled to Wi-Fi Access Points, LAN networks, WANs, routers, e.g., WiFi routers or Access Points, so that various devices in the home without wireless interfaces can also be serviced via wired or optical links by the CPE device 300.

Memory 312 includes an assembly of components 314, e.g., an assembly of software components, and data/information 316. Data/information 316 includes UE device information corresponding to a plurality of user equipment devices (UE device A information 317, ..., UE device M information 319 where A to M are the UE devices being serviced by the CPE device) and wireless device base station information (e.g., CBRS tower base station 1 information 320) and Wi-Fi Access Point Information 322 which includes information about the Wi-Fi Access Points connected to the CPE device including link buffers and link buffer status information. In some embodiments, one or more of the CPE devices shown and/or discussed in connection with the Figures and methods discussed herein including one or more of CPE device 1 112, CPE device 2 152, ..., CPE device X 158 are implemented in accordance with CPE device 300.

Figure 4:
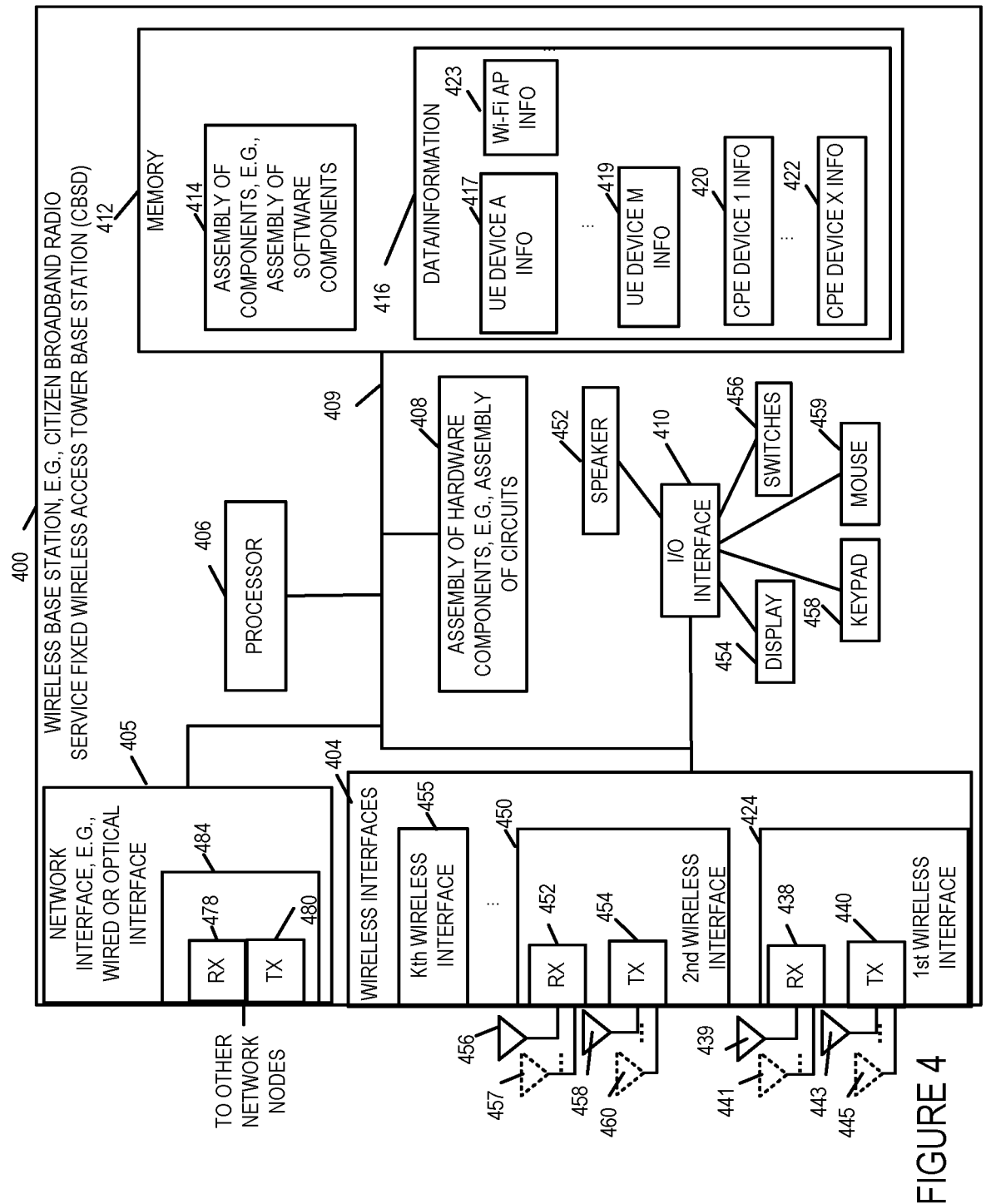
FIG. 4 illustrates details of an exemplary wireless base station, e.g., a Citizens Broadband Radio Service tower base station also referred to as Citizens Broadband Radio Service Device, in accordance with one embodiment of the present invention.

FIG. 4 is a drawing of an exemplary wireless base station 400, e.g., a Citizens Broadband Radio Service Fixed Wireless Access Tower Base Station (CBSD) 400, in accordance with an exemplary embodiment. Exemplary wireless base station 400, e.g., CBRS tower base station 400, includes a wireless interface 404, a network interface 405, e.g., a wired or optical interface, a processor 406, e.g., a CPU, an assembly of hardware components 408, e.g., an assembly of circuits, and I/O interface 410 and memory 412 coupled together via a bus 409 over which the various elements may interchange data and information. Wireless base station 400 further includes a speaker 452, a display 454, switches 456, keypad 458 and mouse 459 coupled to I/O interface 410, via which the various I/O devices (452, 454, 456, 458, 459) may communicate with other elements (404, 405, 406, 408, 412) of the wireless base station 400. Network interface 405 includes a receiver 478 and a transmitter 480. In some embodiments, receiver 478 and transmitter 480 are part of a transceiver 484. Wireless interfaces 404 include a plurality of wireless interfaces including first wireless interface 424, second wireless interface 450, ..., Kth wireless interface 455. The wireless interfaces are used to communicate with the CPE devices and UE devices. The first wireless interface 424 is used for example to communicate with a CPE device, e.g., CPE 1 112. The second wireless interface can be used to communicate with a user equipment device, e.g., UE 1 116. The first wireless interface 424 includes wireless receiver 438 and a wireless transmitter 440. In some embodiments, receiver 438 and transmitter 440 are part of a transceiver. In various embodiments, the first wireless interface 424 includes a plurality of wireless receivers and a plurality of wireless transmitters. Wireless receiver 438 is coupled to a plurality of receive antennas (receive antenna 1 439, ..., receive antenna M 441), via which wireless base station 400 can receive wireless signals from other wireless communications devices including a second wireless communications device, e.g., a CPE device or a user equipment device. Wireless transmitter 340 is coupled to a plurality of wireless transmit antennas (transmit antenna 1 443, ..., transmit antenna N 445) via which the wireless base station 400 can transmit signals to other wireless communications devices including a second wireless communications device, e.g., CPE device or a user equipment device.

The second wireless interface 450 includes wireless receiver 452 and a wireless transmitter 454. In some embodiments, receiver 452 and transmitter 454 are part of a transceiver. In various embodiments, the second wireless interface 450 includes a plurality of wireless receivers and a plurality of wireless transmitters. Wireless receiver 452 is coupled to one or more receive antennas (receive antenna 1 456, ..., receive antenna M 457), via which wireless base station 400 can receive wireless signals from other wireless communications devices including a second wireless communications device, e.g., a CPE device or UE device, using the same or a different wireless protocol than the first wireless interface. Wireless transmitter 454 is coupled to one or more wireless transmit antennas (transmit antenna 1 458, ..., transmit antenna N 460) via which the wireless base station 400 can transmit signals to other wireless communications devices including a second wireless communications device. The wireless base station network interface 405 may be coupled to SAS system, other networks, e.g., internet, or other wireless base stations.

Memory 412 includes an assembly of components 414, e.g., an assembly of software components, and data/information 416. Data/information 416 includes UE device information corresponding to a plurality of user equipment devices (UE device A information 417, ..., UE device M information 419 where A to M are the UE devices being serviced by the wireless base station), CPE device information (CPE device 1 information 420, . . . , CPE device X information 422), and Wi-Fi Access Point information 423. While the details of the first and second wireless interfaces are shown, the other wireless interfaces of the wireless base station, e.g., wireless interface K where K is an integer greater than 2 also include multiple receivers and transmitters so that the wireless base station 400 can provide wireless services to hundreds of CPE devices and thousands of user equipment devices. In some embodiments, one or more of the wireless base stations discussed and/or shown in the Figures and/or in connection with the methods discussed herein including wireless base station 102 are implemented in accordance with the wireless base station 400.

Figure 5:
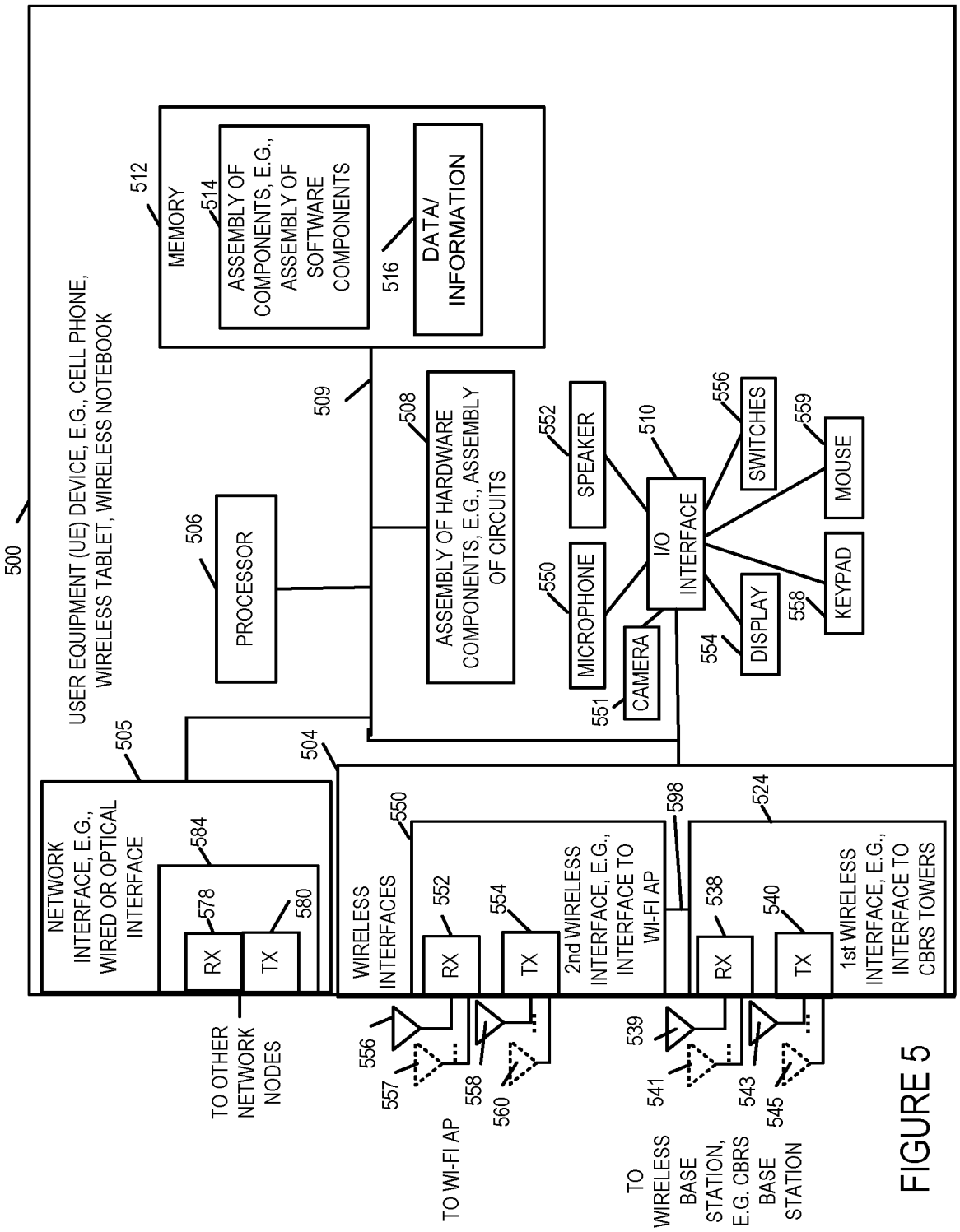
FIG. 5 illustrates details of an exemplary User Equipment (UE) device in accordance with one embodiment of the present invention.

FIG. 5 is a drawing of an exemplary user equipment (UE) device 500 in accordance with an exemplary embodiment. UE device 500 is, e.g., a computer, a mobile device such as a cell phone, a smart phone, wireless tablet or wireless notebook, a smartTV, internet cable box, internet enabled device, WiFi device. UE device 500 includes WiFi device capabilities. UE device 500 in addition to having Wi-Fi device capabilities is also enabled to communicate using at least one other wireless protocol, e.g., 5G wireless protocol, CBRS wireless protocol or cellular wireless protocol. The UE device 500 in some embodiments is a CBRS user equipment device operating at the 3.5 GHz band which also has Wi-Fi capabilities and can be operated to work in dual mode where it is capable of receiving packets from the same packet stream via two different paths or two different wireless protocol connections. For example the first path or wireless protocol connection being a Wi-Fi protocol connection or channel and a second path or wireless protocol connection being via a 5G wireless protocol connection or channel, CBRS wireless protocol connection or channel or a cellular protocol connection or channel. Exemplary UE device 500 includes wireless interfaces 504, a network interface 505, a processor 506, e.g., a CPU, an assembly of hardware components 508, e.g., an assembly of circuits, and I/O interface 510 and memory 512 coupled together via a bus 509 over which the various elements may interchange data and information. UE device 500 further includes a microphone 550, camera 551, speaker 552, a display 554, e.g., a touch screen display, switches 556, keypad 558 and mouse 559 coupled to I/O interface 510, via which the various I/O devices (550, 551, 552, 554, 556, 558, 559) may communicate with other elements (504, 505, 506, 508, 512) of the UE device. Network interface 505 includes a receiver 578 and a transmitter 580. The network interface 505 can be coupled to routers within the home or customer premises or to wired (e.g., cable) or optical (e.g., fiber-optic) networks. In some embodiments, receiver 578 and transmitter 580 are part of a transceiver 584.

Wireless interfaces 504 include a plurality of wireless interfaces including first wireless interface 524 and a second wireless interface 550. The first wireless interface 524 is used to communicate with the wireless base station, e.g., CBRS tower base station. The second wireless interface is used to communicate with a Wi-Fi Access Point. The first wireless interface 524 includes wireless receiver 538 and a wireless transmitter 540. In some embodiments, receiver 538 and transmitter 540 are part of a transceiver. In various embodiments, the first wireless interface 524 includes a plurality of wireless receivers and a plurality of wireless transmitters. Wireless receiver 538 is coupled to a plurality of receive antennas (receive antenna 1 539, . . . , receive antenna M 541), via which user equipment device 500 can receive wireless signals from other wireless communications devices including a wireless base station, e.g., wireless base station 102, e.g., CBRS tower base station or CBSD for example using 3.5 GHz bandwidth spectrum. Wireless transmitter 540 is coupled to a plurality of wireless transmit antennas (transmit antenna 1 543, . . . , transmit antenna N 545) via which the user equipment device 500 can transmit signals to other wireless communications devices including a second wireless communications device, e.g., wireless base station such as a CBRS tower base station. The antennas 539, . . . , 541 and 543, . . . , 545 are typically mounted inside the housing of the wireless device but in some embodiments are located outside the user equipment device housing. In some embodiments the various antennas form an antenna array with the antennas pointing in different directions. In some embodiments, one or more of the antennas are included inside the housing of the user equipment device and the user equipment device includes one or more connections to which exterior antennas may be connected.

The second wireless interface 550 includes wireless receiver 552 and a wireless transmitter 554. In some embodiments, receiver 552 and transmitter 554 are part of a transceiver. In various embodiments, the second wireless interface 550 includes a plurality of wireless receivers and a plurality of wireless transmitters. Wireless receiver 552 is coupled to one or more receive antennas (receive antenna 1 556, . . . , receive antenna M 557), via which user device 500 can receive wireless signals from other wireless communications devices including a second wireless communications device, e.g., a Wi-Fi Access Point using Wi-Fi protocol. Wireless transmitter 554 is coupled to one or more wireless transmit antennas (transmit antenna 1 558, . . . , transmit antenna N 560) via which the user equipment device 500 can transmit signals to other wireless communications devices including a second wireless communications device. The user equipment device network interface 505 may be coupled to LAN or WAN networks or routers so that the user equipment device can also obtain services via a hardwired connection in addition to through the wireless interfaces. In the exemplary embodiment the second wireless interface is a Wi-Fi wireless interface. The first wireless interface is connected or coupled to the second wireless interface via wire 598 so that the two interfaces can exchange information. The second wireless interface (e.g., Wi-Fi interface 550) uses the wire 598 to communicate data to the first wireless interface for processing for example when the user equipment device 500 is operating in dual mode and the user equipment device determines that the received Wi-Fi packet includes information, e.g., a 5G PDCP packet, which needs to be processed by the first wireless interface.

Memory 512 includes an assembly of components 514, e.g., an assembly of software components, and data/information 516.

In some embodiments, one or more of the user equipment devices shown in the figures or discussed herein for example in connection with the methods described including for example UE devices UE 1 116, UE 2 118, UE 3 119, . . . , UE M 120, UE X1 162, . . . , UE XP 164 are implemented in accordance with exemplary user equipment device 500.

Figure 6:
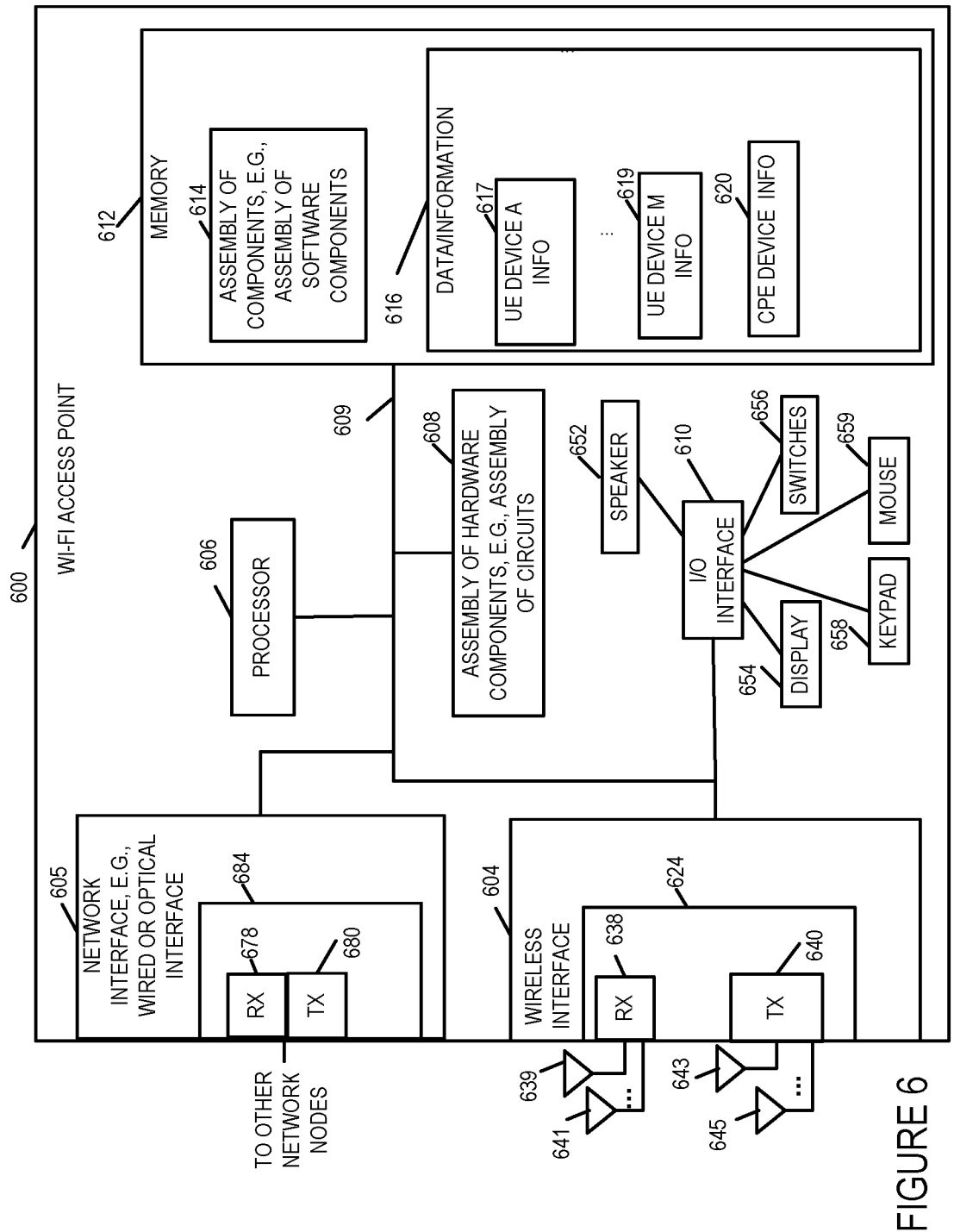
FIG. 6 illustrates details of an exemplary Wi-Fi Access Point in accordance with one embodiment of the present invention.

FIG. 6 is a drawing of an exemplary Wi-Fi Access Point 600 in accordance with an exemplary embodiment. Exemplary Wi-Fi Access Point 600 includes a wireless interface 604, e.g., a Wi-Fi interface for transmitting, receiving and processing Wi-Fi messages/packets, a network interface 605, e.g., a wired or optical interface, a processor 606, e.g., a CPU, an assembly of hardware components 608, e.g., an assembly of circuits, and I/O interface 610 and memory 612 coupled together via a bus 609 over which the various elements may interchange data and information. Wi-Fi Access Point 600 further includes a speaker 652, a display 654, switches 656, keypad 658 and mouse 659 coupled to I/O interface 610, via which the various I/O devices (652, 654, 656, 658, 659) may communicate with other elements (604, 605, 606, 608, 612) of the Wi-Fi Access Point 600. Network interface 605 includes a receiver 678 and a transmitter 680. The network interface 605 is typically connected or coupled to a wired or optical communications link or network which in turn is coupled or connected to a CPE device. In some embodiments, receiver 678 and transmitter 680 are part of a transceiver 684. Wireless interface 604 includes a wireless receiver 638 and a wireless transmitter 640. In some embodiments, receiver 638 and transmitter 640 are part of a transceiver 624. In various embodiments, wireless interface 604 includes a plurality of wireless receivers and a plurality of wireless transmitters. Wireless receiver 638 is coupled to a plurality of receive antennas (receive antenna 1 639, ..., receive antenna M 641), via which Wi-Fi Access Point 600 can receive wireless signals from other wireless communications devices including a second wireless communications device, e.g., a UE device. Wireless transmitter 640 is coupled to a plurality of wireless transmit antennas (transmit antenna 1 643, ..., transmit antenna N 645) via which the Wi-Fi Access Point 600 can transmit signals to other wireless communications devices e.g., a UE device.

Memory 612 includes an assembly of components 614, e.g., an assembly of software components, and data/information 616. Data/information 616 includes UE device information corresponding to a plurality of user equipment devices (UE device A information 617, ..., UE device M information 619 where A to M are the UE devices being serviced by the Wi-Fi Access Point) and CPE device information (CPE device 1 information) 620. The Wi-Fi Access Point includes in some embodiments multiple wireless interfaces or a wireless interface with multiple receivers and transmitters so that it can provides wireless services to a plurality of user equipment devices. In some embodiments, one or more of Wi-Fi Access Points discussed and/or shown in the Figures and/or in connection with the methods discussed herein including Wi-Fi Access Points 122, 124, ..., 126, and 160 are implemented in accordance with the Wi-Fi Access Point 600.

Figure 7:
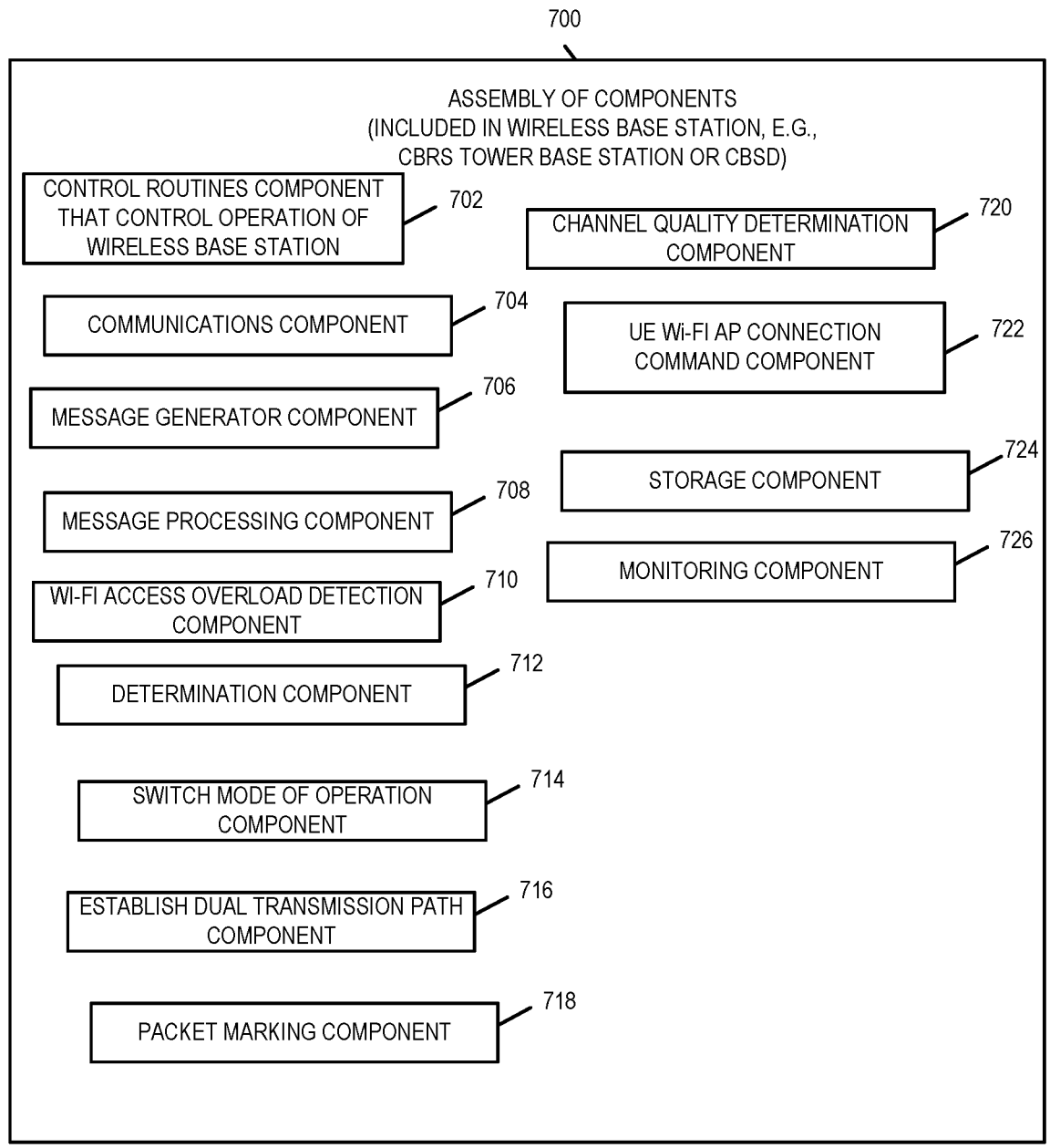
FIG. 7 illustrates an exemplary assembly of components for a wireless base station, e.g., CBRS tower base station or CBSD, in accordance with an embodiment of the present invention.

FIG. 7 is a drawing of an exemplary assembly of components 700 which may be included in a wireless base station, e.g., exemplary wireless base station 400 of FIG. 4, in accordance with an exemplary embodiment. The components in the assembly of components 700 can, and in some embodiments are, implemented fully in hardware within a processor, e.g., processor 406, e.g., as individual circuits. The components in the assembly of components 700 can, and in some embodiments are, implemented fully in hardware within the assembly of hardware components 408, e.g., as individual circuits corresponding to the different components. In other embodiments some of the components are implemented, e.g., as circuits, within processor 406 with other components being implemented, e.g., as circuits within assembly of components 408, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 412 of the wireless base station device 400, with the components controlling operation of wireless base station device 400 to implement the functions corresponding to the components when the components are executed by a processor e.g., processor 406. In some such embodiments, the assembly of components 700 is included in the memory 412 as assembly of software components 414. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 700 is stored in the memory 412, the memory 412 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the wireless base station device 400 or elements therein such as the processor 406, to perform the functions of corresponding steps illustrated and/or described in the method of one or more of the flowcharts, signaling diagrams and/or described with respect to any of the Figures. Thus the assembly of components 700 includes various components that perform functions or operations corresponding to one or more described and/or illustrated steps of an exemplary method.

Assembly of components 700 includes a control routines component 702, a communications component 704, a message generator component 706, a message processing component 708, a Wi-Fi Access Overload Detection component 710, a determination component 712, a switch mode of operation component 714, an establish dual transmission path component 716, a packet marking component 718, a channel quality determination component 720, a user equipment device Wi-Fi Access Point connection command component 722, a storage component 724 and a monitoring component 726.

The control routines component 702 is configured to control operation of the wireless base station. The communications component 704 is configured to handle communications, e.g., transmission and reception of messages, and protocol signaling for the wireless base station. The message generator component 706 is configured to generate messages for transmission to other devices. The message processing component 708 is configured to process received messages and is sometimes a sub-component of communications component 704. The determination component 712 makes various determinations for the wireless base station including determining amount of spectrum to request from the SAS, power level to use for transmissions, determining if an overload condition exists at a customer premises, determining if a downlink congestion condition exists at a customer premises, determining whether to switch from a first mode of operation to a second mode of operation, determining channel connection status of Wi-Fi connections between user equipment devices and Wi-Fi Access Points, determining channel quality for 5G or other wireless protocol connections between the wireless base station and user equipment devices. The switch mode of operation component 714 determines when the wireless base station is to switch from one mode of operation to another mode of operation and performs operations to effectuate the switching of the modes of operation at the wireless base station and at devices located at the customer premises which also require switching modes of operation. The establish dual transmission path component 716 establishes two separate transmission paths to a user equipment device at a customer premises, e.g., a first 5G wireless direct connection path to the user equipment device and a second path which contains a Wi-Fi connection as the last leg of the transmission path to the user equipment device. The packet marking component 718 marks packets for example to indicate whether the packet is designated for MAC layer conversion. In some embodiments, the packet marking component 718 marks packets as described in connection with FIG. 12. The channel quality determination component 720 determines the quality of various channels and signaling conditions for example the quality of the signaling and data transfer conditions of a direct wireless channel connection (e.g., 5G wireless channel connection) between the wireless base station and a user equipment device at a customer premises and the quality of the Wi-Fi channel connections between the Wi-Fi Access Points and the user equipment devices located at the customer premises with the Wi-Fi Access Points. The user equipment device Wi-Fi Access Point connection command component 722 generates and sends commands to manage one or more user equipment devices' Wi-Fi connections to Wi-Fi Access Points. The storage component 724 controls the storage and retrieval of information and data in the memory of the wireless base station. The monitoring component 726 monitors for different conditions to be satisfied, e.g., for a Wi-Fi Access Point overload condition to exist at a customer premises, congestion on the downlink(s) at a customer premises, or clearing of a Wi-Fi Access Point Overload Condition or the clearing of congestion on the downlink(s) at a customer premises.

Figure 8:
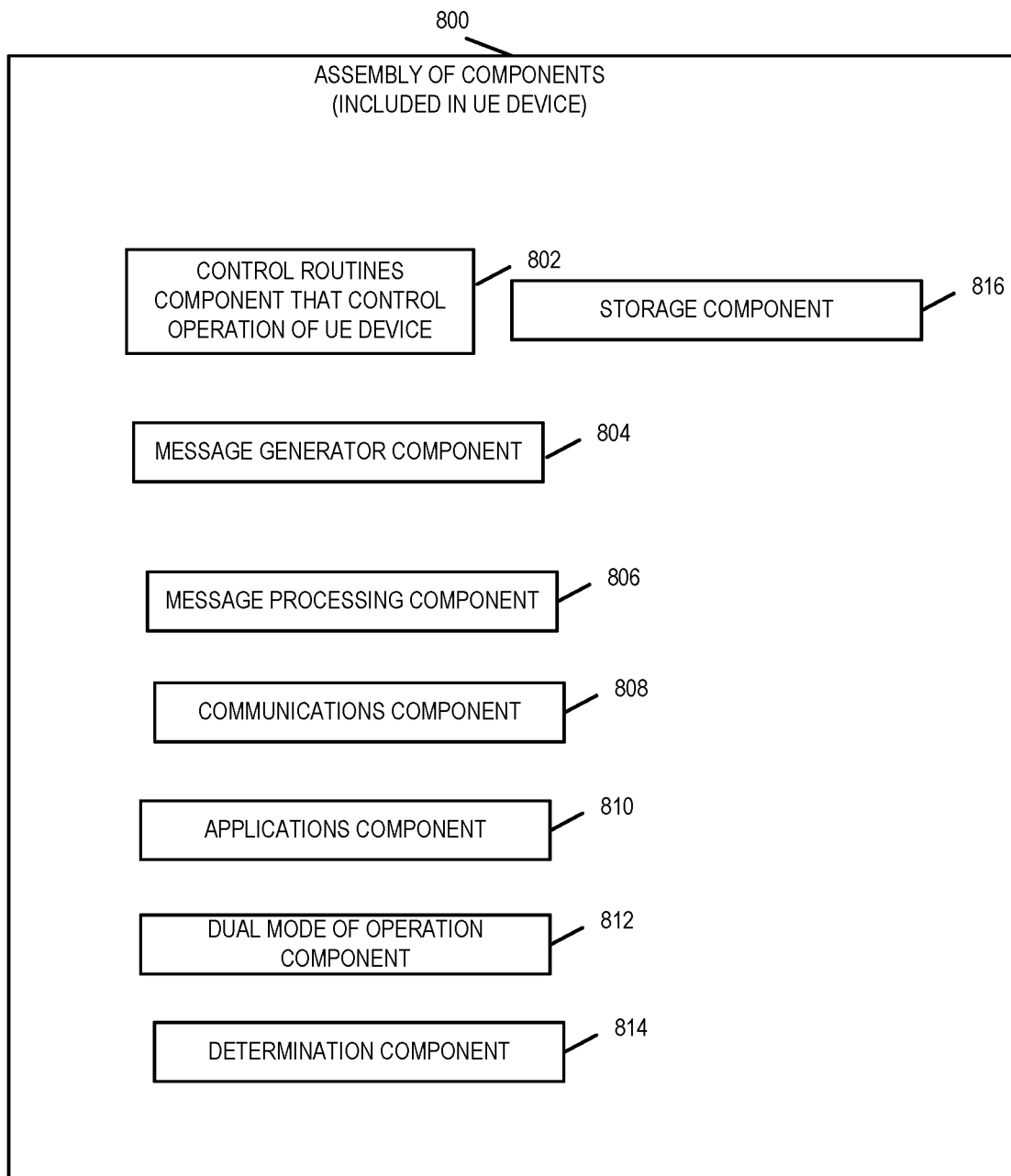
FIG. 8 illustrates an exemplary assembly of components for a user equipment device in accordance with an embodiment of the present invention.

FIG. 8 is a drawing of an exemplary assembly of components 800 which may be included in an exemplary user equipment (UE) device, e.g., UE device 500 of FIG. 5, in accordance with an exemplary embodiment. The components in the assembly of components 800 can, and in some embodiments are, implemented fully in hardware within a processor, e.g., processor 506, e.g., as individual circuits. The components in the assembly of components 800 can, and in some embodiments are, implemented fully in hardware within the assembly of hardware components 508, e.g., as individual circuits corresponding to the different components. In other embodiments some of the components are implemented, e.g., as circuits, within processor 506 with other components being implemented, e.g., as circuits within assembly of components 508, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 512 of the UE device 500, with the components controlling operation of UE device 500 to implement the functions corresponding to the components when the components are executed by a processor e.g., processor 506. In some such embodiments, the assembly of components 800 is included in the memory 512 as assembly of software components 514. In still other embodiments, various components in assembly of components 800 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the UE device 500 or elements therein such as the processor 506, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method.

Assembly of components 800 includes a control routines component 802, a message generator component 804, a message processing component 806, a communications component 808, an applications component 810, a dual mode of operation component 812, a determination component 814, and a storage component 816. The control routines component 802 is configured to control operation of the UE. The message generator component 804 is configured to generate messages for transmission to various devices including the wireless base station and the Wi-Fi Access Point to which it is connected or coupled. The message processing component 806 is configured to process messages received from other devices, e.g., a wireless base station or a Wi-Fi Access Point. In some embodiments, the message processing component 806 is a sub-component of the communications component 808. The communications component 808 is configured to handle communications, e.g., receipt and transmission of signals and provide protocol signal processing for one or more protocols for the UE. The applications component 810 is configured to provide various application services for the UE device, e.g., voice over internet protocol calling services, video on demand services, media download services, conferencing services, internet access and web browsing services, etc. The dual mode of operation component 812 is configured to establish two transmission paths for simultaneously receiving data packets using different wireless protocols (e.g., 5G wireless protocol and Wi-Fi protocol) with the data being from the same packet stream. In some embodiments, the component receives and recombines the data from the packet stream over two different wireless interfaces and combines the data based on packet identifies to correctly order the packet data. The determination component 814 is responsible for making determinations at the user equipment device including for example whether to request data services in response to user inputs, whether a packet has been marked as a Wi-Fi only packet, a 5G only packet or a 5G over Wi-Fi packet that has undergone a MAC layer conversion. The determination component also determines signal strength and quality of various communications connections/channels such as for example, Wi-Fi connections/channels between the user equipment device and Wi-Fi Access Points and 5G connections/channels between the user equipment device and one or more wireless base stations. The storage component 816 controls the storage and retrieval of information and data in the memory of user equipment device.

Figure 9:
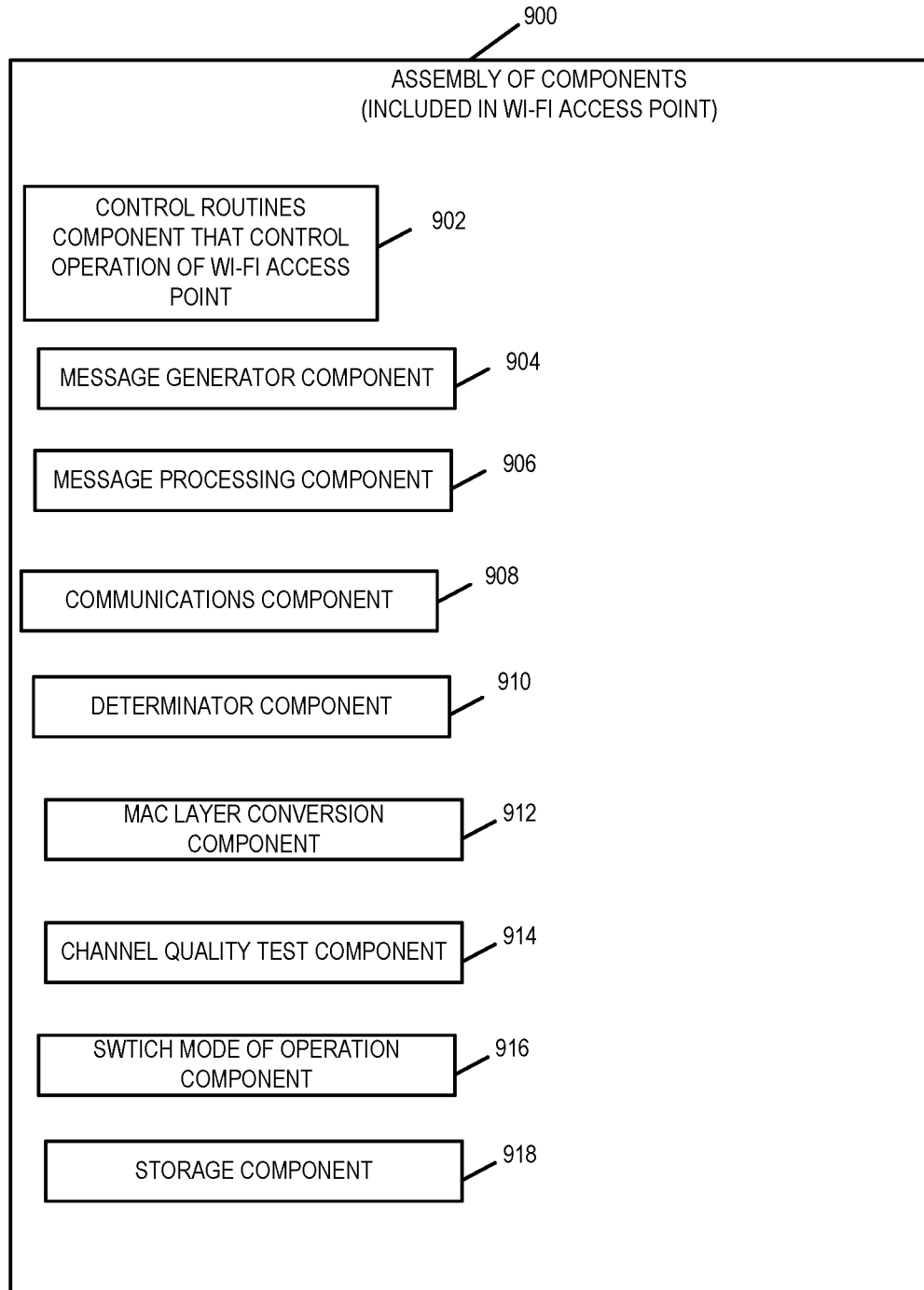
FIG. 9 illustrates an exemplary assembly of components for a Wi-Fi Access Point in accordance with an embodiment of the present invention.

FIG. 9 is a drawing of an exemplary assembly of components 900 which may be included in an exemplary Wi-Fi Access Point, e.g., exemplary Wi-Fi Access Point 600 of FIG. 6, in accordance with an exemplary embodiment. The components in the assembly of components 900 can, and in some embodiments are, implemented fully in hardware within a processor, e.g., processor 606, e.g., as individual circuits. The components in the assembly of components 900 can, and in some embodiments are, implemented fully in hardware within the assembly of hardware components 608, e.g., as individual circuits corresponding to the different components. In other embodiments some of the components are implemented, e.g., as circuits, within processor 606 with other components being implemented, e.g., as circuits within assembly of components 608, external to and coupled to the processor 606. As should be appreciated the level of integration of components on the processor and/or with some components being external to the processor may be one of design choice. Alternatively, rather than being implemented as circuits, all or some of the components may be implemented in software and stored in the memory 612 of the Wi-Fi Access Point 600, with the components controlling operation of Wi-Fi Access Point 600 to implement the functions corresponding to the components when the components are executed by a processor e.g., processor 606. In some such embodiments, the assembly of components 900 is included in the memory 612 as assembly of software components 614. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor, e.g., processor 606, configure the processor to implement the function corresponding to the component. In embodiments where the assembly of components 900 is stored in the memory 612, the memory 612 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the Wi-Fi Access Point 600 or elements therein such as the processor 606, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method.

Assembly of components 900 includes a control routines component 902, a message generator component 904, a message processing component 906, a communications component 908, a determinator component 910, a MAC layer conversion component 912, channel quality test component 914, switch mode of operation component 916, and a storage component 918.

Figure 11:
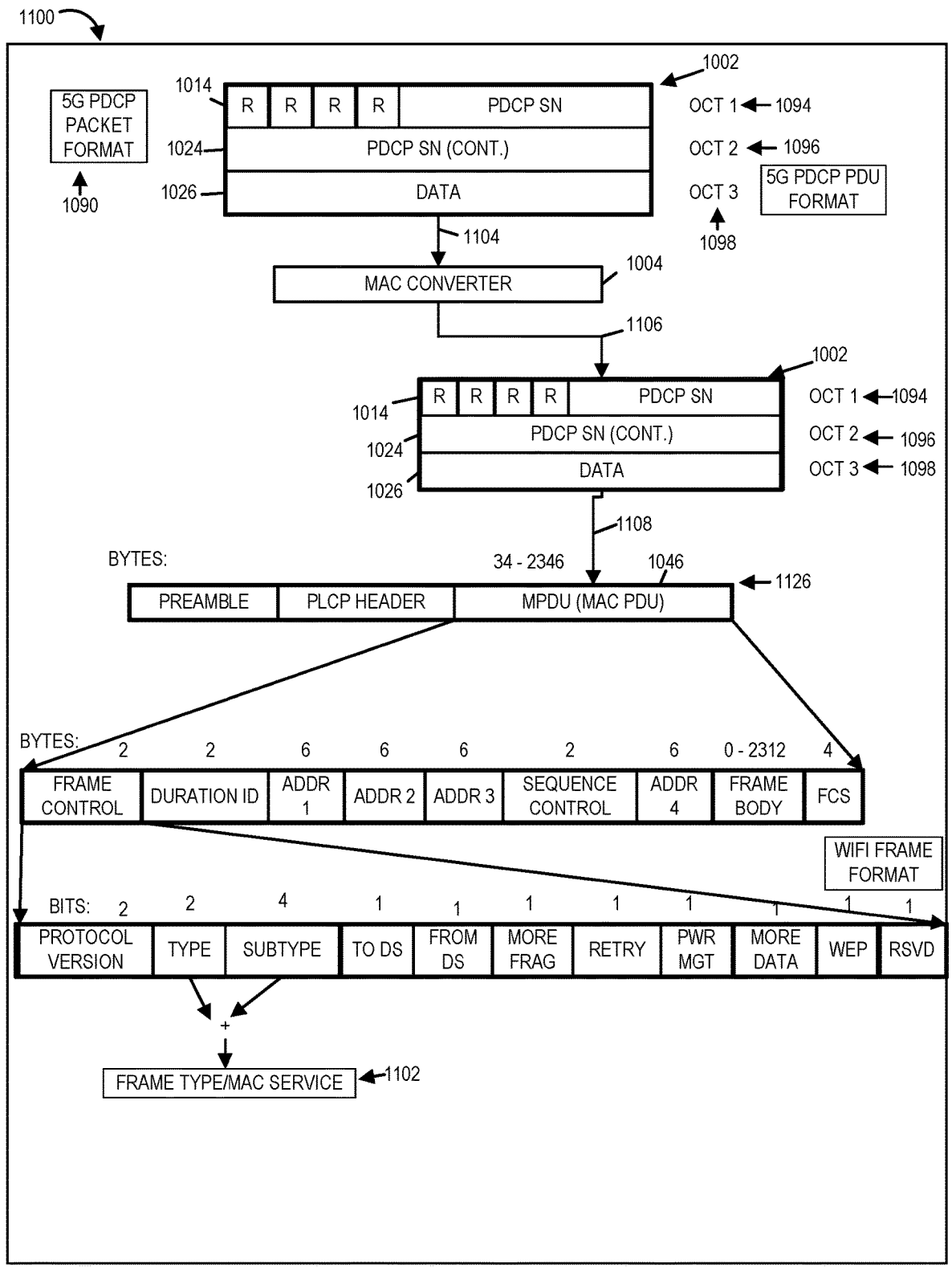
FIG. 11 illustrates a MAC layer conversion process used for example by a Wi-Fi Access Point while in a MAC coordination mode of operation in accordance with one embodiment of the present invention.

The control routines component 902 is configured to control operation of the Wi-Fi Access Point. The message generator component 904 is configured to generate messages for transmission to a CPE device and user equipment devices. The message processing component 906 processes received messages and takes actions based on the processed messages. The communications component 908 is configured to handle communications between the Wi-Fi Access Point and other devices, e.g., CPE device and user equipment devices. The determinator component 910 makes determinations for the Wi-Fi Access Point including what mode of operation to be in, e.g., Non-MAC coordination mode of operation or MAC coordination mode of operation, and a determination of which packets a MAC conversion layer operation is to be performed. The MAC layer conversion component 912 also referred to as a MAC converter component 912 performs MAC layer conversion on packets, e.g., packets designated or marked for MAC layer conversion. In some embodiments, the MAC layer conversion for a 5G packet to Wi-Fi packet includes encapsulating the 5G PDPCP Oct 1 Oct 2 and Oct 3 in a MAC PDU of a Wi-Fi frame as shown in FIG. 11. When the MAC layer conversion is not performed, only the 5G PDCP PDU (data payload 1026) is included in the WI-FI MAC PDU, i.e., Oct 1 1094 (1014) and Oct 2 1096 (1024) are not included in the MAC PDU 1046. The channel quality test component 914 performs communications channel, e.g., Wi-Fi channels/connections, quality and signaling condition tests. The switch mode of operation component 916 performs operations to switch modes of operations when commands are received to switch operating modes for example when a command or message is received from the wireless base station instructing the Wi-Fi Access Point to switch to a MAC coordination mode of operation or switch to a Non-MAC coordination mode of operation. The storage component 918 is responsible for the storage and retrieval of data and information in the memory of the Wi-Fi Access Point.

Figure 10:
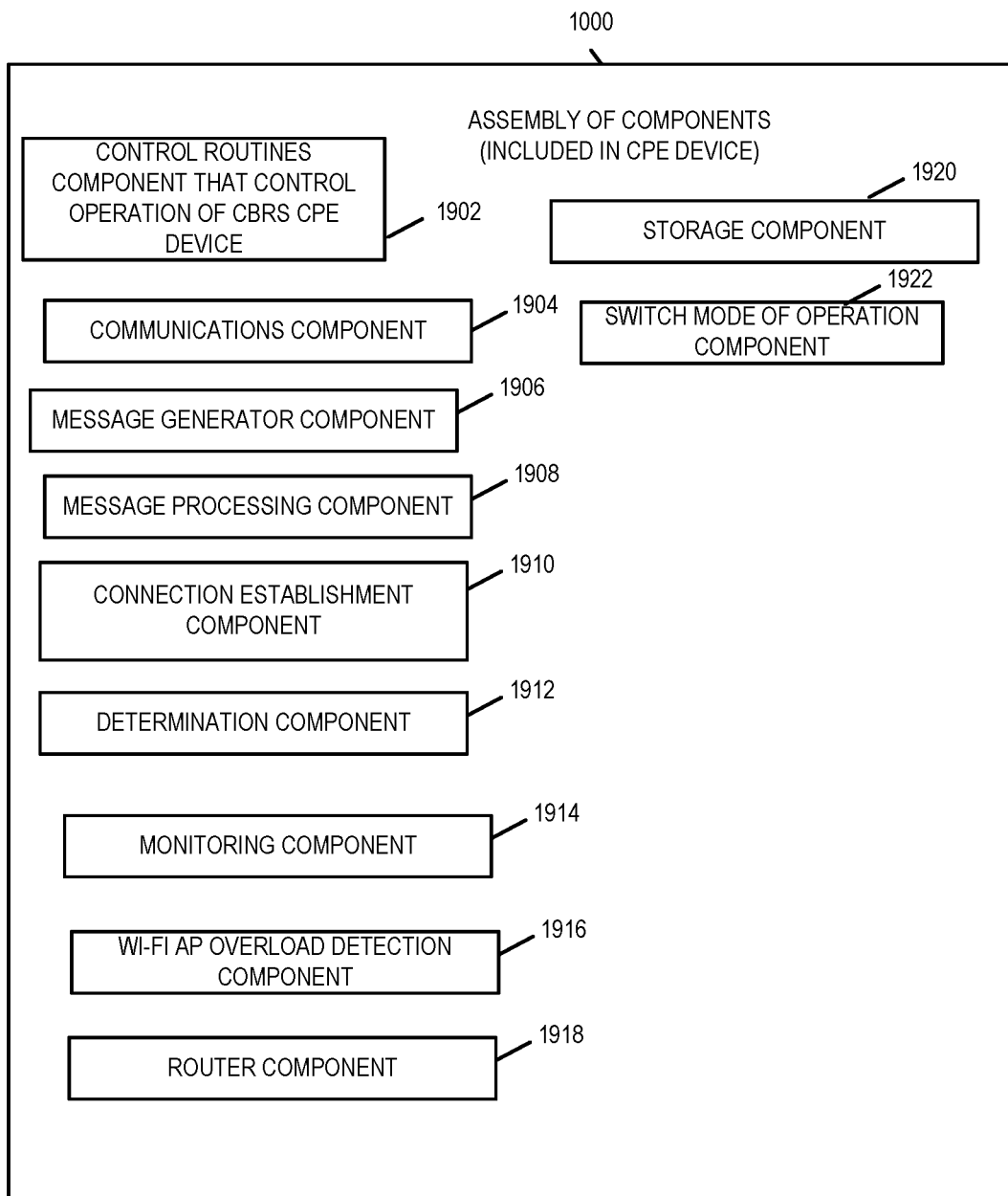
FIG. 10 illustrates an exemplary assembly of components for a customer premises equipment (CPE) device, e.g., CBRS CPE device, in accordance with an embodiment of the present invention.

FIG. 10 is a drawing of an exemplary assembly of components 1000 which may be included in an exemplary CPE device, e.g., exemplary CPE device 300 of FIG. 3, in accordance with an exemplary embodiment. The components in the assembly of components 1000 can, and in some embodiments are, implemented fully in hardware within a processor, e.g., processor 306, e.g., as individual circuits. The components in the assembly of components 1000 can, and in some embodiments are, implemented fully in hardware within the assembly of hardware components 308, e.g., as individual circuits corresponding to the different components. In other embodiments some of the components are implemented, e.g., as circuits, within processor 306 with other components being implemented, e.g., as circuits within assembly of components 308, external to and coupled to the processor 306. As should be appreciated the level of integration of components on the processor and/or with some components being external to the processor may be one of design choice. Alternatively, rather than being implemented as circuits, all or some of the components may be implemented in software and stored in the memory 312 of the CPE device 300, with the components controlling operation of CPE device 300 to implement the functions corresponding to the components when the components are executed by a processor e.g., processor 306. In some such embodiments, the assembly of components 1000 is included in the memory 312 as assembly of software components 314. In still other embodiments, various components in assembly of components 1000 are implemented as a combination of hardware and software, e.g., with another circuit external to the processor providing input to the processor which then under software control operates to perform a portion of a component's function.

When implemented in software the components include code, which when executed by a processor, e.g., processor 306, configure the processor to implement the function corresponding to the component. In embodiments where the assembly of components 1000 is stored in the memory 312, the memory 312 is a computer program product comprising a computer readable medium comprising code, e.g., individual code for each component, for causing at least one computer, e.g., processor 306, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 10 control and/or configure the CPE device 300 or elements therein such as the processor 306, to perform the functions of corresponding steps illustrated and/or described in the method of one or more of the flowcharts, signaling diagrams and/or described with respect to any of the Figures. Thus the assembly of components 1000 includes various components that perform functions of corresponding one or more described and/or illustrated steps of an exemplary method.

Assembly of components 1000 includes a control routines component 1902, a communications component 1904, message generator component 1906, a message processing component 1908, a connection establishment component 1910, a determination component 1912, a monitoring component 1914, a Wi-Fi AP overload condition detection component 1916, a router component 1918, a storage component 1920, and a switch mode of operation component 1922.

The control routines component 1902 controls the operation of the CPE device. The communications component 1904 performs operations for handling communications with other devices including generation, transmission, receiving, and processing messages, establishing connections, signal processing for different communications protocols. The message generator component 1906 generates messages, e.g., Wi-Fi AP overload condition message, MAC coordination mode message, request for Wi-Fi AP information message, acknowledgement messages. In some embodiments, the message generator component 1906 is a sub-component of communications component 1904. The message processing component 1908 processes received messages and performs operations in response to received messages.

The connection establishment component 1910 handles establishment and termination of communications connections, e.g., device to device communications connections between the wireless base station and the CPE device and the CPE device and the Wi-Fi Access Points. In some embodiments, the connection establishment component 1910 is a sub-component of communications component 1904.

The determination component 1912 makes various determinations for the CPE device including determining when a Wi-Fi Access Point Overload Condition exists or doesn't exist, when to switch from operating in Non-MAC coordination mode of operation to a MAC coordination mode of operation and when to switch from operating in a MAC coordination mode of operation to a Non-MAC coordination mode of operation. The monitoring component 1914 monitors for various conditions e.g., conditions indicative of an Wi-Fi Access Point overload condition or link congestion condition such as a downlink buffer overflow condition or a condition in which a number of packets in excess of a threshold number of packets are in a downlink buffer for a period of time. The monitoring component 1914 also monitors for conditions which indicate an overload condition no longer exists. The Wi-Fi Access Point overload detection component 1916 detects or determines when an overload condition exists for a Wi-Fi Access Point to which the CPE device is connected. The router component 1918 routes received messages to destination devices or to the next hop on the path to the destination. The storage component 1920 is responsible for the management of the storage and retrieval of data and information in the memory of the CPE device. The switch mode of operation component 1922 switches the CPE device between modes of operation in response to various conditions for example from a Non-MAC coordination mode of operation to a MAC coordination mode of operation when a MAC coordination mode of operation message or command is received from the wireless base station to which the CPE device is attached or registered.

Figure 2A:
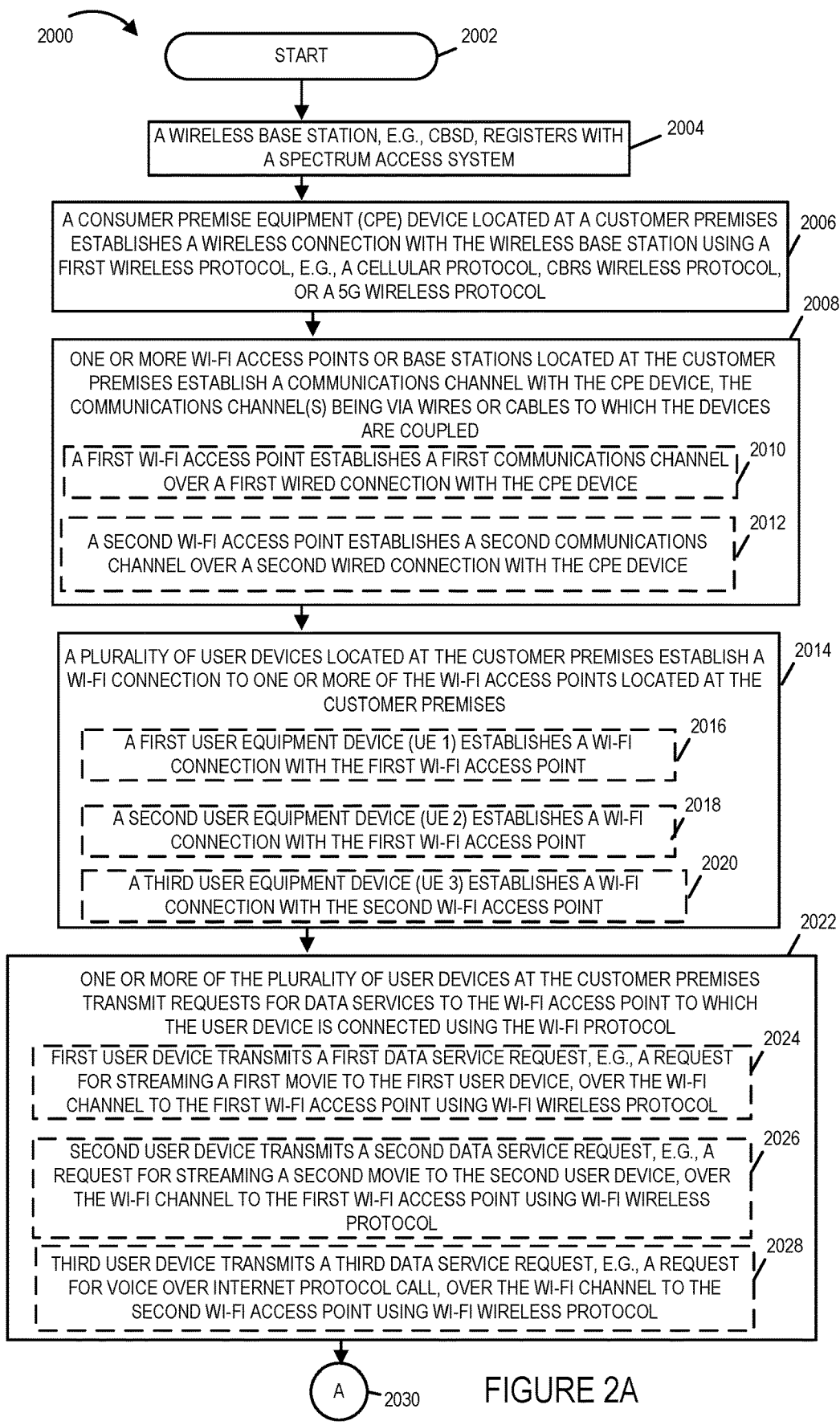
FIG. 2A illustrates the steps of the first part of an exemplary method in accordance with one embodiment of the present invention.
Figure 2B:
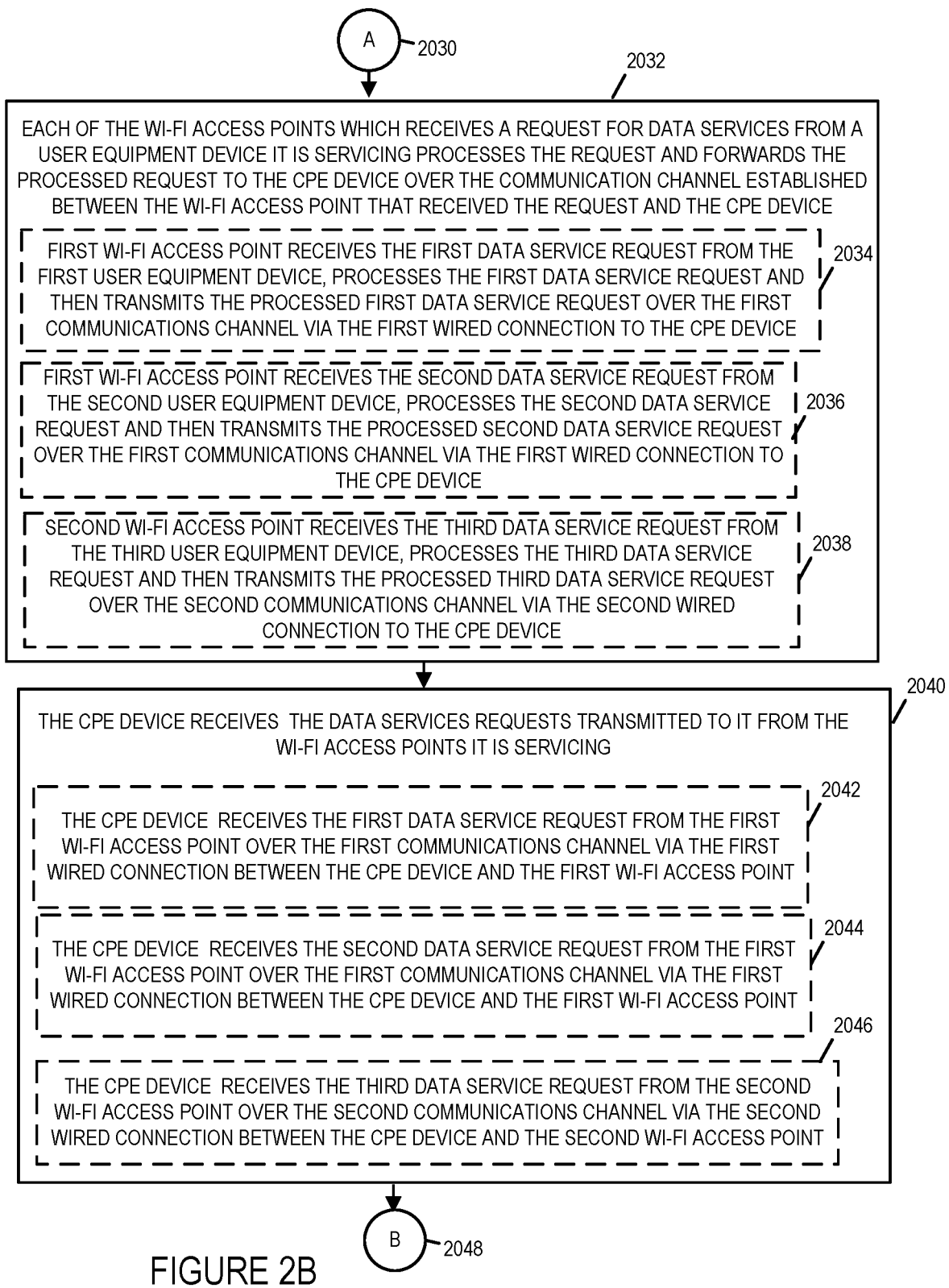
FIG. 2B illustrates the steps of the second part of an exemplary method in accordance with one embodiment of the present invention.
Figure 2C:
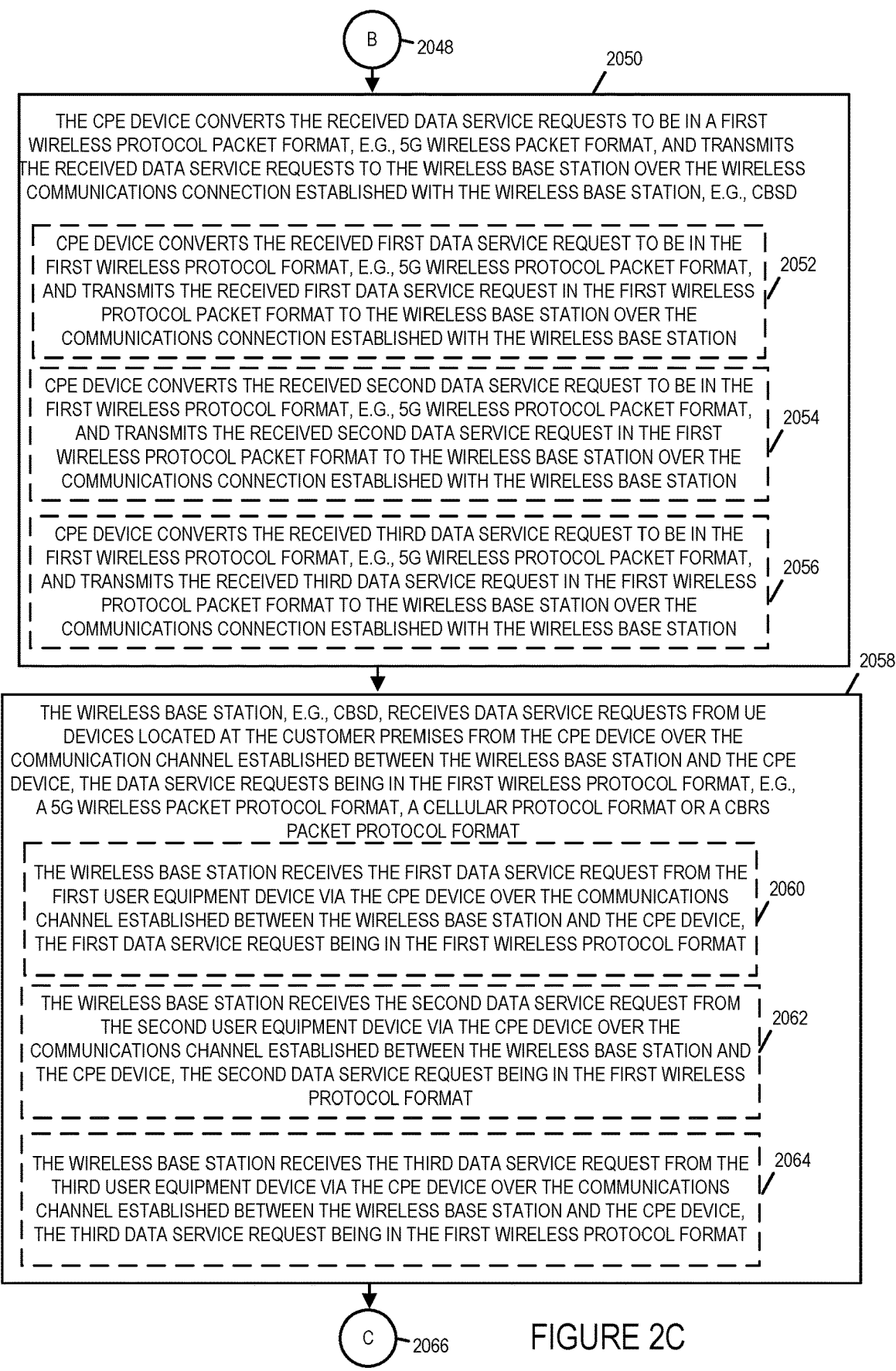
FIG. 2C illustrates the steps of the third part of an exemplary method in accordance with one embodiment of the present invention.
Figure 2E:
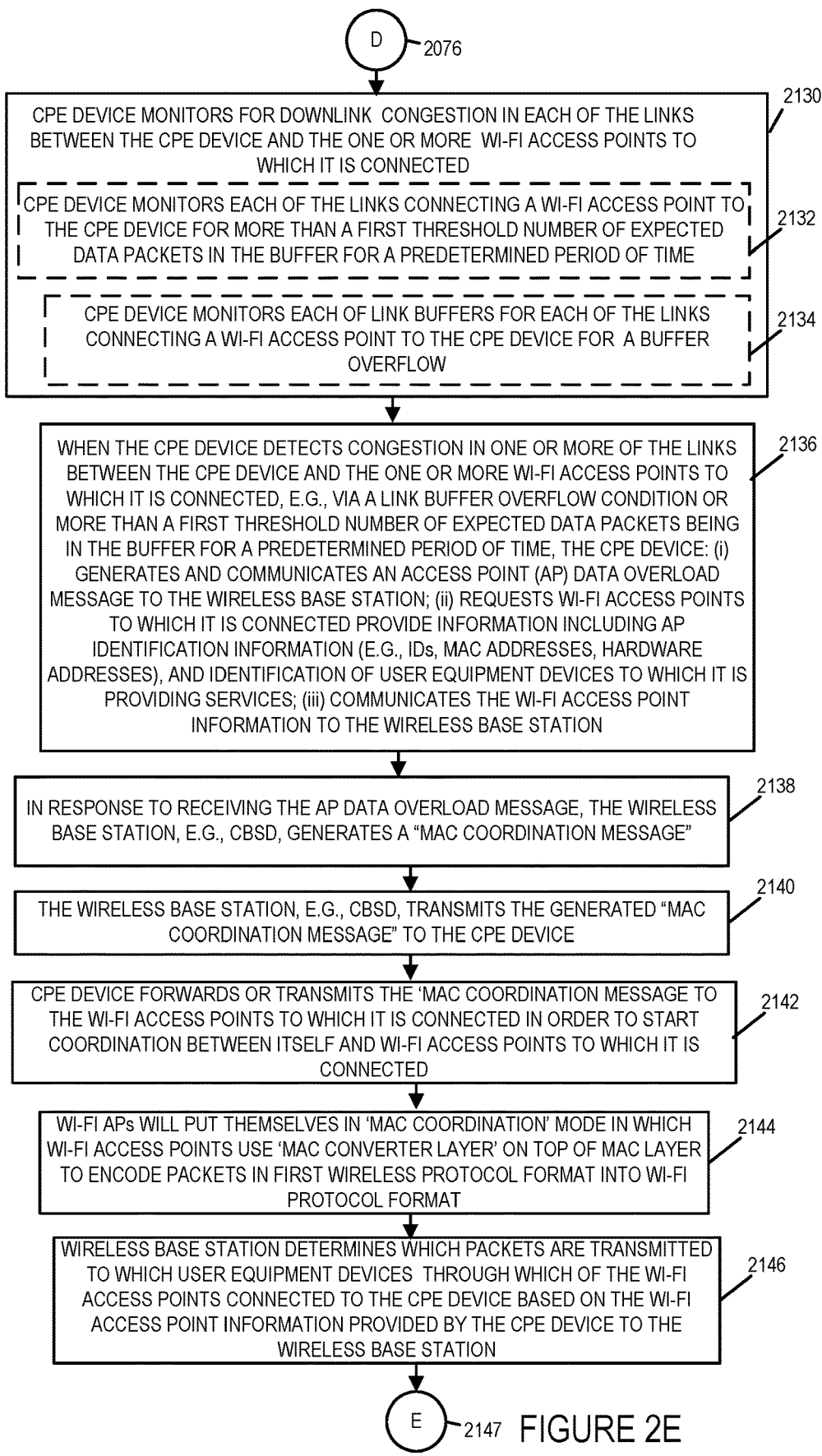
FIG. 2E illustrates the steps of the fifth part of an exemplary method in accordance with one embodiment of the present invention.
Figure 2F:
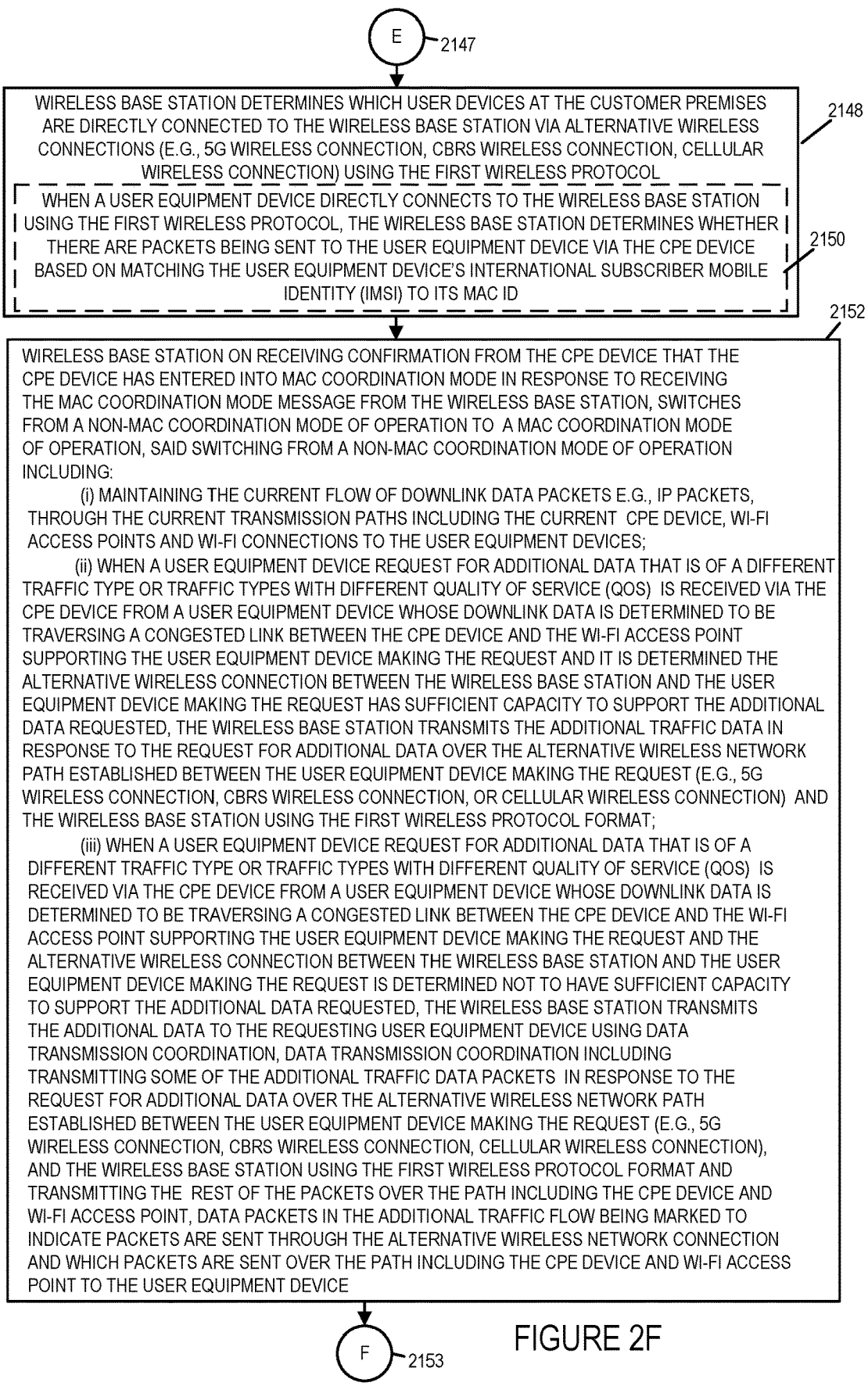
FIG. 2F illustrates the steps of the sixth part of an exemplary method in accordance with one embodiment of the present invention.
Figure 2G:
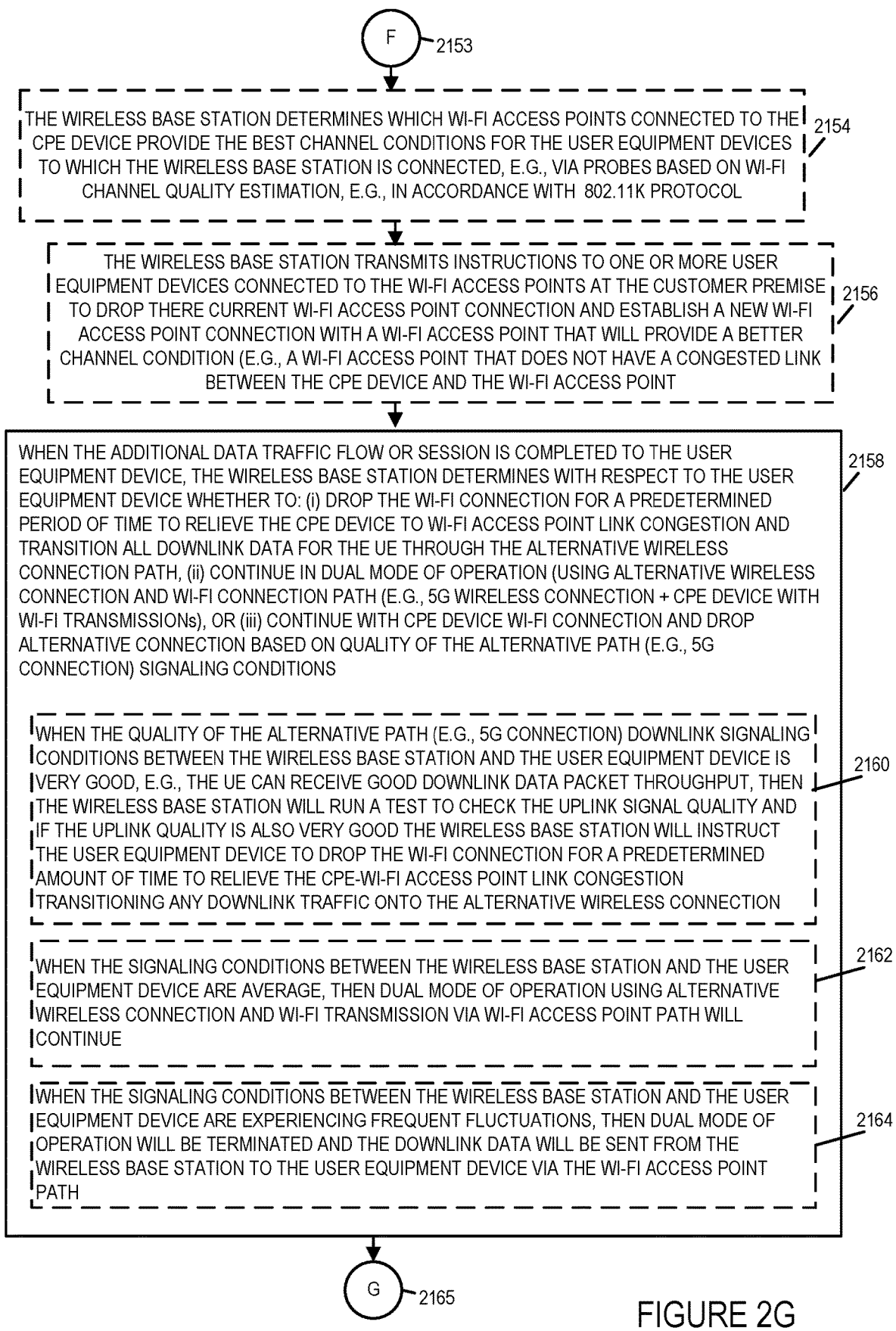
FIG. 2G illustrates the steps of the seventh part of an exemplary method in accordance with one embodiment of the present invention.
Figure 2H:
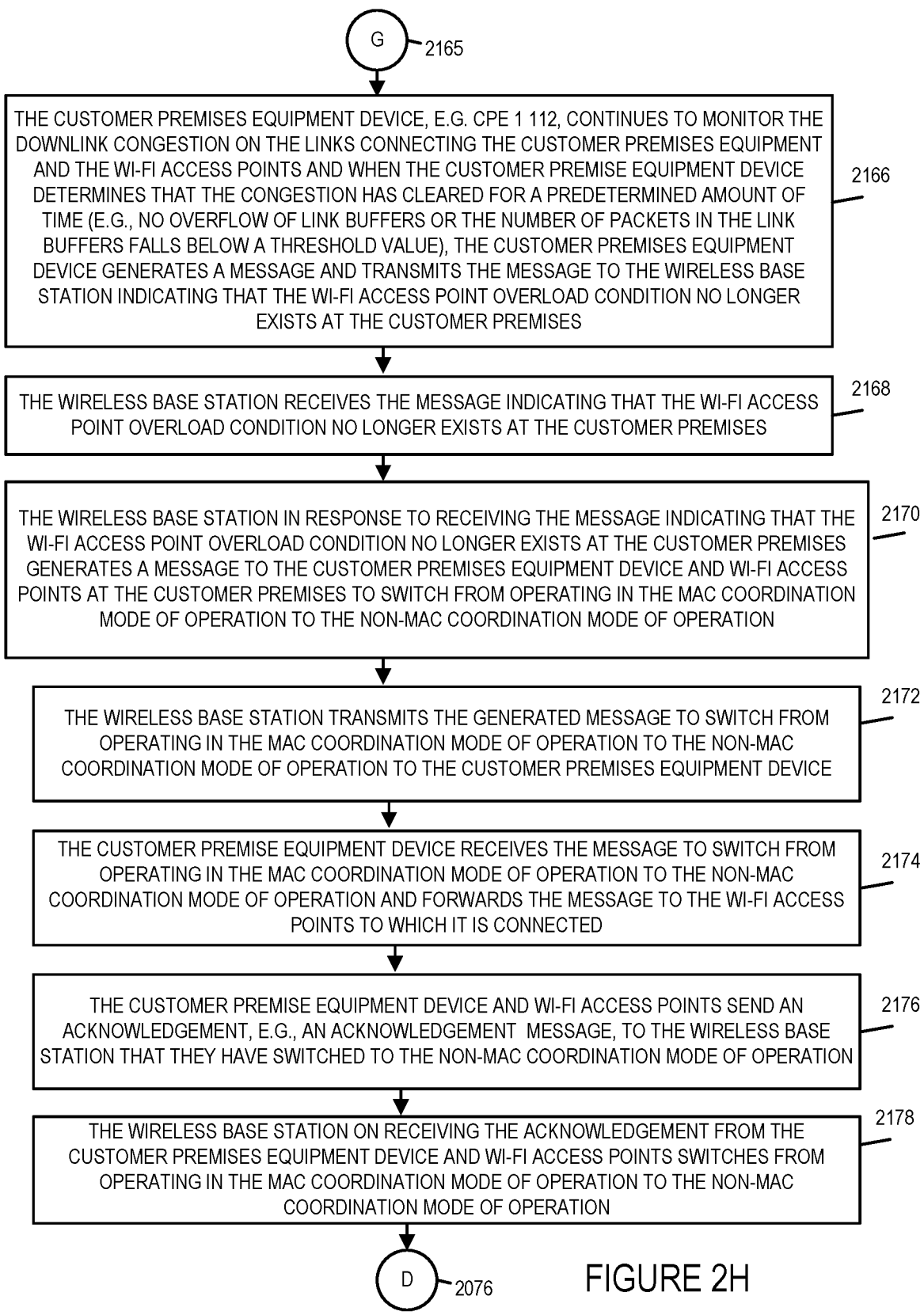
FIG. 2H illustrates the steps of the eighth part of an exemplary method in accordance with one embodiment of the present invention.

FIG. 2, which comprises the combination of FIGS. 2A, 2B, 2C, 2D, 2E, 2F, 2G, and 2H illustrates an exemplary method 2000. FIG. 2A illustrates the steps of the first part of an exemplary method 2000 in accordance with one embodiment of the present invention. FIG. 2B illustrates the steps of the second part of an exemplary method 2000 in accordance with one embodiment of the present invention. FIG. 2C illustrates the steps of the third part of an exemplary method 2000 in accordance with one embodiment of the present invention. FIG. 2D illustrates the steps of the fourth part of an exemplary method 2000 in accordance with one embodiment of the present invention. FIG. 2E illustrates the steps of the fifth part of an exemplary method 2000 in accordance with one embodiment of the present invention. FIG. 2F illustrates the steps of the sixth part of an exemplary method 2000 in accordance with one embodiment of the present invention. FIG. 2G illustrates the steps of the seventh part of an exemplary method 2000 in accordance with one embodiment of the present invention. FIG. 2H illustrates the steps of the eighth part of an exemplary method 2000 in accordance with one embodiment of the present invention.

For explanatory purposes the exemplary method 2000 will be explained in connection with the exemplary communications system 100 illustrated in FIG. 1 although it should be understand that the method may be implemented using other systems and other system configurations then those illustrated in FIG. 1. While it will be readily understood that additional steps and signaling are performed in connection with communicating information, messages, and packets between devices, the method 2000 focuses on and discusses the steps and signaling for understanding the invention.

The method 2000 shown in FIG. 2 will now be discussed in detail. The method starts in start step 2002 shown on FIG. 2A with the devices in system 100 being initialized and becoming operational. Operation proceeds from step 2002 to step 2004.

In step 2004, a wireless base station, e.g., CBSD 1 102 of system 100, registers with a spectrum access system, e.g., SAS 1 110, and obtains frequency spectrum in 3.5 GHz bandwidth to use for communicating with devices in a first wireless protocol format, e.g., a 5G wireless protocol format, CBRS wireless protocol packet format, or a cellular wireless protocol format. Operation proceeds from step 2004 to step 2006.

In step 2006, a consumer premise equipment (CPE) device, e.g., CPE 1 112 of system 100, located at customer premises (e.g., customer premises 1 114) establishes a wireless connection also referred to as a wireless channel or path with the wireless base station, e.g., CBSD 1 102, using a first wireless protocol (e.g., a 5G wireless protocol, CBRS wireless protocol, or a cellular wireless protocol). The wireless connection established between the wireless base station and the CPE device being in the 3.5 GHz wireless frequency band allocated for CBRS networks in the exemplary system 100. The CPE device establishes this connection between the CPE device and the wireless base station for, among things, use in providing Radio Frequency (RF) backhaul. Operation proceeds from step 2006 to step 2008.

In step 2008, one or more Wi-Fi Access Points (Wi-Fi APs) or Wi-Fi base stations (e.g., Wi-Fi AP 1 122, Wi-Fi AP 2 124, . . . , Wi-Fi AP N 126) located at the customer premises establish a communications channel with the CPE device (112) via wired connections (e.g., links 121, 123, . . . , 125). In some embodiments, the communications channels established between the one or more Wi-Fi APs and the CPE device are coupled together or connect via wired or optical cable connections. Step 2008 in some embodiments includes one or more sub-steps 2010 and 2012. In sub-step 2010, a first Wi-Fi Access Point (e.g., Wi-Fi Access Point 1 122) establishes a first communications channel over a first wired connection (e.g., link 121) with the CPE device (e.g., CPE device 1 112). In sub-step 2012, a second Wi-Fi Access Point (e.g., Wi-Fi Access Point 2 124) establishes a second communications channel over a second wired connection (e.g., link 123) with the CPE device (e.g., CPE device 1 112). Operation proceeds from step 2008 to step 2014.

In step 2014, one or more and in some embodiments a plurality of user devices located at the customer premises establish a Wi-Fi connection to one or more of the Wi-Fi Access Points located at the customer premises. In some embodiments, the step 2014 includes one or more sub-steps 2016, 2018, and 2020. In sub-step 2016, a first user equipment device (e.g., UE 1 116 of system 100), establishes a Wi-Fi connection with the first Wi-Fi Access Point (e.g., Wi-Fi AP 1 122) via wireless communications link 130. In sub-step 2018, a second user equipment device (e.g., UE 2 118 of system 100), establishes a Wi-Fi connection with the first Wi-Fi Access Point (e.g., Wi-Fi AP 1 122) via wireless communications link 132. In sub-step 2020, a third user equipment device (e.g., UE 3 119 of system 100), establishes a Wi-Fi connection with the second Wi-Fi Access Point (e.g., Wi-Fi AP 1 124) via wireless communications link 134. Operation proceeds from step 2014 to step 2022.

In step 2022, one or more of the user equipment devices at the customer premises, e.g., one or more of the plurality of user equipment devices UE 1, UE 2, UE 3 at customer premises 1 114, transmits a request for data services to the Wi-Fi Access Point to which the user device is connected using Wi-Fi wireless protocol. In some embodiments, step 2022 includes one or more sub-steps 2024, 2026, and 2028.

In sub-step 2024, the first user device, e.g., UE 1 116, transmits a first data service request, e.g., a request for streaming a first movie to the first user device, over the Wi-Fi channel or link, e.g., wireless link 130, to the first Wi-Fi Access Point, e.g., Wi-Fi AP 1 122, using the Wi-Fi wireless protocol.

In sub-step 2026, the second user device, e.g., UE 2 118, transmits a second data service request, e.g., a request for streaming a second movie to the second user device, over the Wi-Fi channel or link, e.g., wireless link 132, to the first Wi-Fi Access Point, e.g., Wi-Fi AP 1 122, using the Wi-Fi wireless protocol.

In sub-step 2028, the third user device, e.g., UE 3 119, transmits a second data service request, e.g., a request to establish a Voice Over Internet Protocol call, over the Wi-Fi channel or link, e.g., wireless link 134, to the second Wi-Fi Access Point, e.g., Wi-Fi AP 2 124, using the Wi-Fi wireless protocol.

Operation proceeds from step 2022 via connection node A 2030 to step 2032 shown on FIG. 2B. In step 2032, each of the Wi-Fi Access Points which receives a request for data services from a user equipment device it is servicing processes the request and forwards or transmits the request to the CPE device over the communications channel established between the Wi-Fi Access Point that received the request and the CPE device. In some embodiments, step 2032 includes one or more sub-steps 2034, 2036, and 2038. In sub-step 2034, the first Wi-Fi Access Point, e.g., Wi-Fi AP 1 122, receives the first data service request from the first user equipment device (e.g., UE 1 116), processes the first data service request and then transmits the first data service request over the first communications channel via the first wired connection or link (e.g., link 121) to the CPE device (e.g., CPE 1 112) located at the customer premises (e.g., customer premises 1 114). In sub-step 2036, the first Wi-Fi Access Point, e.g., Wi-Fi AP 1 122, receives the second data service request from the second user equipment device (e.g., UE 2 118), processes the second data service request and then transmits the second data service request over the first communications channel via the first wired connection or link (e.g., link 121) to the CPE device (e.g., CPE 1 112) located at the customer premises (e.g., customer premises 1 114). In sub-step 2038, the second Wi-Fi Access Point, e.g., Wi-Fi AP 2 124, receives the third data service request from the third user equipment device (e.g., UE 3 119), processes the third data service request and then transmits the third data service request over the second communications channel via the second wired connection or link (e.g., link 123) to the CPE device (e.g., CPE 1 112) located at the customer premises (e.g., customer premises 1 114). The receiving, processing and transmission operations in step 2032 and sub-steps 2034, 2036 and 2038 may be, and in some embodiments are, implemented as separate steps. Operation proceeds from step 2032 to step 2040.

In step 2040, the CPE device receives the data services requests transmitted to it from the Wi-Fi Access Points it is servicing. In some embodiments, step 2040 includes one or more sub-steps 2042, 2044, and 2046. In sub-step 2042, the CPE device, e.g., CPE 1 112, receives the first data service request from the first Wi-Fi Access Point, e.g., Wi-Fi AP 1 122 over the first communications channel via the first wired connection or link, e.g., link 121, between the CPE device and the first Wi-Fi Access Point. In sub-step 2044, the CPE device, e.g., CPE 1 112, receives the second data service request from the first Wi-Fi Access Point, e.g., Wi-Fi AP 1 122 over the first communications channel via the first wired connection or link, e.g., link 121, between the CPE device and the first Wi-Fi Access Point. In sub-step 2046, the CPE device, e.g., CPE 1 112, receives the third data service request from the second Wi-Fi Access Point, e.g., Wi-Fi AP 2 124 over the second communications channel via the second wired connection or link, e.g., link 123, between the CPE device and the second Wi-Fi Access Point. While only 3 user equipment devices are described as connecting to Wi-Fi Access Points and requesting data services in this exemplary method embodiment it should be understood that typically most if not all of the user equipment devices, end point devices and terminals at the customer premises connect to one of the WiFi Access Points located at the customers premises and send requests for services, e.g., data services to the CPE device located at the customer premises. Operation proceeds from step 2046 via connection node B 2048 to step 2050 shown on FIG. 2C.

In step 2050, the CPE device converts the received data service requests to be in a first wireless protocol format, e.g., a 5G wireless protocol format, CBRS wireless protocol format, or a cellular wireless protocol format and transmits the received data service requests to the wireless base station over the wireless communications connection or link (e.g., link 166) established with the wireless base station, e.g., CBSD 1 102. In some embodiments, the CPE device generates data service requests in a first wireless protocol format from the data service requests received from Wi-Fi Access Points located at the customer premises. The CPE device works as a bridge, between the Wi-Fi Access Points at the customer premises and the wireless base station, e.g., CBSD 1 102, which provides protocol conversion. Step 2050 includes one or more sub-steps 2052, 2054, and 2056.

In sub-step 2052, the CPE device converts the received first data service request to a first wireless protocol format, e.g., a 5G wireless protocol format, a CBRS wireless protocol format, or a cellular protocol format, and transmits the received first data request in the first wireless protocol format to the wireless base station, e.g., CBSD 1 102, over the communication connection or link e.g., wireless link 166, established with the wireless base station. In some embodiments, the CPE device generates a first data service request in a first wireless protocol format from the first data service request received from first Wi-Fi Access Point located at the customer premises and transmits the generated first data service request in the first wireless protocol format to the wireless base station over the established wireless connection or link.

In sub-step 2054, the CPE device converts the received second data service request to a first wireless protocol format, e.g., a 5G wireless protocol format, a CBRS wireless protocol format, or a cellular protocol format, and transmits the received second data request in the first wireless protocol format to the wireless base station, e.g., CBSD 1 102, over the communication connection or link e.g., wireless link 166, established with the wireless base station. In some embodiments, the CPE device generates a second data service request in a first wireless protocol format from the second data service request received from the first Wi-Fi Access Point located at the customer premises and transmits the generated second data service request in the first wireless protocol format to the wireless base station over the established wireless connection or link.

In sub-step 2056, the CPE device converts the received third data service request to a first wireless protocol format, e.g., a 5G wireless protocol format, a CBRS wireless protocol format, or a cellular protocol format, and transmits the received third data request in the first wireless protocol format to the wireless base station, e.g., CBSD 1 102, over the communication connection or link e.g., wireless link 166, established with the wireless base station. In some embodiments, the CPE device generates a third data service request in a first wireless protocol format from the third data service request received from second Wi-Fi Access Point located at the customer premises and transmits the generated third data service request in the first wireless protocol format to the wireless base station over the established wireless connection or link.

In some embodiments, the operations of receiving the data requests, converting the data requests to the first wireless format or generating data requests in the first wireless format based on the received data requests, and transmitting the data requests in the first wireless format to the wireless base station are implemented as separate steps. Operation proceeds from step 2050 to step 2058.

In step 2058, the wireless base station, e.g., CSBD 1 102, receives data service requests from user equipment devices located at the customer premises, e.g., customer premises 1 114, from the CPE device, e.g., CPE 1 112, over the communication connection/channel/link, e.g., link 166, established between the wireless base station, e.g, CBSD 1 102, and the CPE device, e.g., CPE 1 112. The data service requests being in a first wireless protocol format in accordance with the first wireless protocol, e.g., 5G wireless protocol, a CBRS wireless protocol, or a cellular wireless protocol being used for the wireless connection, e.g., link 166. Step 2058 in some embodiments includes one or more sub-steps 2060, 2062, and 2064.

In sub-step 2060, the wireless base station receives the first data service request from the first user equipment device via the CPE device over the wireless communications connection or link established between the CPE device and the wireless base station, e.g., link 166. The first data service request being in the first wireless protocol format in accordance with the first wireless protocol being utilized for communications between the CPE device and the wireless base station.

In sub-step 2062, the wireless base station receives the second data service request from the second user equipment device via the CPE device over the wireless communications connection or link established between the CPE device and the wireless base station, e.g., link 166. The second data service request being in the first wireless protocol format in accordance with the first wireless protocol being utilized for communications between the CPE device and the wireless base station.

In sub-step 2064, the wireless base station receives the third data service request from the third user equipment device via the CPE device over the wireless communications connection or link established between the CPE device and the wireless base station, e.g., link 166. The third data service request being in the first wireless protocol format in accordance with the first wireless protocol being utilized for communications between the CPE device and the wireless base station.

Operation proceeds from step 2058 via connection node C 2066 to step 2068 shown on FIG. 2D. In step 2068, the wireless base station, e.g., CBSD 1 102, transmits data to the user equipment devices from which it received a data service request in response to the received data service requests. The data being transmitted in the first wireless protocol format over the wireless connection, channel or link, e.g., wireless communications link 166, established between the CPE device, e.g., CPE 1 112, and the wireless base station, e.g., CBSD 1 102. The data may be, and typically is, communicated to the wireless base station from a data service provider located in a network coupled to the CBRS network, e.g., the Internet 190, in response to the data service requests being forwarded to the data service provider. The data for each user equipment device being transmitted in the first wireless protocol format over the wireless connection established between the wireless base station and the CPE device and being received at the CPE device. The CPE device communicating the received data to the Wi-Fi Access Point servicing the UE device to which the data is sent over a link, e.g., a wired link connecting the Wi-Fi Access Point to the CPE device. The data being received at the Wi-Fi Access Point. The Wi-Fi Access Point converting the data into a Wi-Fi format and transmitting it to the user equipment device over a Wi-Fi communications channel or link to the UE device to which the data was sent. The UE device receives the data in the Wi-Fi format at the UE device's Wi-Fi interface and processes the data. In some embodiments, each packet of data includes one or more flags which indicate whether the packet is a packet including data in a Wi-Fi format or is a packet including a MAC packet data unit with data in the first wireless protocol packet format (e.g., 5G PDCP packet format) as explained in detail below and in connection with FIGS. 11 and 12. In this case the flag or flags would indicate that the data is in Wi-Fi data format and belongs to a packet stream that is being sent via a single path (Wi-Fi only path). The operations of sending, receiving, generating and converting while described in a single step may be performed as separate steps at each of the devices which is performing the operation. In some embodiments, step 2068 includes one or more sub-steps 2070, 2072, and 2074.

In sub-step 2070, the wireless base station transmits a first set of data packets to the first user equipment device, e.g., UE 1 116, in response to the first data service request it received from the first user equipment device. The first set of data packets being transmitted to the CPE device for delivery to the first user equipment device in the first wireless protocol format over the wireless connection or link (e.g., link 166) established between the CPE device and wireless base station. The first set of data packets belonging to a packet stream whose packets are sent over a single path to the user equipment device. The packets being received at the CPE device, e.g, CPE 1 112, in the first wireless format and being communicated by the CPE device to the Wi-Fi Access Point (e.g., Wi-Fi AP 1 122) servicing the user equipment device (e.g., UE 1 116) to which the first set of data packets are being sent. The packets being communicated over the communications link (e.g., link 121) connecting the CPE device (e.g., CPE 1 112) and Wi-Fi Access Point (e.g., Wi-Fi AP 1 122). The packets being received at the Wi-Fi Access Point. The Wi-Fi Access Point converts the packets into Wi-Fi packets or generates Wi-Fi packets based on the received packets and transmits the converted or generated Wi-Fi packets to the first user equipment (e.g., UE 1 116) in Wi-Fi format over the Wi-Fi channel or link (e.g., link 130) connecting the Wi-Fi Access Point (e.g., Wi-Fi AP 1 122) to the first user equipment device (e.g., UE 1 116). The first user equipment device, e.g., UE 1 116 receives the packets of the first set of packets at its Wi-Fi interface. The first user equipment device checks whether the packet is marked as containing data in Wi-Fi data format and if so processes the data otherwise sends over a link (e.g., a wire or trace) the information in the Wi-Fi MAC data packet unit to another wireless interface (e.g., an interface handling data in the first wireless format such as a 5G interface if the first wireless format is a 5G format). In this example, the packets of the first set of packets are marked as containing a MAC packet data unit containing data in the Wi-Fi data format and the Wi-Fi interface of the first user equipment device processes the received data.

In sub-step 2072, the wireless base station transmits a second set of data packets to the second user equipment device, e.g., UE 2 118, in response to the second data service request it received from the second user equipment device. The second set of data packets being transmitted to the CPE device for delivery to the second user equipment device (e.g., UE 2 118) in the first wireless protocol format over the wireless connection or link, e.g., link 166, established between the CPE device and wireless base station. The second set of data packets belonging to a packet stream whose packets are sent over a single path to the user equipment device. The packets being received at the CPE device, e.g, CPE 1 112, in the first wireless format and being communicated by the CPE device to the Wi-Fi Access Point (e.g., Wi-Fi AP 1 122) servicing the second user equipment device (e.g., UE 2 118) to which the second set of data packets are being sent. The packets being communicated over the communications link (e.g., link 121) connecting the CPE device (e.g., CPE 1 112) and Wi-Fi Access Point (e.g., Wi-Fi AP 1 122). The packets being received at the Wi-Fi Access Point. The Wi-Fi Access Point converts the packets into Wi-Fi packets or generates Wi-Fi packets based on the received packets and transmits the converted or generated Wi-Fi packets to the second user equipment (e.g., UE 2 118) in Wi-Fi format over the Wi-Fi channel or link (e.g., link 132) connecting the Wi-Fi Access Point (e.g., Wi-Fi AP 1 122) to the second user equipment device (e.g., UE 2 118). The second user equipment device (e.g., UE 2 118) receives each of the packets at its Wi-Fi interface. The second user equipment device checks whether the packet is marked as containing data in Wi-Fi data format and if so processes the data otherwise sends over a link (e.g., a wire or trace) the information in the Wi-Fi MAC data packet unit to another wireless interface at the user equipment device (e.g., an interface handling data in the first wireless format such as a 5G interface if the first wireless format is a 5G wireless format). In this example, each of the packets of the second set of packets are marked as containing a MAC packet data unit containing data in the Wi-Fi data format and the Wi-Fi interface of the second user equipment device processes the received data.

In sub-step 2074, the wireless base station transmits a third set of data packets to the third user equipment device, e.g., UE 1 119, in response to the third data service request it received from the third user equipment device. The third set of data packets being transmitted to the CPE device for delivery to the third user equipment device (e.g., UE 3 119) in the first wireless protocol format over the wireless connection or link, e.g., link 166, established between the CPE device and wireless base station. The third set of data packets belonging to a packet stream whose packets are sent over a single path to the user equipment device. The packets being received at the CPE device, e.g, CPE 1 112, in the first wireless format and being communicated by the CPE device to the Wi-Fi Access Point (e.g., Wi-Fi AP 2 124) servicing the third user equipment device (e.g., UE 3 119) to which the third set of data packets are being sent. The packets being communicated over the communications link (e.g., link 123) connecting the CPE device (e.g., CPE 1 112) and Wi-Fi Access Point (e.g., Wi-Fi AP 2 124). The packets being received at the Wi-Fi Access Point. The Wi-Fi Access Point converts the packets into Wi-Fi packets or generates Wi-Fi packets based on the received packets and transmits the converted or generated Wi-Fi packets to the third user equipment (e.g., UE 3 119) in Wi-Fi format over the Wi-Fi channel or link (e.g., link 134) connecting the Wi-Fi Access Point (e.g., Wi-Fi AP 1 124) to the third user equipment device (e.g., UE 3 119). The third user equipment device (e.g., UE 3 119) receives each of the packets in the third set of packets at its Wi-Fi interface. The third user equipment device checks whether the packet is marked as containing data in Wi-Fi data format and if so processes the data otherwise sends over a link (e.g., a wire or trace) the information in the Wi-Fi MAC data packet unit to another wireless interface at the user equipment device (e.g., an interface handling data in the first wireless format such as a 5G interface if the first wireless format is a 5G wireless format). In this example, the packets of the third set of packets are marked as containing a MAC packet data unit containing data in the Wi-Fi data format and the Wi-Fi interface of the third user equipment device processes the received data. Operation proceeds from step 2068 via connection node D 2076 to step 2130 shown on FIG. 2E.

In step 2130, the CPE device monitors for downlink congestion in each of the links between the CPE device and the one or more Wi-Fi Access Points to which it is connected. Step 2130 in some embodiments includes one or more sub-steps 2132 and 2134. In sub-step 2132, the CPE device monitors each of the links connecting a Wi-Fi Access Point to the CPE device for more than a first threshold number of expected data packets in the buffer for the Wi-Fi Access Point for a predetermined period of time. In sub-step 2134, the CPE device monitors each of the downlink buffers for each of the links connecting a Wi-Fi Access Point to the CPE device for a buffer overflow condition. The down link buffers being buffers in the CPE device, memory or registers of the CPE device. In some embodiments, each communications link (e.g., link 121, 123, ..., 125) between the CPE device and a Wi-Fi Access Point has its own downlink buffer. Operation proceeds from step 2130 to step 2136.

In step 2136, when the CPE device (e.g., CPE 1 112) detects congestion in one or more of the links between the CPE device and the one or more Wi-Fi Access Points to which the CPE device is connected, e.g., via a downlink buffer overflow condition or more than a first threshold number of expected data packets being in the downlink buffer for a predetermined period of time, the CPE device: (i) generates and communicates an Access Point (AP) Data Overload message to the wireless base station (e.g., CBSD 1 102) over the wireless communications link (e.g., link 166) connecting the CPE device and the wireless base station in the first wireless protocol format; (ii) requests Wi-Fi Access Points to which the CPE device is connected provide information including AP identification information (e.g., IDs, Medium Access Control (MAC) addresses, Hardware addresses), and identification of user equipment devices to which the Wi-Fi Access Point is providing services; (iii) communicates the Wi-Fi Access Point information to the wireless base station. Operation proceeds from step 2136 to step 2138.

In step 2138, in response to receiving the AP data overload message, the wireless base station, e.g., CBSD 1 102, generates a "MAC coordination message". In some embodiments, the Wi-Fi Access Point information including the Wi-Fi Access Point identification information is included in the AP data overload message. In some embodiments, the Wi-Fi Access Point information is sent in a separate message from the "AP data overload message" in which case it is received and processed as a separate message at the wireless base station in a separate operation from the receipt of and processing of the AP data overload message operations. In some embodiments, the MAC coordination message is generated based on Wi-Fi Access Point information. Operation proceeds from step 2138 to step 2140.

In step 2140, the wireless base station, e.g., CBSD 1 102, transmits the generated "MAC Coordination Message" to the CPE device in the first wireless protocol format. Operation proceeds from step 2140 to step 2142.

In step 2142, the CPE device forwards or transmits the "MAC Coordination Message" to the Wi-Fi Access Points to which it is connected (e.g., Wi-Fi AP 1 122, Wi-Fi AP 2 124, ..., Wi-Fi AP N 126 in order to start coordination between the wireless base station, the CPE device and Wi-Fi Access Points regarding dual path packet stream delivery to user equipment devices which requires MAC packet layer conversion for data packets which are communicated to a user end device via a Wi-Fi Access Point. Operation proceeds from step 2142 to step 2144.

Figure 12:
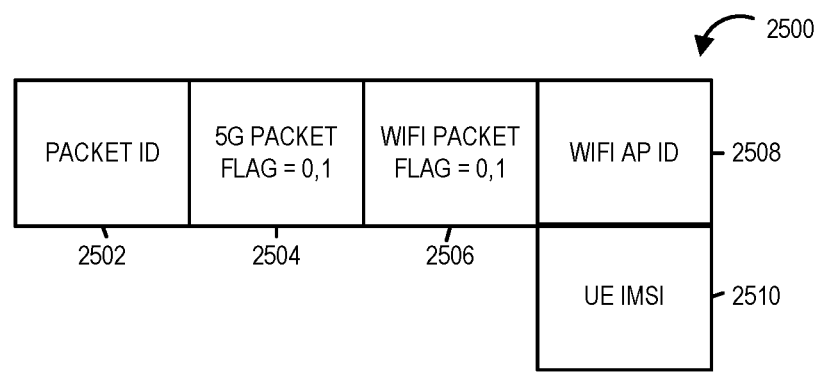
FIG. 12 illustrates exemplary packet information and packet fields in accordance with one embodiment of the present invention.

In step 2144, the Wi-Fi Access Points in response to receiving the MAC Coordination Message switch from operating in a non-MAC coordination mode of operation to operating in a MAC coordination mode of operation. In the MAC coordination mode of operation the Wi-Fi Access Points use a MAC converter layer on top of the MAC layer of a received packet destined for a user equipment device to encode the packet which is in the first wireless protocol format into a Wi-Fi protocol format. Diagram 1100 of FIG. 11 illustrates the process of an exemplary data packet with a 5G MAC packet format having its MAC layer converted from 5G MAC layer packet format to Wi-Fi MAC layer format. The 5G Packet Data Convergence Protocol (PDCP) packet format 1090 includes three Octets 1094, 1096 and 1098 corresponding to the 1014, 1024 and 1026 of the 5G PDCP packet 1002 illustrated in diagram 1100. The third Octet 1098 shows the PDCP Packet Data Unit (PDU) 1026. In non-MAC coordination mode of operation the 5G PDCP PDU data 1026 is placed in the MAC Packet Data Unit (PDU) 1046 of the Wi-Fi Packet Frame 1126. In the MAC coordination mode of operation all three octets 1094, 1096 and 1098 of the 5G PDCP packet are included in the MAC Packet Data Unit (MAC PDU) 1046 part of the Wi-Fi Packet Frame 1126. The Wi-Fi Access Point encapsulates the 5G PDCP packet into the Wi-Fi MAC PDU of the Wi-Fi frame. In some embodiments, the data packets communicated from the wireless base station are marked to indicate whether the data packet is to have the MAC layer conversion performed on the packet by the Wi-Fi Access Point. FIG. 12 shows fields of a message or packet 2500 which include a packet ID field 2502, first wireless protocol packet flag field 2504, e.g., 5G packet flag which can have a value of 0 or 1, a Wi-Fi packet flag 2506 which can have a value of 0 or 1, a Wi-Fi Access Point ID 2508 and User Equipment IMSI 2510. When the 5G packet flag=1, Wi-Fi packet flag=0, the packet is a 5G only packet. This is a packet sent from a wireless base station directly to the user equipment device over a wireless connection between the wireless base station and the user equipment device using the first wireless protocol which in this example is 5G wireless protocol. When the 5G packet flag=0, Wi-Fi packet flag=1, the packet is a Wi-Fi only packet which is sent from the wireless base station to the user equipment device via the CPE device, the wired connection between the CPE device and the Wi-Fi Access Point and over the Wi-Fi wireless connection to the user equipment device. When the 5G packet flag=1, Wi-Fi packet flag=1, this is a 5G over Wi-Fi packet in which the packet is sent from the wireless base station to the CPE device in the first wireless protocol format which in this case is 5G wireless protocol format and then sent over the wired connection to the Wi-Fi Access Point having the Wi-Fi AP ID 2508. At the Wi-Fi Access Point the MAC layer conversion operation is performed by the Wi-Fi Access Point and the 5G PDCP (e.g., 1002) is encapsulated in the Wi-Fi MAC-PDU and then sent over the Wi-Fi communication link to the user equipment device having the IMSI 2510. When the Wi-Fi interface (e.g., Wi-Fi chipset) of the user equipment with the IMSI 2510 receives the Wi-Fi packet and decodes it, it determines that the Wi-Fi MAC-PDU includes the 5G PDCP (e.g., 1002) and forwards it to the 5G interface of the user equipment device over a wire or trace. The 5G interface of the user equipment device decodes the 5G PDCP (e.g., 1002) and uses the packet ID 2502 or a sequence number in the 5G PDCP to properly sequence or order the packet with the other packets received for the packet stream to which the packet belongs. In some embodiments the packet ID may include both the identification of the packet stream to which the packet belongs as well as the sequence number of the packet. Note only packets with the 5G packet flag set to 1 and Wi-Fi flag set to 1 have the MAC conversion layer operation performed on them by the Wi-Fi Access Point. While FIG. 12 illustrates the use of both a 5G packet flag and a Wi-Fi packet flag, in some embodiments a single packet MAC layer converter packet flag is utilized. When the MAC layer packet flag is set the Wi-Fi Access Point performs a MAC layer conversion and when the MAC layer packet flag is not set the Wi-Fi Access Point does not perform a MAC layer conversion. While the 5G wireless protocol has been used in the example of FIGS. 11 and 12 other wireless protocols can, and in some embodiments are, used for example CBRS wireless protocol and cellular protocol. Packet Data Convergence Protocol is specified by 3GPP in TS 25.323 for UMTS, TS 36.323 for LTE and TS 38.323 for 5G New Radio (NR). The PDCP is located in the Radio Protocol Stack in the UMTS/LTE/5G Air interface on top of the RLC layer. The user equipment device in most embodiments uses the first wireless format type (5G packet flag) and the WiFi packet flag to determine how to process the packet. In some embodiments, the user equipment device will implement different buffers for packets based on the packet flag markings such that packets from Wi-Fi only packet streams, 5G only packet streams and packets streams from dual paths will each have separate buffers. In some embodiments, the dual buffer packet streams will be larger as the timing of receipt of the packets will not be as close together as in non-dual mode packets streams and the allowance time before a request for a re-transmission of a packet that was not received will be greater. In some embodiments, the request for the retransmission of packets from a packet stream being sent via dual paths that are not received at the user equipment device, is made by the user equipment device 5G interface and not the Wi-Fi interface.

Returning now to step 2144, once the Wi-Fi Access Points have placed them in MAC coordination mode, operation proceeds from step 2144 to step 2146.

In step 2146, the wireless base station determines which packets are transmitted to user equipment devices through which Wi-Fi Access Points connected to the CPE device at the customer premises based on the Wi-Fi Access Point information provided by the CPE device to the wireless base station. Operation proceeds from step 2146 to step 2148 shown on FIG. 2F via connection node E 2147.

In step 2148, the wireless base station determines which user devices at the customer premises, e.g., customer premises 1 114, are directly connected to the wireless base station via alternative wireless connections/links (e.g., 5G wireless connection, CBRS wireless connection, or cellular wireless connection) using the first wireless protocol. In the example system 100, user equipment device 1 116 is connected via wireless communications link 190 to the wireless base station 102, user equipment device 2 118 is connected via wireless communications link 191 to the wireless base station 102, user equipment device 3 119 is connected via wireless communications link 192 to the wireless base station 102, user equipment device M 120 is connected via wireless communications link 193 to the wireless base station 102. The wireless base station in the exemplary embodiment is using a first wireless protocol, e.g., the 5G wireless protocol, to communicate with the CPE 1 112, UE 1 116, UE 2 118, UE 3 119 and UE M 120 over the communications links 166, 190, 191, 192, and 193 respectively. In some embodiments step 2148 includes sub-step 2150.

In sub-step 2150, when a user equipment device directly connects or attaches to the wireless base station, e.g., CSBD 1 102, using the first wireless protocol, the wireless base station determines whether there are packets being sent to the user equipment device via the CPE device based on matching the user equipment device's International Subscriber Mobile Identity (IMSI) to the user equipment's MAC ID. Operation proceeds from step 2148 to step 2152.

In step 2152, the wireless base station on receiving confirmation that the CPE device and Wi-Fi Access Points have entered into MAC Coordination mode of operation in response to receiving the MAC Coordination Mode message from the wireless base station, switches from a non-MAC Coordination Mode of operation to a MAC Coordination Mode of operation, said switching from a Non-MAC Coordination Mode of operation to a MAC Coordination Mode of operation including: (i) maintaining the current flow of downlink data packets, e.g., Internet Protocol packets, through the current transmission path including the CPE device, Wi-Fi Access Points, Wi-Fi wireless connections to the user equipment devices; (ii) when a user equipment device request for additional data that is of a different traffic type or traffic types with different Quality of Service (QoS) is received via the CPE device from a user equipment device whose downlink data is determined to be traversing a congested link between the CPE device and the Wi-Fi Access Point supporting the user equipment device making the request and it is determined that the alternative wireless connection between the wireless base station and the user equipment device making the request for additional data has sufficient capacity to support the transmission of the additional data requested, the wireless base station transmits the additional traffic data in response to the request for additional data over the alternative wireless connection or network path established between the user equipment device making the request and wireless base station using the first wireless protocol (e.g., 5G wireless protocol, CBRS wireless protocol or cellular wireless protocol); (iii) when a user equipment device request for additional data that is of a different traffic type or traffic types with different Quality of Service (QoS) is received via the CPE device from a user equipment device whose downlink data is determined to be traversing a congested link between the CPE device and the Wi-Fi Access Point supporting the user equipment device making the request and the alternative wireless connection between the wireless base station and the user equipment device making the request is determined not to have sufficient capacity to support the additional data requested, the wireless base station transmits the additional data to the requesting user equipment device using data transmission coordination, data transmission coordination including transmitting some of the additional traffic data packets in response to the request for additional data over the alternative wireless network path or connection established between the user equipment device making the request and the wireless base station using the first wireless protocol format and transmitting the rest of the packets of the additional data requested over the path including the CPE device and Wi-Fi Access Point to the user equipment device, data packets in the additional traffic flow of additional data being marked to indicate packets which are sent through the alternative wireless network connection, e.g., 5G connection, and which packets are sent over the path including the CPE device and Wi-Fi Access Point to the user equipment device as previously discussed in connection with FIG. 12. Examples of different traffic types include best effort data traffic, high definition video data traffic, normal video data traffic, high definition voice traffic, multiplayer gaming data traffic, virtual reality data traffic, live video streaming data traffic and live music streaming data traffic. Operation proceeds from step 2152 via connection node F 2153 to optional step 2154 shown on FIG. 2G.

In optional step 2154, the wireless base station determines which Wi-Fi Access Points connected to the CPE device provide the best channel conditions for the user equipment devices to which the wireless base station is connected, e.g., via probes based on Wi-Fi channel quality estimation, e.g., in accordance with the Wi-Fi 802.11 protocol. For example, in system 100 the wireless base station 102 is connected to the UE 1 116, UE 2 118, UE 3 119, and UE M 120 via wireless communications links 190, 191, 192 and 193 respectively. The wireless base station can send a command to each of these user equipment devices and request that they perform a probe to determine Wi-Fi channel quality and report back the results to the wireless base station. Operation proceeds from optional step 2154 to optional step 2156.

In optional step 2156, the wireless base station transmits instructions to one or more user equipment devices (e.g., UE 1 116, UE 2 118, UE 3 119, UE M 120) connected to the Wi-Fi Access Points (e.g., WiFi AP 1 122, WiFi AP 2 124, WiFi AP N 126) at the customer premises (e.g., customer premises 1 114) to drop there current Wi-Fi Access Point connection and establish a new Wi-Fi Access Point connection with a Wi-Fi Access Point that will provide a better channel condition (e.g., a Wi-Fi Access Point that does not have a congested link between the CPE device and the Wi-Fi Access Point. For example in connection with system 100, the wireless base station 102 may determine that the link 121 is congested while the link 123 is not congested and may further determine that UE 2 118 is able to attach to WiFi AP 2 based on the Wi-Fi channel quality probes. Upon making these determinations the wireless base station sends a command to the UE 2 118 to drop the Wi-Fi connection 132 to Wi-Fi AP 1 122 and establish a connection with WiFi AP 2 124 thereby reducing the downlink congestion on the link 121 as the downlink traffic for UE 2 118 will now traverse link 123 instead of link 121. Similarly the other UE devices at the first customer premise may, and in some embodiments are, commanded to change the WiFi Access Points to which they are connected therein the wireless base station is able to manage the traffic routing at the customer premises to reduce traffic congestion and optimize traffic routing at the customer premises. Operation proceeds from optional step 2156 to step 2158. In those embodiments which do not implement optional steps 2154 and 2156 operation proceeds directly from step 2152 to step 2158.

In step 2158, when the additional data traffic flow or session is completed to the user equipment device that requested the additional data, the wireless base station determines with respect to the user equipment device whether to: (i) drop the Wi-Fi connection for a pre-determined period of time to relieve the CPE device to Wi-Fi Access Point downlink congestion and transition all downlink data for the user equipment device through the alternative wireless path, (ii) continue in dual path mode of operation (using alternative wireless connection and Wi-Fi connection path with MAC coordination), or (iii) continue with the CPE device Wi-Fi connection and drop the alternative connection based on the determined quality of the alternative path signaling conditions. In some embodiments, the step 2158 includes one or more sub-steps 2160, 2162, and 2164.

In sub-step 2160, when the quality of the alternative path (e.g., 5G wireless connection, CBRS wireless connection, or cellular wireless connection) downlink signaling conditions between the wireless base station and the user equipment device is very good, e.g., the user equipment device can receive good downlink data packet throughput, then the wireless base station will run a test to check the uplink signal quality and if the uplink signal quality is also very good the wireless base station will instruct the user equipment device to drop the Wi-Fi connection for a predetermined amount of time to relieve the CPE-Wi-Fi Access Point link congestion transitioning any downlink traffic and uplink traffic onto the alternative wireless connection. Whether the downlink signaling conditions on the alternative path are very good is determined by determining if the downlink signaling conditions meet or exceed a downlink threshold. Whether the uplink signaling conditions on the alternative path are very good is determined by determining if the uplink signaling conditions on the alternative path meet or exceed an uplink threshold.

In sub-step 2162, when the signaling conditions between the wireless base station and the user equipment device are average or do not meet an average threshold value, then dual path mode of operation using the alternative wireless connection and the Wi-Fi transmission via Wi-Fi Access Point path will continue wherein the Wi-Fi Access Point performs the MAC layer conversion operation on packets transmitted from the wireless base station to the user equipment device via the Wi-Fi Access Point.

In sub-step 2164, when the signaling conditions between the wireless base station and the user equipment device are experiencing frequent fluctuations, e.g, because the SAS is changing power levels or there is frequency interference, then dual path mode of operation will be terminated and the downlink data will be sent from the wireless base station to the user equipment device via the Wi-Fi Access point path. Operation proceeds from step 2158 to step 2166 shown on FIG. 2H via connection node G 2165.

In step 2166, the customer premises equipment device, e.g., CPE 1 112, continues to monitor the downlink congestion on the links connecting the customer premises equipment device and Wi-Fi Access Points and when the customer premises equipment device determines that the congestion has been cleared for a predetermined amount of time (e.g., no overflow of the link buffers or the number of packets in the link buffers falls below a threshold value), the customer premises equipment device generates a message indicating that the Wi-Fi Access Point Overload condition no longer exists at the customer premises. The customer premises equipment device then transmits the generated message to the wireless base station. In some embodiments, the operations of monitoring the downlink congestion, determining the overload condition no longer exists, generating the message indicating the Wi-Fi Access Point overload condition no longer exists and the transmission of the message to the wireless base station are separate steps. Operation proceeds from step 2166 to step 2168.

In step 2168, the wireless base station receives the message indicating that the Wi-Fi Access Point overload condition no longer exists at the customer premises. Operation proceeds from step 2168 to step 2170.

In step 2170, the wireless base station in response to receiving the message indicating that the Wi-Fi Access Point overload condition no longer exists at the customer premises generates a message to the customer premises equipment device and Wi-Fi Access Points at the customer premises to switch from operating in the MAC coordination mode of operation to the Non-MAC coordination mode of operation which includes no longer performing the MAC layer conversion on packets as dual path mode operation is not performed in Non-MAC coordination mode of operation. Operation proceeds from step 2170 to step 2172.

In step 2172, the wireless base station transmits the generated message to switch from operating in the MAC coordination mode of operation to the Non-MAC coordination mode of operation to the customer premises equipment device. Operation proceeds from step 2172 to step 2174.

In step 2174, the customer premises equipment device receives the message to switch from operating in the MAC coordination mode of operation to the Non-MAC coordination mode of operation and forwards/communicates the message to the Wi-Fi Access Points to which it is connected at the customer premises. Operation proceeds from step 2174 to step 2176.

In step 2176, the customer premises equipment device and the Wi-Fi Access Points send an acknowledgement, e.g., an acknowledgement message, to the wireless base station that they have switched to the Non-MAC coordination mode of operation. Operation proceeds from step 2176 to step 2178.

In step 2178, the wireless base station on receiving the acknowledgement from the customer premises equipment device and Wi-Fi Access Points switches from operating in the MAC coordination mode of operation to the Non-MAC coordination mode of operation thereby ceasing sending packets of a packet stream to the user equipment devices at the customer premises via dual paths. Thus no packets sent to the user equipment devices at the customer premises are marked for MAC layer conversation. Operation proceeds with the wireless base station providing data services to the user equipment devices via the CPE device and Wi-Fi Access Points. Operation proceeds from step 2178 via connection node D 2076 to step 2130 where the CPE device continues to monitor for congestion at the customer premises equipment devices and the method 2000 proceeds as previously described.

Typically, regardless of the mode of operation if the alternative path to the user equipment device is dropped the user equipment device will always default to attaching to a Wi-Fi Access Point and receiving data services over the Wi-Fi Access Point. In this way, even if there is congestion the user equipment device will still receive some level of service.

The method 2000 provides the technological solution of how to provide wireless data services, e.g., broadband services, to devices located at a customer premises while minimizing and overcoming congestion problems at the customer premises. The various embodiments described in connection with method 2000 provide new and novel methods for efficiently and effectively identifying, managing, reducing and/or eliminating congestion, e.g., link congestion, at a customer premises so that data services can be provided to subscribers and/or user equipment devices located at the customer premises via wireless connections.

In some embodiments, the wireless base station selectively determines which Wi-Fi Access Points to command to go into MAC coordination mode of operation based on which Wi-Fi Access Points are being affected by the Wi-Fi Access Point overload condition. For example, Wi-Fi Access Points experiencing downlink congestion are placed in MAC coordination mode of operation in which dual path mode of operation is used to send packets of a packet stream to user equipment devices being serviced by the Wi-Fi Access Point corresponding to the overload conditions while Wi-Fi Access Points which are not experiencing an overload condition remain in the Non-MAC coordination mode of operation.

Various features of the inventions will now be described in connection with FIGS. 13, 14, 15, 16 and 17.

Figure 13:
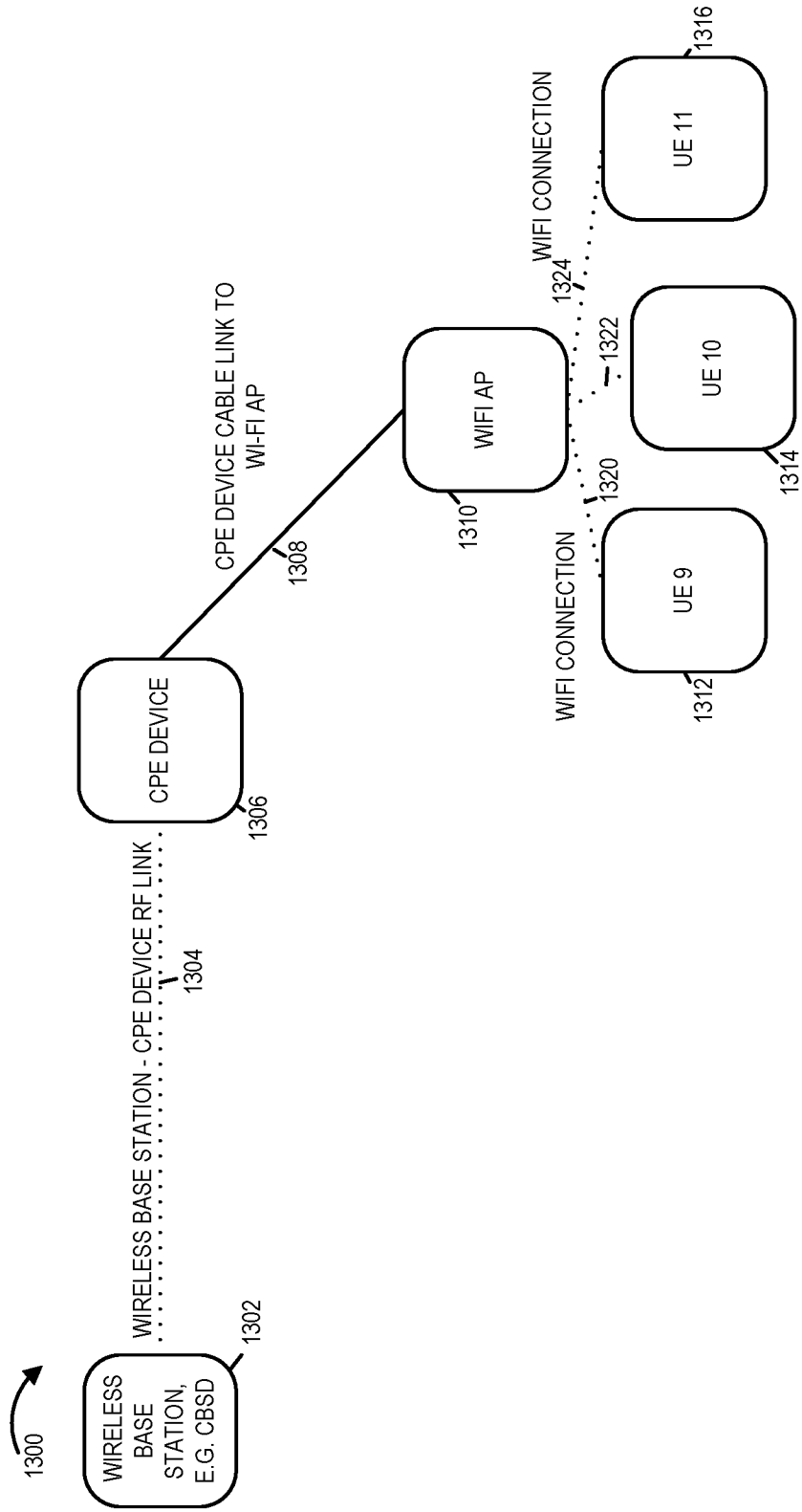
FIG. 13 illustrates another exemplary system in accordance with an embodiment of the present invention in a Non-MAC coordination mode of operation.

In FIG. 13 another exemplary communications system 1300 illustrating another embodiment of the invention is illustrated. The communications system 1300 includes a wireless base station, e.g., CBSD, 1302, a CPE device 1306, a WI-FI Access Point 1310, three user equipment devices UE 9 1312, UE 10 1314, and UE 11 1316 coupled together via a plurality of communications links 1304, 1308, 1320, 1322, 1324. The wireless communications link 1304 couples or connects the wireless base station 1302 to the CPE device 1306. The communications link 1308 is a cable or wire that couples or connects the CPE device 1306 to the Wi-Fi Access Point 1310. The communications links 1320, 1322, and 1324 are wireless Wi-Fi communications links or connections which couple or connect the UE 9 1312, UE 10 1314, and UE 11 1316 respectively to the Wi-Fi Access Point 1310. The wireless communications link 1304 is a 5G wireless connection which means its packets are sent using a 5G wireless communications protocol. The CPE device 1306, Wi-Fi Access Point 1310 and user equipment devices UE 9 1312, UE 10 1314, and UE 11 1316 are located at a customer premises for example a residential house. The wireless base station 1302 is located outside the customer premises. In some embodiments, the communications system 1300 is part of a CBRS network with the wireless base station being a CBSD device.

In system 1300 a single customer premises is shown with a single Wi-Fi Access Point which is servicing three user equipment devices. This has been done for the sake of simplicity in explaining the invention and as previously explained in connection with FIG. 1 additional wireless base stations, customer premises, Wi-Fi Access Points, and user equipment devices may be utilized in connection with various embodiments of the invention.

The wireless base station 1302 is implemented in accordance with wireless base station 400 illustrated in FIG. 4. The CPE device 1306 is implemented in accordance with the CPE device 300 illustrated in FIG. 3. The user equipment devices UE 9, UE 10 and UE 11 are implemented in accordance with the user equipment device 500 illustrates in FIG. 5. The Wi-Fi Access Point 1310 is implemented in accordance with the Wi-Fi Access Point 600 illustrated in FIG. 6.

FIG. 13 illustrates the communications system 1300 operating in non-MAC coordination mode of operation when there is not a Wi-Fi overload condition in existence at the customer premises, i.e., the link 1308 is not congested causing a downlink buffer overflow condition or a condition in which the downlink buffer contains a number of packets which exceeds a buffer threshold which indicates there is congestion on the link 1308.

In FIG. 13 wireless base station 1302 provides data services to user equipment device UE 9 1312 by sending all packets of a packet stream to the UE 9 1312 via the 5G wireless link 1304 to the CPE device 1306 which sends or routes the packets to the Wi-Fi Access Point 1310 over the wire or cable link 1308. The Wi-Fi Access Point converts the packet to a Wi-Fi packet and sends it to the UE 9 1312 over the Wi-Fi connection 1320 in a Wi-Fi format. The user equipment device UE 9 receives the Wi-Fi packets at its Wi-Fi interface which processes the Wi-Fi packet. The wireless base station includes an indication in the packets it sends in this mode of operation as being Wi-Fi only packets which indicates the packets are part of a packet stream whose packets are only being communicated to the UE 9 1312 via a Wi-Fi connection.

In FIG. 13 wireless base station 1302 similarly provides data services to user equipment device UE 10 1314 by sending all packets of a packet stream to the UE 10 1314 via the 5G wireless link 1304 to the CPE device 1306 which sends or routes the packets to the Wi-Fi Access Point 1310 over the wire or cable link 1308. The Wi-Fi Access Point converts the packet to a Wi-Fi packet and sends it to the UE 10 1314 over the Wi-Fi connection 1322 in a Wi-Fi format. The user equipment device UE 10 receives the Wi-Fi packets at its Wi-Fi interface which processes the Wi-Fi packets. The wireless base station includes an indication in the packets it sends in this mode of operation as being Wi-Fi only packets which indicates the packets are part of a packet stream whose packets are only being communicated to the UE 10 1314 via a Wi-Fi connection.

In FIG. 13 wireless base station 1302 similarly provides data services to user equipment device UE 11 1316 by sending all packets of a packet stream to the UE 11 1316 via the 5G wireless link 1304 to the CPE device 1306 which sends or routes the packets to the Wi-Fi Access Point 1310 over the wire or cable link 1308. The Wi-Fi Access Point converts the packet to a Wi-Fi packet and sends it to the UE 11 1316 over the Wi-Fi connection 1324 in a Wi-Fi format. The user equipment device UE 11 receives the Wi-Fi packets at its Wi-Fi interface which processes the Wi-Fi packets. The wireless base station includes an indication in the packets it sends in this mode of operation as being Wi-Fi only packets which indicates the packets are part of a packet stream whose packets are only being communicated to the UE 11 1316 via a Wi-Fi connection.

The link 1308 between the CPE device and the Wi-Fi Access Point is limited in its capacity to carry data to all three Wi-Fi enabled user equipment devices UE 9, UE 10, and UE 11. Therefore even though these user equipment devices request data in downlink, the link 1308 in some situation creates a bottleneck, i.e., congestion on the link, limiting the amount of data that can be sent to the user equipment devices UE 9, UE 10, UE 11 which are requesting the data. To compensate for this bottleneck condition, the user equipment devices which are also 5G wireless protocol enabled can receive data through a separate 5G wireless connection between the user equipment devices and the wireless base station 1302. To achieve this the system enters a MAC-coordination mode of operation in which packets of a packet stream are sent over two paths to the user equipment device one path being a direct 5G wireless protocol connection and the other being the path including the Wi-Fi connection. With respect to the path including the Wi-Fi connection, 5G packet data and associated information are sent over the Wi-Fi connection by the Wi-Fi Access Point by performing a MAC conversion layer operation on the received packet.

Figure 17:
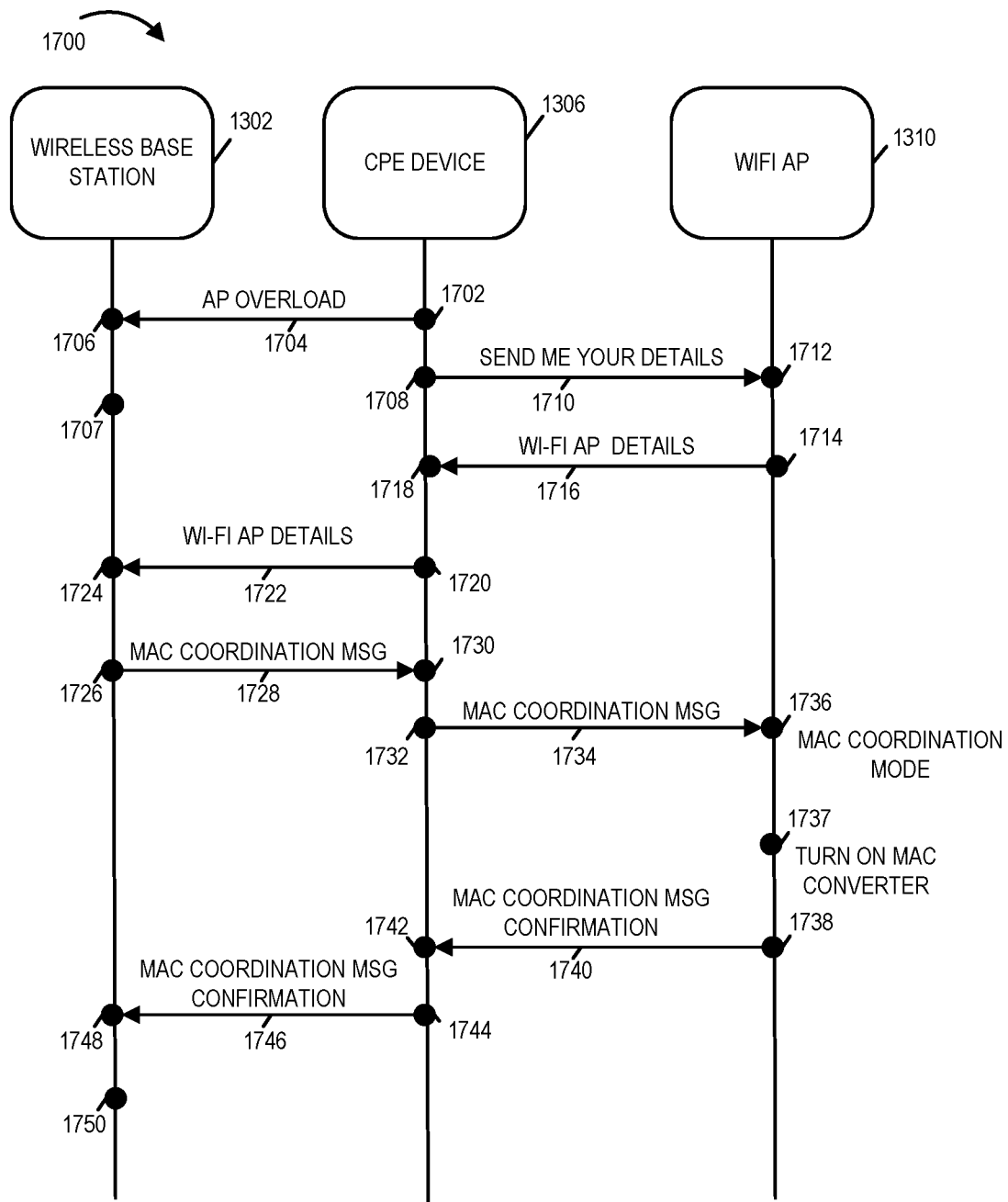
FIG. 17 illustrates an exemplary signaling diagram and method for switching from a first mode of operation (Non-MAC coordination mode of operation) to a second mode of operation (MAC coordination mode of operation) in accordance with an embodiment of the present invention.

FIG. 17 illustrates the signaling used to invoke MAC coordination operation in the system 1300. Operation begins in step 1702 when the CPE device 1306 detects that there is a Wi-Fi Access Point overload condition, e.g., there is a downlink buffer overflow or the number of packets in the downlink buffer exceeds a threshold value. In step 1702 upon detection of the Wi-Fi AP overload condition, the CPE device 1306 generates and sends the AP overload message 1704 to the wireless base station 1302. Operation proceeds from step 1702 to steps 1706 and steps 1708.

In step 1708, the CPE device 1306 generates message 1710 requesting the Wi-Fi AP 1310 to provide details about the Wi-Fi AP 1310 including identification information (e.g., ID, MAC Address, Hardware Address for the Wi-Fi AP 1310) and information, e.g., identification information, about the UEs the Wi-Fi AP is currently servicing which in this case includes UE 9, UE 10, and UE 11. Operation proceeds from step 1708 to step 1712.

Returning to step 1706, in step 1706 the wireless base station 1302 receives and processes the AP overload message 1704 detecting based on the AP overload message that there is overload condition at the customer premises, e.g., congestion on the CPE device to Wi-Fi AP link. Operation proceeds from step 1706 to step 1707. In step 1707, the wireless base station switches from Non-MAC coordination mode of operation to MAC coordination mode of operation.

In step 1712, the Wi-Fi AP 1310 receives and processes the message 1710 requesting Wi-Fi AP 1310's information. Operation proceeds from step 1712 to step 1714. In step 1714, the Wi-Fi AP 1310 generates message 1716 and transmits it to the CPE device 1306. The message 1716 includes the requested Wi-Fi AP 1310 details, e.g., identification information and information about the user equipment devices it is servicing. Operation proceeds from step 1714 to step 1718.

In step 1718, the CPE device 1306 receives and processes the message 1716. Operation proceeds from step 1718 to step 1720.

In step 1720, the CPE device 1306 generates Wi-Fi AP details message 1722 and transmits it to the wireless base station 1302. The Wi-Fi AP details message 1722 includes the information received in the message 1716 from the Wi-Fi AP 1310. Operation proceeds from step 1720 to step 1724.

In step 1724, the wireless base station 1302 receives and processes the Wi-Fi AP details message 1722. Operation proceeds from step 1724 to step 1726.

In step 1726, the wireless base station 1302 generates the MAC coordination message 1728 and transmits it to the CPE device 1306. The MAC coordination message 1728 may include information based on the Wi-Fi AP details received in Wi-Fi AP details message 1722 such as an identification of the Wi-FI AP to be placed in MAC coordination mode of operation. Operation proceeds from step 1726 to step 1730.

In step 1730, the CPE device 1306 receives the MAC coordination message 1728 and processes it. Operation proceeds from step 1730 to step 1732.

In step 1732, the CPE device 1306 generates MAC coordination message 1734 and transmits it to the Wi-Fi AP 1310. The MAC coordination message 1734 is based on the MAC coordination message 1728 received from wireless base station 1302. Operation proceeds from step 1732 to step 1736.

In step 1736, the Wi-Fi AP 1310 receives and processes the MAC coordination message 1734. Upon processing the MAC coordination message 1734 and in response to the MAC coordination message, the Wi-Fi AP 1310 switches from a Non-MAC coordination mode of operation to a MAC coordination mode of operation. Operation proceeds from step 1736 to step 1737. In step 1737, the Wi-Fi AP 1310 turns on MAC layer converter. Packets received marked for MAC layer conversion (e.g., 5G flag set to 1 and Wi-Fi flag set to 1 as described in connection with FIG. 12) will have the MAC layer conversion operation performed on the packet. FIG. 11 illustrates how the MAC converter of the Wi-Fi AP encapsulates the 5G PDCP 1002 of received packets into the MAC PDU of the Wi-Fi frame 1126 before transmission to the user equipment device over the Wi-Fi link. Operation proceeds from step 1737 to step 1738.

In step 1738, the Wi-Fi AP 1310 generates and transmits MAC coordination confirmation message 1740 to the CPE device 1306. The MAC coordination message confirmation indicating that the Wi-Fi AP 1310 has switched to the MAC coordination mode of operation. Operation proceeds from step 1738 to step 1742.

In step 1742, the CPE device 1306 receives and processes the MAC coordination confirmation message 1740. Operation proceeds from step 1742 to step 1744.

In step 1744, the CPE device generates and transmits the MAC coordination confirmation message 1746 to wireless base station 1302. The MAC coordination confirmation message 1746 being based on the MAC coordination confirmation message 1740 and indicating that Wi-Fi AP 1310 has switched to MAC coordination mode of operation. Operation proceeds from step 1744 to step 1748.

In step 1748, the wireless base station receives and processes the MAC coordination confirmation message 1746. Operation proceeds from step 1748 to step 1750.

In step 1750, the wireless base station begins sending a first set of packets from a first data stream through the 5G wireless connection to the UE 9 1312 and a second set of packets from the first data stream through the Wi-Fi path. The first and second set of packets being different packets. The packets being sent through the Wi-Fi path include an indication or mark included in the packet by the wireless base station indicating the packets are 5G over Wi-Fi packets which the Wi-Fi AP 1310 is to perform a MAC layer conversion operation on in which the 5G PCDP packet information is placed in the MAC PDU of the Wi-Fi frame as shown in diagram 1100 of FIG. 11. The wireless base station sending packets to the UE 9 through two different paths.

Figure 15:
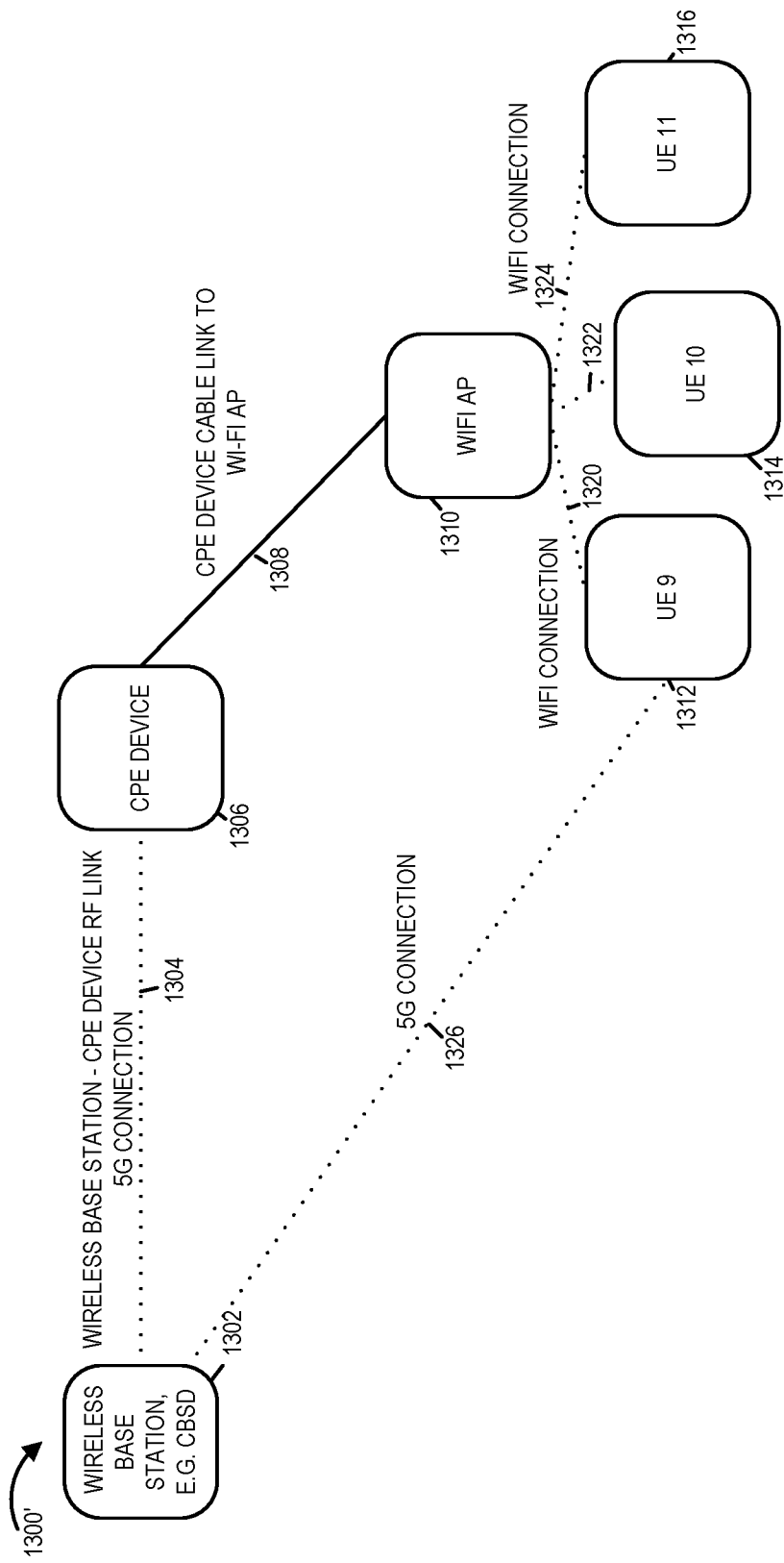
FIG. 15 illustrates the exemplary system illustrated in FIG. 13 in a MAC coordination mode of operation.

FIG. 15 illustrates communications system 1300' which is system 1300 with the addition of the wireless communication link 1326 which is a 5G wireless connection established between the wireless base station 1302 and UE 9 1312. Once the system enters the MAC coordination mode of operation, the next data service request received by the wireless base station from the UE 9 1312 that is of a different traffic type, the wireless base station will transmit the data for the packets over the 5G connection 1326 to relieve congestion at the customer premises by off loading download data traffic to the UE 9 1312 device through the 5G connection instead of through the 1304 link, CPE device 1306, 1308 link, 1310 Wi-Fi Access Point and 1320 Wi-Fi connection path. If however, the wireless base station 1302 determines there is insufficient capacity on the 5G 1326 connection/link for the data services requested by the UE 9 1312 then the wireless base station 1302 will begin transmitting packets belonging to the same data stream over the two established paths between the wireless base station and the user equipment device UE 9 1312. A first set of packets of the first packet stream will be sent over the 5G connection 1326 (first path) and received by the 5G wireless interface of the user equipment device 1312. A second set of packets of the first packet stream will be sent over the 5G connection link 1304, CPE device 1306, link 1308, Wi-Fi AP 1310 and Wi-Fi connection 1320 (second path) and received by the Wi-Fi interface of the user equipment device 1312. The second set of packets will include an indication that the packets are 5G over Wi-Fi packets with both the 5G flag and Wi-Fi flag set in the packet as previously described in connection with diagram 2500 shown in FIG. 12. The Wi-Fi Access Point 1310 will perform the MAC conversion layer operation on the packets included in the second set of packets wherein the 5G PDCP packet information 1002 is included in the MAC PDU of the Wi-Fi packet frame. The packets will also include the Wi-Fi AP ID of the Wi-FI AP 1310, packet ID or sequence number and the UE IMSI for UE 9 1312. The first set of packets and the second set of packets are different packets belonging to the same packet stream. The Wi-Fi interface of the UE 9 1312 upon receiving the second set of packets will determine that the packets MAC PDU include the 5G PDCP packet information and will communicate the 5G PDCP packet information to the UE 9's 5G interface which will decode the information and using the packet ID place the packet data in the proper order with the data of the other packets received from both the 5G connection and over the Wi-Fi connection.

Figure 14:
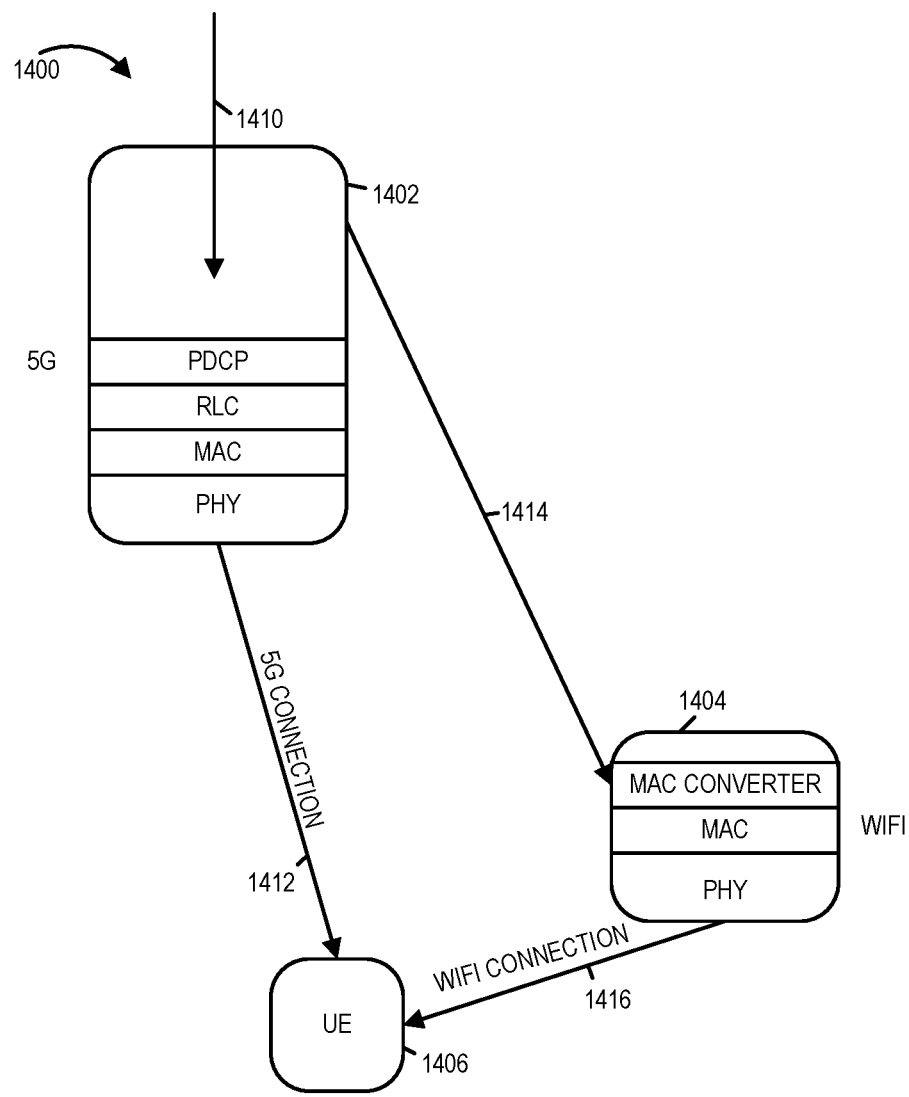
FIG. 14 illustrates 5G and Wi-Fi protocol stacks.

Diagram 1400 of FIG. 14 illustrates a 5G protocol stack 1402, Wi-Fi protocol stack 1404 and a user equipment device 1406. The diagram 1400 further illustrates how 5G formatted packet information 1410 is sent in a 5G format over the 5G connection 1412 (first path) to the user equipment device 1406 and how the 5G formatted packet information 1410 is sent in 5G packet format over connection 1414 and then through a MAC layer converter and then to user equipment device via a Wi-Fi connection 1416 (second path).

Figure 16:
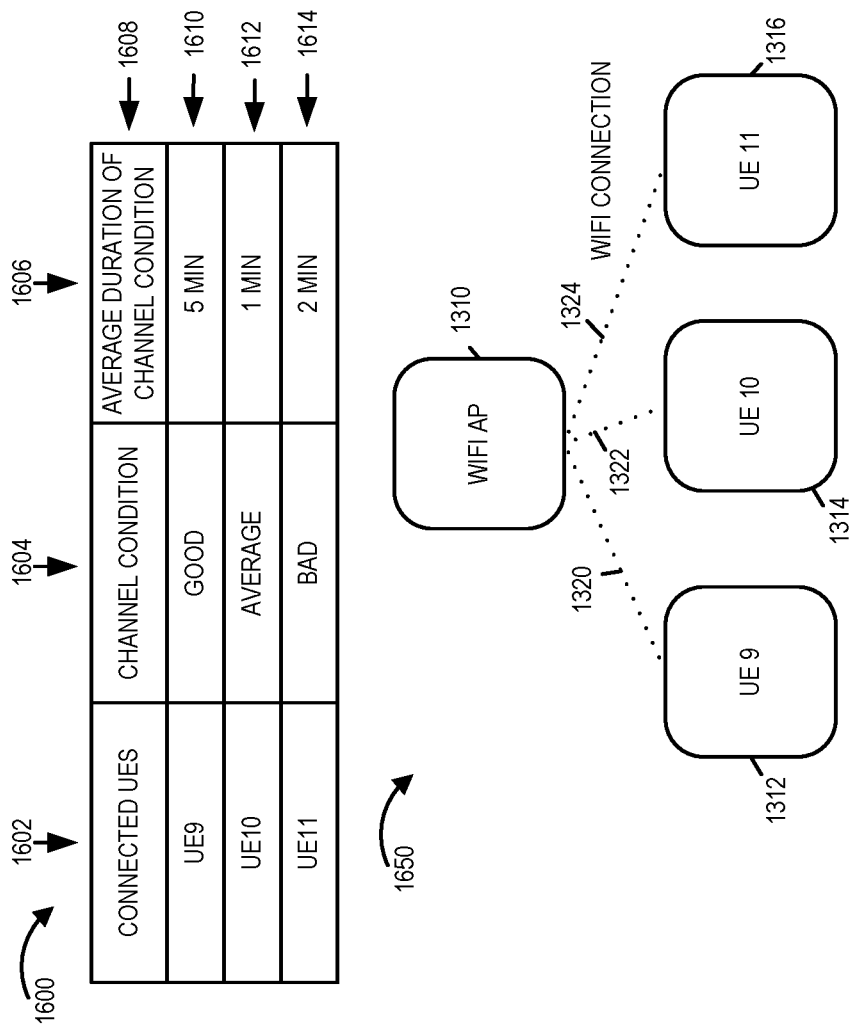
FIG. 16 illustrates Wi-Fi Access Point connections to user equipment devices and the channel quality of the conditions.

Table 1600 of FIG. 16 illustrates Wi-Fi channel conditions on the Wi-Fi connections or links 1320, 1322, and 1324 which connect WiFi AP 1310 to the UE 9 1312, UE 10 1314, and UE 11 1316 respectively. Diagram 1650 shows the connections between the Wi-Fi AP 1310 and the user equipment devices 1312, 1314 and 1316. Table 1600 includes columns 1602, 1604 and 1606 and rows 1608, 1610, 1612, and 1614. The first row 1608 includes labels identifying the information contained in the each of the columns. Column 1602 identifies the user equipment devices connected to the Wi-Fi AP 1310 (entry column 1602, row 1608). Column 1604 includes the channel condition (entry column 1604, row 1608) of the connection between the Wi-Fi AP 1310 and the UE identified in the same row. Column 1606 includes the average duration of channel condition (entry column 1606, row 1608) specified in the same row. Row 1610 includes information for the user equipment device UE 9 1312 with the channel condition being good and the average duration of the channel condition being 5 minutes. Row 1612 includes information for the user equipment device UE 10 1314 with the channel condition being average and the average duration of the channel condition being 1 minute. Row 1614 includes information for the user equipment device UE 11 1316 with the channel condition being bad and the average duration of the channel condition being 2 minutes. The wireless base station when in MAC coordination mode of operation can probe the Wi-Fi connections and use this information to manage the user equipment device connections to the Wi-Fi Access Points. When there are multiple Wi-Fi Access Points at the customer premises, the wireless base station can instruct a user equipment device to drop a Wi-Fi connection to a first Wi-Fi Access Point and instead attach or connect to a different Wi-Fi Access Point.

In the system 100 of FIG. 1 for example, the wireless base station based on the Wi-Fi connection information obtained about the UE to Wi-Fi Access Points can re-direct a user equipment device, e.g., UE 2 118 to drop its Wi-Fi connection 132 to Wi-Fi AP 1 122 and instead connect to Wi-Fi AP 2 124 which may have an uncongested link 123 to the CPE device thereby offloading the downlink data being sent to UE 2 via link 121 to link 123.

In some embodiments, the information in the table 1600 illustrated in FIG. 16 is stored in the memory of the wireless base station.

Various exemplary embodiments illustrating different features of the present invention will now be discussed.

List of Exemplary Numbered Method Embodiments

Method Embodiment 1. A communications method comprising: monitoring, by a wireless base station, for a first condition at a first customer premises; switching, in response to detecting by a wireless base station the first condition exists at the first customer premises, from a first mode of operation to a second mode of operation with respect to providing data services to a user equipment device located at the first customer premises; receiving, after switching into said second mode of operation, at the wireless base station a first data service request from a first user equipment device; transmitting, in response to said first data service request, one or more data packets of a first data packet stream to the first user equipment device via a first transmission path and transmitting one or more additional data packets of the first packet stream to the first user equipment device via a second transmission path.

Method Embodiment 2. The communications method of method embodiment 1, wherein said first condition exists when a communications link in the first transmission path at the first customer premises is determined to be congested.

Method Embodiment 3. The communications method of method embodiment 1, wherein said detecting by a wireless base station the first condition exists at the first customer premises includes receiving a first message from a customer premise equipment device at the first customer premises indicating that there is a Wi-Fi Access Point overload condition.

Method Embodiment 3A. The communications method of method embodiment 1 further comprising: monitoring, by the customer premise equipment device, for a Wi-Fi Access Point overload condition, said monitoring for a Wi-Fi Access Point overload condition including monitoring one or more Wi-Fi Access Point downlink buffers for a buffer overflow condition or a condition in which the number of data packets in one or more Wi-Fi Access Point downlink buffers exceeds a first threshold for a predetermined amount of time; detecting, by the customer premises equipment device, that a Wi-Fi Access Point overload condition exists with respect to a Wi-Fi Access Point when said customer premise equipment device determines that the Wi-Fi Access Point downlink buffer corresponding to the Wi-Fi Access Point is experiencing a buffer overflow condition or is experiencing a condition in which the number of data packets in the Wi-Fi Access Point downlink buffer corresponding to the Wi-Fi Access Point exceeds the first threshold for the predetermined amount of time; and in response to said Wi-Fi Access Point overload condition being detected: (i) generating, by the customer premises equipment device, the first message indicating that there is a Wi-Fi Access Point overload condition; and (ii) communicating said Wi-Fi Access Point overload condition message to said wireless base station.

Method Embodiment 3B. The method of method embodiment 3A further comprising: when said Wi-Fi Access Point overload condition is detected: requesting, by the customer premises equipment device, from each Wi-Fi Access Point connected to the customer premises equipment device information about the Wi-Fi Access Point including Wi-Fi Access Point identification information (e.g., Identifier, MAC address, and/or Hardware Identifier) and information about user equipment devices attached to the Wi-Fi Access Point; receiving, by the customer premises equipment device, from the Wi-Fi Access Points connected to the customer premises equipment device the requested information; communicating the received information about the Wi-Fi Access Points to the wireless base station.

Method Embodiment 4. The communications method of method embodiment 1, wherein the first transmission path includes: a first wireless communications link (e.g., 5G, CBRS or cellular wireless communication link) between the wireless base station and a customer premises equipment device located at the first customers premises; a first wired communications link between the customer premises equipment device and a first Wi-Fi Access Point device; and a first Wi-Fi wireless communications link between the first Wi-Fi Access Point device and the first user equipment device.

Method Embodiment 5. The communications method of method embodiment 4, wherein the second transmission path is a second wireless communications link (e.g., 5G, CBRS, or cellular wireless communication link) between the wireless base station and the first user equipment device.

Method Embodiment 5A. The communications method of method embodiment 5, wherein said first wireless communications link between said wireless base station and customer premises equipment device and second wireless communications link between said wireless base station and the first user equipment device utilize bandwidth in the 3.5 GHz frequency spectrum.

Method Embodiment 5B. The communications method of method embodiment 5A, wherein said wireless base station is a CSBD of a CBRS network; wherein said bandwidth frequency spectrum utilized by said first wireless communications link and said second wireless communications link are assigned to the wireless base station by a Spectrum Access System.

Method Embodiment 6. The communications method of method embodiment 5, wherein the first user equipment device is a multi-mode communications device that is enabled to receive and transmit messages using two or more separate wireless communications protocols simultaneously.

Method Embodiment 6A. The communications method of method embodiment 6, wherein the first user equipment device is a dual-mode communications device that is enabled to communicate with other devices using a first wireless communications protocol and a second wireless communications protocol simultaneously.

Method Embodiment 6B. The communications method of method embodiment 1, wherein said first wireless communications protocol is a Wi-Fi communications protocol; and wherein said second wireless communications protocol is one of the following protocols: 5G wireless communications protocol, a CBRS wireless communications protocol and a cellular wireless communications protocol.

Method Embodiment 7. The communications method of method embodiment 1 further comprising: generating, by the wireless base station, the data packets of the first packet stream, said generating the data packets of the first packet stream including marking the packets of the first packet stream that will be communicated to the first user equipment device via the first transmission path to include an indication that the packets are part of a packet stream being communicated over two separate transmission paths.

Method Embodiment 7A. The communications method of method embodiment 7, wherein marking the packets of the first packet stream to include an indication that the packets are part of a packet stream being communicated over two separate transmission paths includes including information in the packets of the first packet stream which indicates that the packet is part of a packet being communicated over two separate transmission paths.

Method Embodiment 7B. The communications method of method embodiment 7A further comprising: when a Wi-Fi Access Point receives a data packet including an indication that the packet is part of a packet stream being communicated over two separate transmission paths, said Wi-Fi Access Point will generate a Wi-Fi data packet based on the received data packet, said generated Wi-Fi data packet including Packet Data Convergence Protocol (PDCP) Packet with payload information (e.g., 5G PDCP packet) of the received data packet in the Medium Access Control (MAC) Packet Data Unit (PDU) part of the Wi-Fi packet frame.

Method Embodiment 7C. The communications method of method embodiment 7B further comprising: when a Wi-Fi interface (e.g., Wi-Fi chipset) of a user equipment device receives a Wi-Fi data packet including an indication that the packet is part of a packet stream being communicated over two separate transmission paths, the Wi-Fi interface will extract the MAC PDU and communicate it to a second interface (e.g., 5G chipset) which will decode the MAC PDU information in accordance with the protocol format of the second path (e.g., 5G decoder).

Method Embodiment 8. The communications method of method embodiment 1 further comprising: receiving, at a first interface of the first user equipment device, the one or more packets of the first packet stream transmitted to the first user equipment device via the first transmission path; receiving, at a second interface of the first user equipment device, the one or more packets of the first packet stream transmitted to the first user equipment device via the second transmission path; determining, by the first user equipment device, that the packets received via the first transmission path and the packets received via the second transmission path are part of the first packet stream; and reordering the packets received via the first interface and the second interface belonging to the first packet stream based on packet sequence numbers included in the packets.

Method Embodiment 8A. The method of method embodiment 8, wherein the first interface is a Wi-Fi wireless interface and the second interface is a 5G wireless interface; wherein said determining, by the first user equipment device, that the packets received via the first transmission path and the packets received via the second transmission path are part of the first packet stream includes identifying by the Wi-Fi wireless interface an indication included in the received Wi-Fi packets that the Wi-Fi packets are part of a packet stream being communicated over two separate transmission paths; and when the Wi-Fi interface determines a packet is part of a packet stream being communicated over two separate transmission paths communicating the MAC PDU of the packet to the second interface for processing (e.g., via a port on Wi-Fi chipset over a trace or wire to the 5G chipset).

Method Embodiment 9. The communications method of method embodiment 1, wherein when operating in said first mode of operation said wireless base station communicates all packets belonging to a packet stream over a single transmission path to a user equipment device (e.g., all packets of packet stream communicated via CBSD to CPE to WI-FI Access Point to UE transmission path or all packets of packet stream communicated via CBSD to UE transmission path).

Method Embodiment 10. The communications method of method embodiment 1, wherein when operating in said second mode of operation said wireless base station communicates a command to one or more Wi-Fi Access Points at the customer premises to perform a MAC layer conversion on received packets marked for MAC layer conversion before communicating the packets over a Wi-Fi channel to the user equipment device.

Method Embodiment 10A. The communications method of method embodiment 10, wherein said MAC layer conversion includes converting a packet's MAC packet layer in a first wireless format (e.g., 5G wireless format, CBRS wireless format, cellular wireless format) to a WiFi MAC layer.

Method Embodiment 10B. The communications method of method embodiment 10, wherein said MAC layer conversion includes encapsulating Packet Data Convergence Protocol (PDCP) Packet with payload information (e.g., 5G PDCP packet) of the received data packet in the Medium Access Control (MAC) Packet Data Unit (PDU) part of the Wi-Fi packet frame.

List of Exemplary Numbered System Embodiments

System Embodiment 1. A communications system comprising: a wireless base station including: memory; and a processor included in the wireless base station which controls the operation of the wireless base station to perform the following operations: monitor for a first condition at a first customer premises; switch, in response to detecting the first condition exists at the first customer premises, from a first mode of operation to a second mode of operation with respect to providing data services to a user equipment device located at the first customer premises; receive, after switching into said second mode of operation, at the wireless base station a first data service request from a first user equipment device; transmit, in response to said first data service request, one or more data packets of a first data packet stream to the first user equipment device via a first transmission path and transmitting one or more additional data packets of the first packet stream to the first user equipment device via a second transmission path.

System Embodiment 2. The communications system of system embodiment 1, wherein said first condition exists when a communications link in the first transmission path at the first customer premises is determined to be congested.

System Embodiment 3. The communications system of system embodiment 1, wherein said detecting by a wireless base station the first condition exists at the first customer premises includes receiving a first message from a customer premise equipment device at the first customer premises indicating that there is a Wi-Fi Access Point overload condition.

System Embodiment 3A. The communications system of system embodiment 1 further comprising: a customer premise equipment device including: a memory; and a processor included in the customer premises equipment device that controls the customer premise equipment device to: monitor for a Wi-Fi Access Point overload condition, said monitor for a Wi-Fi Access Point overload condition including monitoring one or more Wi-Fi Access Point downlink buffers for a buffer overflow condition or a condition in which the number of data packets in one or more Wi-Fi Access Point downlink buffers exceeds a first threshold for a predetermined amount of time; detect that a Wi-Fi Access Point overload condition exists with respect to a Wi-Fi Access Point when said customer premise equipment device determines that the Wi-Fi Access Point downlink buffer corresponding to the Wi-Fi Access Point is experiencing a buffer overflow condition or is experiencing a condition in which the number of data packets in the Wi-Fi Access Point downlink buffer corresponding to the Wi-Fi Access Point exceeds the first threshold for the predetermined amount of time; and in response to said Wi-Fi Access Point overload condition being detected: (i) generating a first message indicating that there is a Wi-Fi Access Point overload condition; and (ii) communicating said Wi-Fi Access Point overload condition message to the wireless base station.

System Embodiment 3B. The communications system of system embodiment 3A, wherein said processor included in the customer premises equipment device further controls the customer premise equipment device to perform the following operations when said Wi-Fi Access Point overload condition is detected: request from each Wi-Fi Access Point connected to the customer premises equipment device information about the Wi-Fi Access Point including Wi-Fi Access Point identification information (e.g., Identifier, MAC address, and/or Hardware Identifier) and information about user equipment devices attached to the Wi-Fi Access Point; receive, by the customer premises equipment device, from the Wi-Fi Access Points connected to the customer premises equipment device the requested information; communicate the received information about the Wi-Fi Access Points to the wireless base station.

System Embodiment 4. The communications system of system embodiment 1, wherein the first transmission path includes: a first wireless communications link (e.g., 5G, CBRS or cellular wireless communication link) between the wireless base station and a customer premises equipment device located at the first customers premises; a first wired communications link between the customer premises equipment device and a first Wi-Fi Access Point device; and a first Wi-Fi wireless communications link between the first Wi-Fi Access Point device and the first user equipment device.

System Embodiment 5. The communications system of system embodiment 4, wherein the second transmission path is a second wireless communications link (e.g., 5G, CBRS, or cellular wireless communication link) between the wireless base station and the first user equipment device.

System Embodiment 5A. The communications system of system embodiment 5, wherein said first wireless communications link between said wireless base station and customer premises equipment device and second wireless communications link between said wireless base station and the first user equipment device utilize bandwidth in the 3.5 GHz frequency spectrum.

System Embodiment 5B. The communications system of system embodiment 5A, wherein said wireless base station is a CSBD of a CBRS network; wherein said bandwidth frequency spectrum utilized by said first wireless communications link and said second wireless communications link are assigned to the wireless base station by a Spectrum Access System.

System Embodiment 6. The communications system of system embodiment 5, wherein the first user equipment device is a multi-mode communications device that is enabled to receive and transmit messages using two or more separate wireless communications protocols simultaneously.

System Embodiment 6A. The communications system of system embodiment 6, wherein the first user equipment device is a dual-mode communications device that is enabled to communicate with other devices using a first wireless communications protocol and a second wireless communications protocol simultaneously.

System Embodiment 6B. The communications system of system embodiment 1, wherein said first wireless communications protocol is a Wi-Fi communications protocol; and wherein said second wireless communications protocol is one of the following protocols: 5G wireless communications protocol, a CBRS wireless communications protocol and a cellular wireless communications protocol.

System Embodiment 7. The communications system of system embodiment 1 wherein said processor included in the wireless base station further controls the wireless base station to perform the operation of: generating, by the wireless base station, the data packets of the first packet stream, said generating the data packets of the first packet stream including marking the packets of the first packet stream that will be communicated to the first user equipment device via the first transmission path to include an indication that the packets are part of a packet stream being communicated over two separate transmission paths.

System Embodiment 7A. The communications system of system embodiment 7, wherein marking the packets of the first packet stream to include an indication that the packets are part of a packet stream being communicated over two separate transmission paths includes including information in the packets of the first packet stream which indicates that the packet is part of a packet being communicated over two separate transmission paths.

System Embodiment 7B. The communications system of system embodiment 7A, wherein when a Wi-Fi Access Point receives a data packet including an indication that the packet is part of a packet stream being communicated over two separate transmission paths, said Wi-Fi Access Point will generate a Wi-Fi data packet based on the received data packet, said generated Wi-Fi data packet including Packet Data Convergence Protocol (PDCP) packet with payload (PDU) information (e.g., 5G PDCP packet) of the received data packet in the Medium Access Control (MAC) Packet Data Unit (PDU) part of the Wi-Fi packet frame.

System Embodiment 7C. The communications system of system embodiment 7B, wherein when a Wi-Fi interface (e.g., Wi-Fi chipset) of a user equipment device receives a Wi-Fi data packet including an indication that the packet is part of a packet stream being communicated over two separate transmission paths, the Wi-Fi interface will extract the MAC PDU and communicate it to a second interface (e.g., 5G chipset) which will decode the MAC PDU information in accordance with the protocol format of the second path (e.g., 5G decoder).

System Embodiment 8. The communications system of system embodiment 1, wherein the first user equipment device further includes: a first interface of the first user equipment device that receives the one or more packets of the first packet stream transmitted to the first user equipment device via the first transmission path; a second interface of the first user equipment device, the one or more packets of the first packet stream transmitted to the first user equipment device via the second transmission path; a packet stream determination component that determines if the packets received via the first transmission path and the packets received via the second transmission path are part of the first packet stream; and a reordering component that reorders the packets received via the first interface and the second interface belonging to the first packet stream based on packet sequence numbers or packet identification numbers included in the packets.

System Embodiment 8A. The communications system of system embodiment 8, wherein the first interface of the first user equipment device is a Wi-Fi wireless interface and the second interface of the first user equipment device is a 5G wireless interface; wherein said determining, by the first user equipment device, that the packets received via the first transmission path and the packets received via the second transmission path are part of the first packet stream includes identifying by the Wi-Fi wireless interface an indication included in the received Wi-Fi packets that the Wi-Fi packets are part of a packet stream being communicated over two separate transmission paths; and when the Wi-Fi interface determines a packet is part of a packet stream being communicated over two separate transmission paths communicating the MAC PDU of the packet to the second interface for processing (e.g., via a port on Wi-Fi chipset over a trace or wire to the 5G chipset).

System Embodiment 9. The communications system of system embodiment 1, wherein when operating in said first mode of operation said wireless base station communicates all packets belonging to a packet stream over a single transmission path to a user equipment device (e.g., all packets of packet stream communicated via CBSD to CPE to WI-FI Access Point to UE transmission path or all packets of packet stream communicated via CBSD to UE transmission path).

System Embodiment 10. The communications system of system embodiment 1, wherein when operating in said second mode of operation said wireless base station communicates a command to one or more Wi-Fi Access Points at the customer premises to perform a MAC layer conversion on received packets marked for MAC layer conversion before communicating the packets over a Wi-Fi channel to the user equipment device.

System Embodiment 10A. The communications system of system embodiment 10, wherein said MAC layer conversion includes converting a packet's MAC packet layer in a first wireless format (e.g., 5G wireless format, CBRS wireless format, cellular wireless format) to a WiFi MAC layer.

System Embodiment 10B. The communications system of system embodiment 10, wherein said MAC layer conversion includes encapsulating Packet Data Convergence Protocol (PDCP) Packet with packet payload information (e.g., 5G PDCP packet with payload) of the received data packet in the Medium Access Control (MAC) Packet Data Unit (PDU) part of the Wi-Fi packet frame.

The techniques of various embodiments may be implemented using software, hardware and/or a combination of software and hardware. Various embodiments are directed to apparatus, e.g., wireless base stations, user equipment devices, Wi-Fi Access Points, CPE devices, CBSDs, CBRS tower base stations, CBRS CPE devices, SAS devices, user devices, subscriber devices, servers, nodes and/or elements. Various embodiments are also directed to methods, e.g., method of controlling and/or operating wireless base stations, user equipment devices, Wi-Fi Access Points, CPE devices, CBSDs, CBRS tower base stations, CBRS CPE devices, SAS devices, user devices, subscriber devices, servers, nodes and/or elements. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments devices, wireless base stations, user equipment devices, Wi-Fi Access Points, CPE devices, CBSDs, CBRS tower base stations, CBRS CPE devices, SAS devices, user devices, subscriber devices, servers, nodes and/or elements described herein are implemented using one or more components to perform the steps corresponding to one or more methods, for example, ranking, establishing connections, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., wireless base stations, user equipment devices, Wi-Fi Access Points, CPE devices, CBSDs, CBRS tower base stations, CBRS CPE devices, SAS devices, user devices, subscriber devices, servers, nodes and/or elements are configured to perform the steps of the methods described as being performed by the wireless base stations, user equipment devices, Wi-Fi Access Points, CPE devices, CBSDs, CBRS tower base stations, CBRS CPE devices, SAS devices, user devices, subscriber devices, servers, nodes and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., wireless base stations, user equipment devices, Wi-Fi Access Points, CPE devices, CBSDs, CBRS tower base stations, CBRS CPE devices, SAS devices, user devices, subscriber devices, servers, nodes and/or elements, with a processor which includes a component corresponding to each of the steps of the various described methods performed by the device in which the processor is included. In some but not all embodiments a device, e.g., wireless base stations, user equipment devices, Wi-Fi Access Points, CPE devices, CBSDs, CBRS tower base stations, CBRS CPE devices, SAS devices, user devices, subscriber devices, servers, nodes and/or element, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a wireless base stations, user equipment devices, Wi-Fi Access Points, CPE devices, CBSDs, CBRS tower base stations, CBRS CPE devices, SAS devices, user devices, subscriber devices, servers, nodes and/or element. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a wireless base stations, user equipment devices, Wi-Fi Access Points, CPE devices, CBSDs, CBRS tower base stations, CBRS CPE devices, SAS devices, user devices, subscriber devices, servers, nodes and/or element or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a customer premises equipment device comprising:
   establishing connections between the customer premises equipment device and a plurality of Wi-Fi Access Points, said customer premises equipment device and said plurality of Wi-Fi Access Points being located at a first customer premises;
   monitoring, by the customer premises equipment device, for a first condition at the first customer premises;
   transmitting instructions from the customer premises equipment device to one of the plurality of Wi-Fi Access Points to switch from a first mode of operation to a second mode of operation with respect to providing data services to a first user equipment device located at the first customer premises; and
   wherein the first mode of operation is a non-MAC layer conversion mode of operation and the second mode of operation is a MAC layer conversion mode of operation.

2. The method of operating a customer premises equipment device of claim 1, further comprising:
   establishing a wireless connection between the customer premises equipment device and a wireless base station.

3. The method of operating a customer premises equipment device of claim 2, wherein the customer premises equipment device is positioned on a first communications path between the wireless base station and the one Wi-Fi Access Point of the plurality of Wi-Fi Access Points providing data services to the first user equipment device.

4. The method of operating a customer premises equipment device of claim 1, wherein said MAC layer conversion mode of operation includes a Wi-Fi Access Point adding a MAC converter layer on top of a MAC layer to encode packets received in a first wireless protocol format into a Wi-Fi protocol format.

5. The method of operating a customer premises equipment device of claim 1, wherein the first condition is a Wi-Fi Access Point congestion condition.

6. The method of operating a customer premises equipment device of claim 5, wherein said monitoring for the Wi-Fi Access Point congestion condition includes monitoring for downlink congestion in each link connecting the customer premises equipment device and one or more of the plurality of Wi-Fi Access Points.

7. The method of operating a customer premises equipment device of claim 1, wherein the first condition is a Wi-Fi Access Point overload condition.

8. The method of operating a customer premises equipment device of claim 7, wherein said monitoring, by the customer premises equipment device, for the Wi-Fi Access Point overload condition at the first customer premises includes: monitoring one or more Wi-Fi Access Point downlink buffers for a buffer overflow condition or a condition in which the number of data packets in one or more Wi-Fi Access Point downlink buffers exceeds a first threshold value for a predetermined amount of time.

9. The communications method of operating a customer premises equipment device of claim 8 further comprising:
   detecting, by the customer premises equipment device, that a Wi-Fi Access Point overload condition exists with respect to a Wi-Fi Access Point when said customer premise equipment device determines that the Wi-Fi Access Point downlink buffer corresponding to the Wi-Fi Access Point is experiencing a buffer overflow condition or is experiencing a condition in which the number of data packets in the Wi-Fi Access Point downlink buffer corresponding to the Wi-Fi Access Point exceeds the first threshold value for the predetermined amount of time; and
   in response to said Wi-Fi Access Point overload condition being detected: (i) generating, by the customer premises equipment device, a first message indicating that there is a Wi-Fi Access Point overload condition; and (ii) communicating said first message indicating the Wi-Fi Access Point overload condition to a wireless base station.

10. A customer premises equipment device comprising:
memory; and
a processor included in the customer premises equipment device which controls the customer premises equipment device to perform the following operations:
establish connections between the customer premises equipment device and a plurality of Wi-Fi Access Points, said customer premises equipment device and said plurality of Wi-Fi Access Points being located at a first customer premises;
monitor for a first condition at the first customer premises;
transmit instructions from the customer premises equipment device to one of the plurality of Wi-Fi Access Points to switch from a first mode of operation to a second mode of operation with respect to providing data services to a first user equipment device located at the first customer premises; and
wherein the first mode of operation is a non-MAC layer conversion mode of operation and the second mode of operation is a MAC layer conversion mode of operation.

11. The customer premises equipment device of claim 10, wherein the processor further controls the customer premises equipment device to perform the following additional operation:
establish a wireless connection between the customer premises equipment device and a wireless base station.

12. The customer premises equipment device of claim 11, wherein the customer premises equipment device is positioned on a first communications path between the wireless base station and the one Wi-Fi Access Point of the plurality of Wi-Fi Access Points providing data services to the first user equipment device.

13. The customer premises equipment device of claim 10, wherein said MAC layer conversion mode of operation includes a Wi-Fi Access Point adding a MAC converter layer on top of a MAC layer to encode packets received in a first wireless protocol format into a Wi-Fi protocol format.

14. The customer premises equipment device of claim 10, wherein the first condition is a Wi-Fi Access Point congestion condition.

15. The customer premises equipment device of claim 14, wherein monitoring for the Wi-Fi Access Point congestion condition includes monitoring for downlink congestion in each link connecting the customer premises equipment device and one or more of the plurality of Wi-Fi Access Points.

16. The customer premises equipment device of claim 10, wherein the first condition is a Wi-Fi Access Point overload condition.

17. The customer premises equipment device of claim 16, wherein said monitoring, for the Wi-Fi Access Point overload condition at the first customer premises includes:
monitoring one or more Wi-Fi Access Point downlink buffers for a buffer overflow condition or a condition in which the number of data packets in one or more Wi-Fi Access Point downlink buffers exceeds a first threshold value for a predetermined amount of time.

18. The customer premises equipment device of claim 17, wherein the processor further controls the customer premises equipment device to perform the following additional operations:
detect that a Wi-Fi Access Point overload condition exists with respect to a Wi-Fi Access Point when said customer premise equipment device determines that the Wi-Fi Access Point downlink buffer corresponding to the Wi-Fi Access Point is experiencing a buffer overflow condition or is experiencing a condition in which the number of data packets in the Wi-Fi Access Point downlink buffer corresponding to the Wi-Fi Access Point exceeds the first threshold value for the predetermined amount of time; and
in response to said Wi-Fi Access Point overload condition being detected:
(i) generate a first message indicating that there is a Wi-Fi Access Point overload condition; and
(ii) communicate said first message indicating the Wi-Fi Access Point overload condition to a wireless base station.

19. A non-transitory computer readable medium including computer executable instructions which when executed by a processor control a customer premises equipment device to perform the steps of:
establishing connections between the customer premises equipment device and a plurality of Wi-Fi Access Points, said customer premises equipment device and said plurality of Wi-Fi Access Points being located at a first customer premises;
monitoring, by the customer premises equipment device, for a first condition at the first customer premises;
transmitting instructions from the customer premises equipment device to one of the plurality of Wi-Fi Access Points to switch from a first mode of operation to a second mode of operation with respect to providing data services to a first user equipment device located at the first customer premises; and
wherein the first mode of operation is a non-MAC layer conversion mode of operation and the second mode of operation is a MAC layer conversion mode of operation.

20. The non-transitory computer readable medium of claim 19,
wherein said MAC layer conversion mode of operation includes a Wi-Fi Access Point adding a MAC converter layer on top of a MAC layer to encode packets received in a first wireless protocol format into a Wi-Fi protocol format.

* * * * *